US007828620B2

(12) United States Patent
Gosain et al.

(10) Patent No.: US 7,828,620 B2
(45) Date of Patent: Nov. 9, 2010

(54) METHOD OF MANUFACTURING TUBULAR CARBON MOLECULE AND TUBULAR CARBON MOLECULE, METHOD OF MANUFACTURING FIELD ELECTRON EMISSION DEVICE AND FIELD ELECTRON EMISSION DEVICE, AND METHOD OF MANUFACTURING DISPLAY UNIT AND DISPLAY UNIT

(75) Inventors: Dharam Pal Gosain, Tokyo (JP); Hisashi Kajiura, Kanagawa (JP); Ryuichiro Maruyama, Kanagawa (JP); Masashi Shiraishi, Tokyo (JP); Houjin Huang, Kanagawa (JP); Koji Kadono, Tokyo (JP); Shigeaki Wachi, Tokyo (JP); Masafumi Ata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1154 days.

(21) Appl. No.: 10/541,936

(22) PCT Filed: Jan. 8, 2004

(86) PCT No.: PCT/JP2004/000080

§ 371 (c)(1), (2), (4) Date: Jul. 8, 2005

(87) PCT Pub. No.: WO2004/063091

PCT Pub. Date: Jul. 29, 2004

(65) Prior Publication Data

US 2006/0108906 A1 May 25, 2006

(30) Foreign Application Priority Data

Jan. 9, 2003 (JP) ............................ 2003-003773
Jan. 9, 2003 (JP) ............................ 2003-003774
Jan. 9, 2003 (JP) ............................ 2003-003775
Jan. 9, 2003 (JP) ............................ 2003-003776
Jan. 9, 2003 (JP) ............................ 2003-003779

(51) Int. Cl.
*H01J 9/00* (2006.01)

(52) U.S. Cl. ......................... 445/50; 313/310; 313/495; 313/309; 445/51

(58) Field of Classification Search ................. 313/309, 313/310, 495; 445/49–50; 423/447.1–447.5
See application file for complete search history.

(56) References Cited

U.S. PATENT DOCUMENTS 5,072,091 A 12/1991 Nagata et al.

(Continued)

FOREIGN PATENT DOCUMENTS

CN 1345694 4/2002

(Continued)

*Primary Examiner*—Nimeshkumar D Patel
*Assistant Examiner*—Anthony T Perry
(74) *Attorney, Agent, or Firm*—Wolf, Greenfield & Sacks, P.C.

(57) ABSTRACT

A method of manufacturing a tubular carbon molecule capable of regularly aligning a carbon nanotube with a finer spacing is provided. A catalyst is arranged on a material substrate (10) made of a semiconductor such as silicon (Si) and including iron (Fe) as a catalyst through the use of melting according to a modulated heat distribution (11). The heat distribution (11) is formed, for example, through diffracting an energy beam (12) by a diffraction grating (13). As a method of arranging the catalyst, for example, iron may be deposited in a planar shape or a projection shape in a position corresponding to the heat distribution (11), or the deposited iron may be used as a master to be transferred to another substrate. A carbon nanotube is grown through the use of the arranged catalyst. The grown carbon nanotube can be used as a recording apparatus, a field electron emission device, an FED or the like.

36 Claims, 51 Drawing Sheets

U.S. PATENT DOCUMENTS

| | | | | |
|---|---|---|---|---|
| 6,283,812 | B1 | 9/2001 | Jin et al. | |
| 6,339,281 | B2 | 1/2002 | Lee et al. | |
| 6,342,276 | B1 | 1/2002 | You | |
| 6,401,526 | B1 * | 6/2002 | Dai et al. | 73/105 |
| 6,455,989 | B1 | 9/2002 | Nakada et al. | |
| 7,348,591 | B2 * | 3/2008 | Yamauchi et al. | 257/9 |
| 2002/0014667 | A1 | 2/2002 | Shin et al. | |
| 2002/0148113 | A1 | 10/2002 | Forrest et al. | |

FOREIGN PATENT DOCUMENTS

| | | | |
|---|---|---|---|
| EP | 1022763 | A1 | 7/2000 |
| EP | 1115135 | A1 | 7/2001 |
| EP | 1190987 | A1 | 3/2002 |
| JP | 52-049772 | | 4/1977 |
| JP | 61-134925 | | 6/1986 |
| JP | 63-222323 | | 9/1988 |
| JP | 01-102755 | A | 4/1989 |
| JP | 02-263589 | | 10/1990 |
| JP | 04-300313 | | 10/1992 |
| JP | 06-037068 | | 2/1994 |
| JP | 06-227806 | | 8/1994 |
| JP | 08-180457 | | 7/1996 |
| JP | 09-228160 | | 9/1997 |
| JP | 10-203810 | | 8/1998 |
| JP | 10-203810 | A | 8/1998 |
| JP | 11-066649 | | 3/1999 |
| JP | 2000-223005 | | 8/2000 |
| JP | 2000-348599 | A | 12/2000 |
| JP | 2001-176380 | | 6/2001 |
| JP | 2001-177052 | | 6/2001 |
| JP | 2001-236879 | | 8/2001 |
| JP | 2002-067000 | | 3/2002 |
| JP | 2002-110176 | | 4/2002 |
| JP | 2002-110176 | A | 4/2002 |
| JP | 2002-146534 | A | 5/2002 |
| JP | 2002-289086 | | 10/2002 |
| JP | 2002-289086 | A | 10/2002 |
| JP | 2003-168745 | A | 6/2003 |
| WO | WO 02/103096 | A1 | 12/2002 |

* cited by examiner

METHOD OF MANUFACTURING TUBULAR CARBON MOLECULE AND TUBULAR CARBON MOLECULE, METHOD OF MANUFACTURING FIELD ELECTRON EMISSION DEVICE AND FIELD ELECTRON EMISSION DEVICE, AND METHOD OF MANUFACTURING DISPLAY UNIT AND DISPLAY UNIT

TECHNICAL FIELD

The present invention relates to a method of manufacturing a tubular carbon molecule capable of aligning a tubular carbon molecule such as a carbon nanotube in a fine pattern, and a tubular carbon molecule obtained by the method. Moreover, the invention relates to a method of manufacturing a recording apparatus and a recording apparatus which uses the tubular carbon molecule, a method of manufacturing a field electron emission device including a cathode which uses the tubular carbon molecule, and a field electron emission device obtained by the method, and a method of manufacturing a display unit and a display unit which uses the field electron emission device.

BACKGROUND ART

In recent years, nanotechnology has made considerable strides recently, and in particular, a molecular structure such as a carbon nanotube is a stable material having superior properties such as high thermal conductivity, high electrical conductivity and high mechanical strength, so it is expected that the molecular structure is applied to a wide range of uses such as transistors, memories and field electron emission devices.

For example, as one of the uses of the carbon nanotube, it is known that the carbon nanotube is suitable to achieve cold cathode field electron emission (hereinafter referred to as "field electron emission") (for example, refer to Yahachi Saito, Journal of The Surface Science Society of Japan, 1998, Vol. 19, No. 10, p. 680-686). The field electron emission is a phenomenon that when an electric field larger than a predetermined threshold is applied to a metal or a semiconductor placed in a vacuum, electrons pass through an energy barrier near the surface of the metal or the semiconductor by a quantum tunneling effect, thereby electrons are emitted in a vacuum even at room temperature.

An FED (Field Emission Display) which uses the principle of the field electron emission to display an image has characteristics such as high intensity, low power consumption and a low profile, and the FED has been developed as an alternative display unit to a conventional cathode ray tube (CRT) (for example, refer to Japanese Unexamined Patent Application Publication Nos. 2002-203473 and 2000-67736). As a typical structure of the FED, a cathode panel in which a cathode emitting electrons is formed, and a anode panel in which an anode coated with a phosphor layer emitting light through being excited by collision of emitted electrons are combined as one unit so as to face each other, and the interior of the FED is in a high vacuum state. However, in the structure, it is difficult to dispose the cathode panel and the anode panel at a close distance, so it is necessary to apply a high voltage between the cathode panel and the anode panel. Therefore, an extraction electrode (gate electrode) is disposed between the cathode panel and the anode panel so as to bring the cathode and the extraction electrode closer, and a low voltage is applied between the electrodes to cause field electron emission.

FIG. 75 shows a sectional view of a configuration example of such a conventional FED. In the example, as a kind of the structure of a cathode, a structure called a Spindt (derived from a personal name) type with a conical shape is shown (for example, refer to C. A. Spindt and other three, Journal of Applied Physics, (U.S.), 1976, Vol. 47, p. 5248-5263, and Japanese Unexamined Patent Application Publication No. 2002-203473).

The FED includes a cathode panel 1100 and an anode panel 1200 facing the cathode panel 1100. The cathode panel 1100 includes a substrate 1120 on which a cathode electrode 1110 is formed and an extraction electrode 1140 facing the cathode electrode 1110 with an insulating film 1130 in between. A plurality of cathode electrodes 1110 and a plurality of extraction electrodes 1140 are formed, and each extraction electrode 1140 is disposed orthogonally opposite to the cathode electrodes 1110. On the substrate 1120, a plurality of cathodes 1150 are disposed on surfaces of the cathode electrodes 1110 on a side facing the extraction electrodes 1140.

In each extraction electrode 1140, a plurality of aperture portions 1160 with as large a size as electrons e− emitted from the cathodes 1150 can pass through are disposed corresponding to each cathode 1150. Moreover, a scan driver (not shown) which circularly applies a scanning voltage to each extraction electrode 1140 is electrically connected to each extraction electrode 1140. On the other hand, a data driver (not shown) which selectively applies a voltage to each cathode electrode 1110 according to an image signal is electrically connected to each cathode electrode 1110.

Each cathode 1150 is disposed in a matrix form corresponding to a position where the extraction electrode 1140 and the cathode electrode 1110 cross each other, and the bottom surface of each cathode 1150 is electrically connected to a corresponding cathode electrode 1110. The cathode 1150 emits electrons from a tip portion by a tunneling effect through selectively applying a predetermined electric field. Further, in a typical FED, a group of a predetermined number (for example, 1000) of cathodes 1150 corresponds to 1 pixel.

The anode panel 1200 includes a transparent substrate 1210 which is made of a glass material or the like and is optically transparent, and an anode electrode 1220 which is disposed on a surface of the transparent substrate 1210 on a side facing the cathode panel 1100. A plurality of anode electrodes 1220 are formed corresponding to the cathode electrodes 1110. Moreover, a phosphor which emits light according to the injection of electrons $e^-$, is applied to surfaces of the anode electrodes 1220 on a side closer to the transparent substrate 1210 so as to form a phosphor film 1230. Further, the anode electrodes 1220 can be made of a transparent conductive material such as ITO (Indium-Tin Oxide), and the phosphor film 1230 can be formed on surfaces of the anode electrodes 1220 on a side closer to the cathode panel 1100.

In the FED with such a structure, when a voltage is selectively applied between the extraction electrode 1140 and the cathode electrode 1110, field electron emission occurs in the cathode 1150 in an intersection point of the extraction electrode 1140 and the cathode electrode 1110, electrons $e^-$ are emitted toward the anode electrode 1220. The electrons $e^-$ emitted from the cathode 1150 pass through a fine hole (not shown) disposed in the anode electrode 1220 to come into collision with the phosphor film 1230, thereby the phosphor emits light. A desired image is displayed by the light emission from the phosphor.

In the FED, field electron emission occurs by a lower voltage, so various attempts to locally increase an electric field strength through making a tip of the cathode sharppointed have been made, and the carbon nanotube is increasingly used in such attempts (for example, refer to Yahachi Saito, Journal of The Surface Science Society of Japan, 1998, Vol. 19, No. 10, p. 680-686). For example, an FED using a single-wall carbon nanotube grown on a tip of a silicon (Si) chip by a thermal CVD (Chemical Vapor Deposition) method as a cathode has been proposed (for example, refer to 49th Extended Abstracts, Japan Society of Applied Physics and Related Societies, 29p-k-7). Moreover, there is a report that after a silicon emitter is formed by a conventional method, a film made of a metal catalyst for forming a carbon nanotube is formed, and a catalyst film on a grid electrode is removed by an etch-back method, and a carbon nanotube is grown only in a tip portion of the emitter by a thermal CVD method (refer to an article in the Nikkan Kogyo shimbun, Apr. 11, 2002, "electron emission from field emitter of CNT at 4V low voltage").

In such an application field, the carbon nanotube is not used alone, but a carbon nanotube structure including a plurality of carbon nanotubes is used. As a method of manufacturing a carbon nanotube structure, conventional semiconductor techniques such as photolithography and CVD (Chemical Vapor Deposition) are used. Moreover, a technique that a foreign material is included in a carbon nanotube has been disclosed (for example, refer to Masafumi Ata, and other three, Japanese Journal of Applied Physics (Jpn. J. Appl. Phys.), 1995, Vol. 34, p. 4207-4212, and Masafumi Ata and other two, Advanced Materials, (Germany), 1995, Vol. 7, p. 286-289).

Moreover, as another technique related to the invention, there are a magnetic recording device and a magnetic recording apparatus. Their principle is that a magnetic material is magnetized, and by coercivity, a magnetization direction corresponds to 1 or 0, or the analog quantity of a signal which records the degree of magnetization when the magnetic material is magnetized. In this case, in-plane magnetization in a horizontal direction to a recording surface and a perpendicular magnetization perpendicular to the recording surface are both in practical use. In recent years, a further improvement in recording density is in demand, and conventionally, the length of magnetization is reduced to improve the recording density. To the best of the knowledge of the inventors, an attempt to apply a carbon nanotube to such a magnetic recording technique has not been disclosed yet.

In order to achieve an FED or the like using a carbon nanotube structure, a technique that a fine pattern of a catalyst made of a transition metal or the like is formed so as to regularly align carbon nanotubes with a fine spacing is necessary. However, conventionally, photolithography is the only technique which can achieve mass productivity to some extent. Photolithography is a technique basically suitable for forming a two-dimensional structure, so photolithography is not suitable for forming a three-dimensional structure such as the carbon nanotube structure.

Moreover, in order to form a fine pattern of a metal catalyst by photolithography, there is no way but to reduce the wavelength of an energy beam, and in the present technique, it is difficult to further reduce the wavelength. Therefore, in the case where the pattern of a transition metal or the like is formed by photolithography, a dimension of the transition metal pattern and a spacing between patterns are determined by the wavelength of the energy beam, and in the present technique, the dimension cannot be reduced to 0.05 μm (50 nm) or less and a spacing (pitch) between patterns cannot be reduced to 100 nm or less. In other words, there is a problem that the conventional technique has a limit of forming a finer pattern of a metal catalyst or the like.

Further, in a cathode using a conventional carbon nanotube, a large number of carbon nanotubes are closely disposed, so there is a problem that an electric field strength on the surface of each carbon nanotube pronouncedly declines. Therefore, in order to increase the electric field strength on the surface of the carbon nanotube, it is necessary to apply a high voltage between a cathode electrode and an extraction electrode or an anode electrode, so it is difficult to lower the voltage.

In addition, conventionally, the shapes and growth directions of a large number of carbon nanotubes constituting the cathode are not uniform, so the amount of emitted electrons are not uniform, thereby there is a problem that variations in intensity occurs.

DISCLOSURE OF THE INVENTION

In view of the foregoing, it is a first object of the invention to provide a method of manufacturing a tubular carbon molecule capable of regularly aligning a tubular carbon molecule with a finer spacing.

It is a second object of the invention to provide a tubular carbon molecule being regularly aligned with a finer spacing and being suitable for manufacturing an FED, a recording apparatus or the like.

It is a third object of the invention to provide a method of manufacturing a recording apparatus and a recording apparatus being capable of further improving a recording density through the use of a tubular carbon molecule regularly aligned with a finer spacing.

It is a fourth object of the invention to provide a method of manufacturing a field electron emission capable of mass-producing field electron emission devices including a cathode in which a tubular carbon molecule is regularly aligned with a finer spacing, and a field electron emission device obtained by the method.

It is a fifth object of the invention to provide a method of manufacturing a display unit capable of mass-producing fine-pitch display units which can clearly display a higher-definition image through the use of a field electron emission device including a cathode in which a tubular carbon molecule is regularly aligned with a finer spacing, and a display unit obtained by the method.

A method of manufacturing a tubular carbon molecule according to the invention includes: a catalyst arranging step of arranging a metal having a catalyst function for a tubular carbon molecule through the use of melting by a modulated heat distribution; and a growing step of growing a tubular carbon molecule.

A tubular carbon molecule according to the invention is formed through arranging a metal having a catalyst function for a tubular carbon molecule through the use of melting by a modulated heat distribution and growing a tubular carbon molecule through the use of the metal having a catalyst function.

A method of manufacturing a recording apparatus according to the invention includes: a catalyst arranging step of arranging a metal having a catalyst function for a tubular carbon molecule through the use of melting by a modulated heat distribution; a growing step of growing a tubular carbon molecule; a height equalizing step of forming a tip of the tubular carbon molecule in a predetermined plane, and forming the tip into an open tip; and an inserting step of inserting a magnetic material in at least a tip portion of the tubular carbon molecule from the open tip.

A method of manufacturing a field electron emission device according to the invention includes: a catalyst arranging step of arranging a metal having a catalyst function for a tubular carbon molecule on a substrate through the use of a modulated heat distribution; and a cathode forming step of forming a cathode through growing a tubular carbon molecule.

A field electron emission device according to the invention includes a cathode which includes a tubular carbon molecule grown through the use of a metal having a catalyst function for a tubular carbon molecule arranged on a substrate through the use of melting by a modulated heat distribution.

In a method of manufacturing a display unit according to the invention, the display unit includes a field electron emission device and a light emitting portion which emits light according to collision of electrons emitted from the field electron emission device, and a step of forming the field electron emission device includes: a catalyst arranging step of arranging a metal having a catalyst function for a tubular carbon molecule on a substrate through the use of melting by a modulated heat distribution; and a cathode forming step of forming a cathode through growing a tubular carbon molecule.

A display unit according to the invention includes a field electron emission device; and a light emitting portion which emits light according to collision of electrons emitted from the field electron emission device, wherein the field electron emission device includes a cathode which includes a tubular carbon molecule grown through the use of a metal having a catalyst function for a tubular carbon molecule arranged on a substrate through the use of melting by a modulated heat distribution.

In the method of manufacturing a tubular carbon molecule according to the invention and the tubular carbon molecule according to the invention, a pattern made of a metal having a catalyst function for forming a tubular carbon molecule is formed through the use of melting by a modulated heat distribution. After that, the tubular carbon molecule is formed through the use of the formed pattern.

In the method of manufacturing a recording apparatus according to the invention, a metal having a catalyst function for forming a tubular carbon molecule is arranged in a desired pattern through the use of melting by a modulated heat distribution. After that, a tubular carbon molecule is grown through the use of the metal having a catalyst function, and a tip of the tubular carbon molecule is formed in a predetermined plane, and the tip is formed into an open tip. Next, a magnetic material is inserted into a tip portion of the tubular carbon molecule from the open tip to form a magnetic layer.

In the recording apparatus according to the invention, a magnetic layer inserted into each tubular carbon molecule is separated from magnetic layers in other adjacent tubular carbon molecules, so writing or reading of information on the magnetic layer in each tubular carbon molecule can be securely carried out.

In the method of manufacturing a field electron emission device, the field electron emission device, the method of manufacturing a display unit, and the display unit according to the invention, a metal having a catalyst function for a tubular carbon molecule is arranged on a substrate through the use of melting by a modulated heat distribution. After that, a tubular carbon molecule is grown to form a cathode.

BEST MODE FOR CARRYING OUT THE INVENTION

Figure 1:
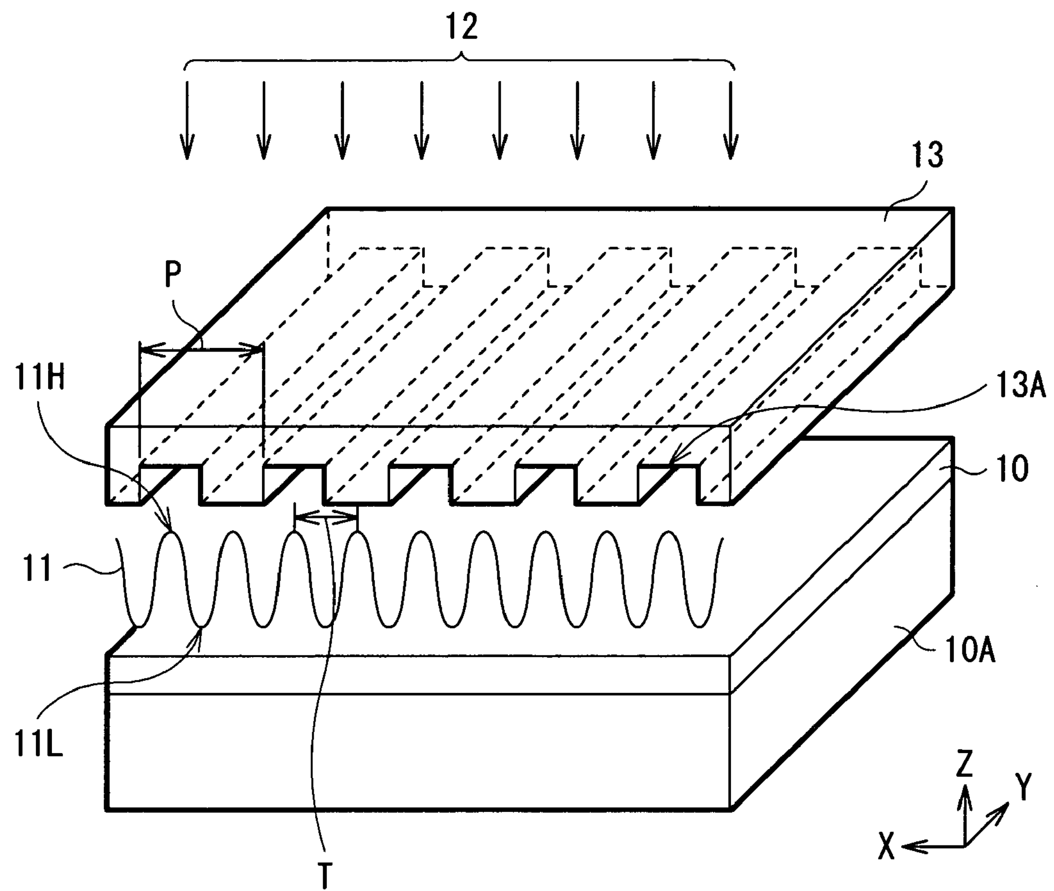
FIG. 1 is a schematic perspective view showing a melting step in a method of manufacturing a carbon nanotube according to a first embodiment of the invention.

Preferred embodiments of the present invention will be described in detail below referring to the accompanying drawings.

Method of Manufacturing Tubular Carbon Molecule

First Embodiment

At first, referring to FIGS. 1 through 3, a method of manufacturing a tubular carbon molecule according to a first embodiment of the invention will be described below. In the method according to the embodiment, a carbon nanotube structure including a plurality of carbon nanotubes aligned in one direction is formed, and the method according to the embodiment includes "a catalyst arranging step" of arranging a metal having a catalyst function for a carbon nanotube through the use of melting by a modulated heat distribution, and "a growing step" of growing a carbon nanotube through the use of the metal having a catalyst function. The obtained carbon nanotube structure is used as, for example, a cathode of an FED or a recording apparatus.

In this case, the carbon nanotube structure includes various modes such as a carbon nanotube structure in which a plurality of carbon nanotubes are aligned in a fine pattern, a carbon nanotube structure in which a foreign material is included in carbon nanotubes, or a carbon nanotube structure in which a plurality of carbon nanotubes are aligned in a fine pattern and a foreign material is included in the carbon nanotubes. In the embodiment, the carbon nanotube structure in which a plurality of carbon nanotubes are aligned in a fine pattern will be described.

Moreover, in the embodiment, the catalyst arranging step includes "a melting step" of applying a modulated heat distribution 11 to a surface of a material substrate 10 so as to melt the surface of the material substrate 10, and "a depositing step" of depositing a second material in a position according to the heat distribution 11, that is, in a desired pattern through dissipating heat of the surface of the material substrate 10.

(Melting Step)

At first, the melting step will be described below referring to FIG. 1. In this case, the material substrate 10 is made of a first material, and as a deposition material, a second material is added to the first material. The second material has a positive segregation coefficient, that is, properties of lowering the melting point of the first material through adding the second material to the first material, and remaining in a melting region in the case where after melting by heating, the first material is solidified in a cooling process. In the embodiment, as the material substrate 10 made of the first material, a silicon (Si) substrate is used, and as the second material, iron (Fe) as a metal catalyst is used.

The material substrate 10 has, for example, a thickness of 40 nm, and is supported by a supporting body 10A made of, for example, silicon. In the case where the material substrate 10 has a sufficient thickness, the supporting body 10A is not necessary.

As the first material, instead of the above-described silicon, any other semiconductor material, for example, germanium (Ge) or the like is used, and a metal material, for example, a high-melting point metal such as tantalum (Ta), tungsten (W) or platinum (Pt) or an alloy thereof may be used.

As the second material as a metal catalyst for forming a carbon nanotube, instead of the above-described iron (Fe), vanadium (V), manganese (Mn), cobalt (Co), nickel (Ni), molybdenum (Mo), tantalum (Ta), tungsten (W) or platinum (Pt) is used. Moreover, yttrium (Y), lutetium (Lu), boron (B), copper (Cu), lithium (Li), silicon (Si), chromium (Cr), zinc (Zn), palladium (Pd), silver (Ag), ruthenium (Ru), titanium (Ti), lanthanum (La), cerium (Ce), praseodymium (Pr), neodymium (Nd), terbium (Tb), dysprosium (Dy), holmium (Ho) or erbium (Er) may be used. Moreover, two or more kinds selected from the above materials may be used at the same time, or a compound including two or more kinds selected from the above materials may be used. Further, a metal phthalocyanine compound, metallocene, or a metal salt can be used. An oxide or a silicide may be used.

In addition, depending upon uses, as the second material, a dielectric material made of a nitride, an oxide, a carbide, a fluoride, a sulfide, an oxynitride, a carbo-nitride or an O—C-including compound of a metal element or a metalloid element such as aluminum (Al), silicon (Si), tantalum (Ta), titanium (Ti), zirconium (Zr), niobium (Nb), magnesium (Mg), boron (B), zinc (Zn), lead (Pb), calcium (Ca), lanthanum (La) or germanium (Ge) can be used. More specifically, AlN, $Al_2O_3$, $Si_3N_4$, $SiO_2$, MgO, $Y_2O_3$, $MgAl_2O_4$, $TiO_2$, $BaTiO_3$, $SrTiO_3$, $Ta_2O_5$, SiC, ZnS, PbS, Ge—N, Ge—N—O, Si—N—O, $CaF_2$, LaF, $MgF_2$, NaF, $TiF_4$ or the like can be used. Further, a material including any of these materials as a main component, a mixture of these materials such as, for example, AlN—$SiO_2$ can be used. In addition, a magnetic material such as iron (Fe), cobalt (Co), nickel (Ni) or gadolinium (Gd) can be used.

The heat distribution 11 includes a high temperature region 11H and a low temperature region 11L which are periodically formed through spatially modulating the surface temperature of the material substrate 10 by irradiation with an energy beam 12. The energy beam 12 is parallel light having a single wavelength and being in phase, and in the embodiment, an XeCl excimer laser is used to obtain a high output.

In the embodiment, the heat distribution 11 is applied through diffracting the energy beam 12 by a diffraction grating 13. The diffraction grating 13 spatially modulates an energy amount through diffracting the energy beam 12, and in the diffraction grating 13, for example, linearly parallel grooves 13A are arranged with a uniform periodic spacing P in a one-dimensional direction on an optical glass plate. In the embodiment, for example, the linearly parallel grooves 13A are arranged with a periodic spacing P of, for example, 1 μm in a one-dimensional direction on a plate made of a quartz material, and the diffraction grating 13 modulates the energy amount of the energy beam 12 in a one-dimensional direction along the direction where the grooves 13A are arranged. Further, the diffraction grating 13 is not necessarily limited to a diffraction grating in which projections and depressions such as grooves are formed, and for example, a diffraction grating in which a transmission portion where the energy beam 12 passes and a non-transmission portion where the energy beam 12 does not pass are formed by printing or the like may be used.

As such a diffraction grating 13 is used, the high temperature region 11H is linearly formed along an extending direction of the grooves 13A, and is arranged in a one-dimensional direction along the direction where the grooves 13A are arranged. A spatial period T of the heat distribution 11, that is, a spacing (pitch) between the high temperature regions 11H is determined by a periodic spacing P in the diffraction grating 13 and the wavelength λ of the energy beam 12. The smaller the wavelength λ is, or the smaller the periodic spacing P is, the more the spatial period T of the heat distribution can be reduced.

The energy amount of the energy beam 12 is set so that the temperature reaches a temperature at which the surface of the material substrate 10 in the low temperature region 11L is melted. Thereby, the whole surface of the material substrate 10 can be melted. At this time, when an excimer laser is used as the energy beam 12, the energy amount can be controlled by the number of irradiation with pulses of emitted light. In the embodiment, for example, the energy amount of the energy beam 12 is 350 $mJ/cm^2$, and the number of pulse irradiation is 10.

(Depositing Step)

Next, referring to FIG. 2, a depositing step will be described below. When the irradiation with the energy beam 12 is stopped after the surface of the material substrate 10 is melted in the melting step, the temperature of the surface of the material substrate 10 gradually declines so that the surface of the material substrate 10 is solidified. At this time, the second material (Fe) is moved to the high temperature region 11H, and the second material is deposited in a portion of the high temperature region 11H where is solidified at the end. Thus, the second material is deposited in a position corresponding to the high temperature region 11H to form a substantially planar-shaped deposited region 14. Therefore, a substrate 15 with a pattern of the deposited region 14 can be obtained.

In this case, "planar-shaped" means substantially flat, as the height from the surface of the substrate 15 is as low as surface roughness, for example, less than 1 nm.

As the high temperature region 11H is linearly aligned in a one-dimensional direction corresponding to the groove 13A, the deposited region 14 is formed in a linear pattern arranged in a one-dimensional direction corresponding to the high temperature region 11H. The width (line width) W of the deposited region 14, that is, the dimension of the deposited region 14 in a modulation direction of the heat distribution 11 is determined by the content of the second material (iron) in the material substrate 10, so the more the content of the second material is, the larger the width W of the deposited region 14 becomes. In principle, the width W of the deposited region 14 can have an arbitrary value larger than the size of the atom of the second material, so by controlling the content of the second material in the material substrate 10, the width W of the deposited region 14 can be less than 50 nm which is impossible to achieve by a conventional photolithography technique.

The specific value of the width W of the deposited region 14 is determined by the second material and the use of the deposited region 14. For example, as shown in FIG. 3 which will be described later, in the case where the carbon nanotube structure 17 in which a plurality of carbon nanotubes 16 are linearly aligned through the use of iron deposited in the deposited region 14 as a catalyst, the width W of the deposited region 14 is preferably within a range from 0.4 nm to less than 50 nm, because the diameter of the carbon nanotubes 16 is 0.4 nm minimum.

The width W of the deposited region 14 is more preferably within a range from 0.4 nm to 30 nm, because many carbon nanotubes 16 have a diameter ranging from 0.4 nm to 30 nm.

Moreover, the width W of the deposited region 14 is more preferably within a range from 0.4 nm to 10 nm. It is because a possibility that a large number of carbon nanotubes 16 closely rise in the width direction of the deposited region 14 is reduced, so in the case where the carbon nanotube structure 17 is used as, for example, a field electron emission device (emitter), a decline in electric field strength on the surface of each carbon nanotube 16 can be prevented, and an applied voltage which is necessary for electric field emission can be reduced. Moreover, it is because in the case where the carbon nanotube structure 17 is used as, for example, a recording apparatus (memory), in some cases, it is necessary to form only one carbon nanotube 16 in one deposited region 14 in a width direction, so the diameter of the carbon nanotube 16 preferably matches the width W of the deposited region 14.

Moreover, a spacing L between the deposited regions 14, that is, a spacing (pitch) between the deposited regions 14 in a modulation direction of the heat distribution 11 is determined by the spatial period T of the heat distribution 11, that is, the periodic spacing P in the diffraction grating 13 and the wavelength λ of the energy beam 12. The smaller the wavelength λ is, or the smaller the periodic spacing P is, the more the spacing L between the deposited regions 14 can be reduced, and the deposited regions 14 can be formed with a fine spacing L which is impossible to achieve by conventional photolithography.

The spacing L between the deposited regions 14 is preferably 100 nm or less, for example. In the conventional photolithography, the resolution limit is 50 nm, therefore, a minimum pattern which can be formed by the conventional photolithography includes, for example, a projection of 50 nm, a depression of 50 nm, and a projection of 50 nm, and a spacing between the patterns is twice as large as the resolution limit, that is, 100 nm. Further, the spacing L between the deposited regions 14 is more preferably 50 nm or less. It is because the resolution limit in conventional electron beam lithography is approximately 25 nm, so a spacing between minimum patterns which can be formed by the conventional electron beam lithography is twice as large as the resolution limit, that is, 50 nm.

Thus, the catalyst arranging step is completed, and the substrate 15 including the deposited regions 14 on the material substrate 10 is formed.

(Growing Step)

Next, referring to FIG. 3, a growing step will be described below. Carbon nanotubes 16 are grown on the substrate 15 by a CVD (Chemical Vapor Deposition) method. As growing conditions, for example, methane ($CH_4$) is used as a carbon compound which is the material of the carbon nanotubes 16, and iron deposited on the deposited regions 14 is used as a catalyst, and the growing step is carried out at 900° C. for 15 minutes. The carbon nanotubes 16 are grown only in the deposited regions 14, so the carbon nanotube structure 17 in which a plurality of carbon nanotubes 16 are linearly aligned according to the patterns of the deposited regions 14 is formed on the substrate 15. The diameter of the carbon nanotubes 16 can be determined by the kind of the carbon compound as the material of the carbon nanotubes 16 and growing conditions.

Thus, in the embodiment, the pattern of the deposited region 14 made of iron having a catalyst function for forming the carbon nanotube 16 is formed and aligned through the use of melting by the modulated heat distribution 11, and the carbon nanotubes 16 are grown through the use of the patterns of the deposited regions 14, so the patterns of the deposited regions 14 having a fine width W which is impossible to achieve by the conventional photolithography are formed with a fine spacing L which is impossible to achieve by the conventional photolithography through controlling the heat distribution 11, and the carbon nanotube structure 17 in which carbon nanotubes 16 are regularly aligned according to the patterns of the deposited regions 14 can be formed on the substrate 15.

Moreover, the substrate 15 including the patterns of the deposited regions 14 can be formed by a dry process, so compared to a process using the conventional photolithography, the embodiment can obtain advantages that the production is easier; the reproducibility is superior; and the cost can be reduced.

Further, in the embodiment, after the heat distribution 11 is applied to the surface of the material substrate 10 made of silicon including iron as an additive so as to melt the surface of the material substrate 10, the heat of the surface of the material substrate 10 is dissipated, so iron can be selectively deposited in a position corresponding to the heat distribution 11 so as to form the pattern of the substantially planar-shaped deposited region 14.

In addition, in the embodiment, the heat distribution 11 is applied through diffracting the energy beam 12, so when the periodic spacing P in the diffraction grating 13 is reduced, the spatial period T of the heat distribution 11 can be easily controlled, and the spacing L between the deposited regions 14 can be finer with high precision.

Second Embodiment

Next, a second embodiment of the invention will be described below. The embodiment further includes a height equalizing step of forming tips of the carbon nanotubes 16 in a predetermined plane after the carbon nanotube structure 17 is formed according to the first embodiment, and forming the tips into open tips (open ends).

In the embodiment, "height" means the position of the tip of the carbon nanotube 16, that is, a distance between the surface of the material substrate 10 and the tip of the carbon nanotube 16. Therefore, the height of the carbon nanotube 16 may be different from the length of the carbon nanotube 16, that is, an actual dimension in an extending direction.

(Height Equalizing Step)

Figure 4A:
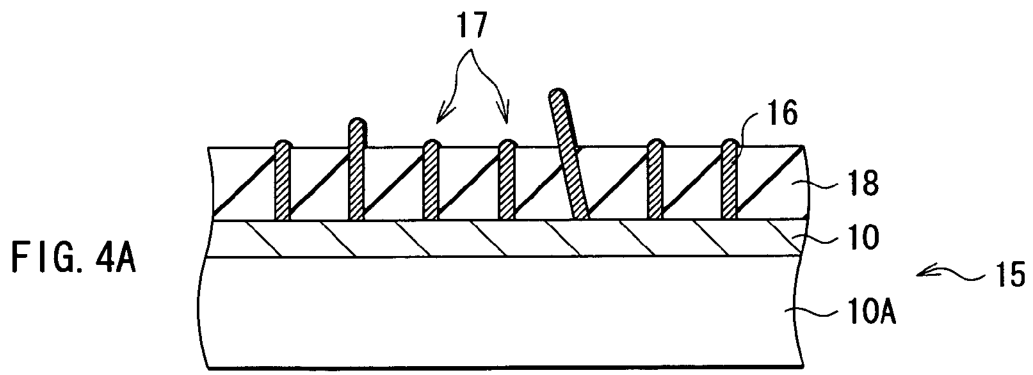
FIGS. 4A and 4B are schematic sectional views showing a height equalizing step in a method of manufacturing a carbon nanotube according to a second embodiment of the invention.

The height equalizing step will be described below referring to FIGS. 4A and 4B. At first, as shown in FIG. 4A, a fixing layer 18 is formed around the carbon nanotubes 16 to fix the carbon nanotubes 16 by the fixing layer 18. As the material of the fixing layer 18, for example, an insulating material such as silicon dioxide ($SiO_2$), silicon nitride (SiN), polyimide, poly methyl methacrylate (PMMA) or a metal oxide film, or a semiconductor material such as silicon or germanium is used. As a method of forming the fixing layer 18, for example, a plasma enhanced CVD (PECVD) method, a PVD (Physical Vapor Deposition) method, a SOG (Spin On Glass) method or the like is used. The thickness of the fixing layer 18 is not specifically limited.

Figure 4B:
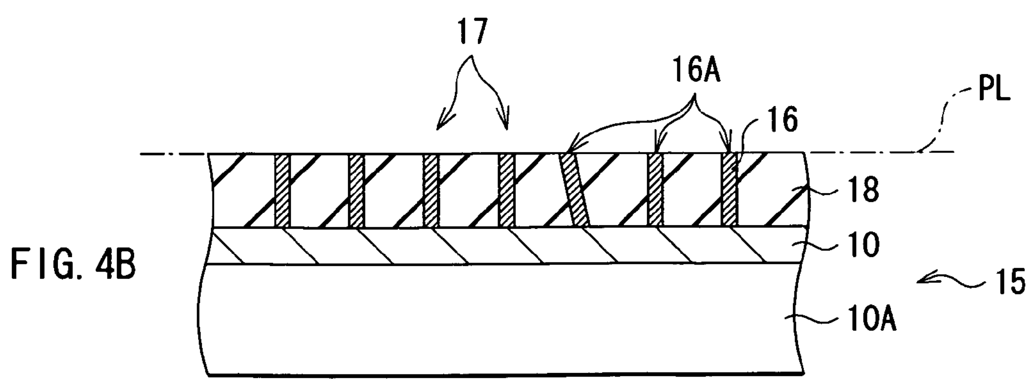

Next, as shown in FIG. 4B, for example, the carbon nanotubes 16 together with the fixing layer 18 are polished by a CMP (Chemical Mechanical Polishing) method. Thereby, the tips of the carbon nanotubes 16 are aligned in the same plane PL, and the tips are opened by polishing to form open tips 16A.

Thus, the carbon nanotubes 16 which are aligned in a desired pattern on the substrate 15, and in which the tips thereof are formed in a predetermined plane PL, and the open tips 16A are formed at the tips can be obtained. Therefore, the heights of the carbon nanotubes 16 in the carbon nanotube structure 17 can be equalized. Moreover, the fixing layer 18 is formed around the carbon nanotubes 16 to fix the carbon nanotubes 16 by the fixing layer 18. Thereby, the carbon nanotube 16 can be tougher, and the carbon nanotube structure 17 can be easily handled.

In the embodiment, the tips of the carbon nanotubes 16 are aligned in the same plane PL. For example, in the case where the carbon nanotube structure 17 is used as an FED, even if there is a carbon nanotube 16 which is grown at an angle with respect to the surface of the material substrate 10, electric field emission from all carbon nanotubes 16 can be performed, thereby a uniform emission property can be obtained. Moreover, as the tips of the carbon nanotubes 16 are the open tips 16A, the electric field emission property can be superior, thereby electric field emission can be performed at a low voltage.

In the embodiment, the case where the fixing layer 18 is used as a planarization layer at the time of polishing shown in FIG. 4B is described; however, the fixing layer 18 which is not polished and in a state shown in FIG. 4A can be used for, for example, an FED. In this case, the carbon nanotubes 16 are fixed by the fixing layer 18, so the carbon nanotubes 16 can be tougher, and the carbon nanotube structure 17 can be easily handled.

Third Embodiment

Next, a method of manufacturing a carbon nanotube according to a third embodiment of the invention will be described below. In the method according to the embodiment, a desired material is included in tip portions of the carbon nanotubes 16 in the growing step in the first embodiment. The obtained carbon nanotube structure 17 can be used for various uses, for example, depending upon the included material, and in the embodiment, a magnetic material, for example, iron is included so that the carbon nanotube structure 17 can be used as a recording apparatus.

As a method of including a desired material at the time of growing the carbon nanotubes 16, a VLS (Vapor-Liquid-Solid) method which is a kind of the CVD method can be used. The VLS method uses an effect that a gas including carbon is decomposed to form alloy drops including carbon and a metal having a catalyst function, and carbon nanotubes 16 are grown on the alloy drops in one direction. In the VLS method, as the carbon nanotubes 16 grow, iron as a catalyst moves to the tips of the carbon nanotubes 16, so iron can be included in the tips of the carbon nanotubes 16. Therefore, the carbon nanotube structure 17 in which the carbon nanotubes 16 including iron in the tips thereof are aligned in a desired pattern can be obtained. A phenomenon that iron is included in the tips of the carbon nanotubes 16 is described in the above-described document, Masafumi Ata and other three, Japanese Journal of Applied Physics (Jpn. J. Appl. Phys.), 1995, Vol. 34, p. 4207-4212.

In the embodiment, for example, iron is deposited in the deposited regions 14, and while the carbon nanotubes 16 are grown through the use of iron as a catalyst, iron is included in the tips of the carbon nanotubes 16. Therefore, when the material deposited in the deposited region 14 is changed, a desired material can be included in the tips of the carbon nanotubes 16. As the desired material included in the carbon nanotubes 16, any material having a function as a metal catalyst for forming a carbon nanotube may be used, and as specific examples of the desired material are the same as those exemplified as the second material in the first embodiment.

Moreover, depending upon uses, as the desired material included in the carbon nanotubes 16, a dielectric material exemplified as the second material in the first embodiment, or a conductive material may be used.

Thus, in the embodiment, when the carbon nanotubes 16 are grown, iron is included in the tips of the carbon nanotubes 16, so the carbon nanotube structure 17 in which the carbon nanotubes 16 including iron in the tips thereof are aligned in a desired pattern can be obtained.

Method of Manufacturing Recording Apparatus

Fourth Embodiment

Next, a method of manufacturing a recording apparatus according to a fourth embodiment of the invention will be described below. The method according to the embodiment includes an inserting step of inserting a magnetic material from the open tips 16A of the carbon nanotubes 16 with a uniform height obtained in the second embodiment into tip portions of the carbon nanotubes 16. The obtained carbon nanotube structures 17 is used, for example, for a recording apparatus.

(Inserting Step)

Figure 5A:
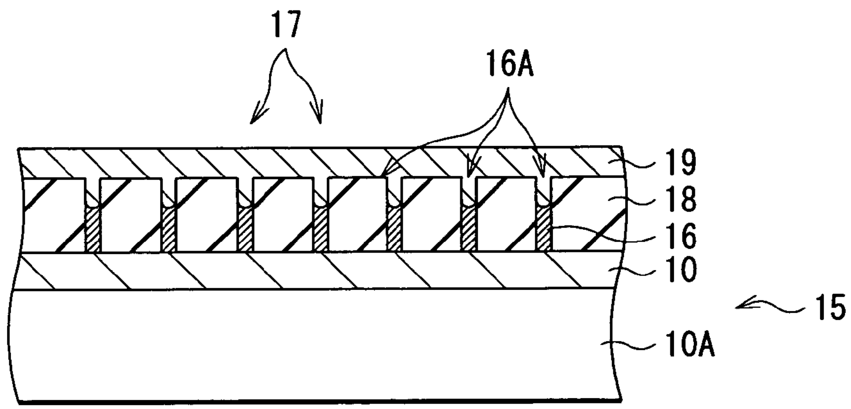
FIGS. 5A and 5B are schematic sectional views showing an inserting step in a method of manufacturing a recording apparatus according to a fourth embodiment of the invention.
Figure 5B:
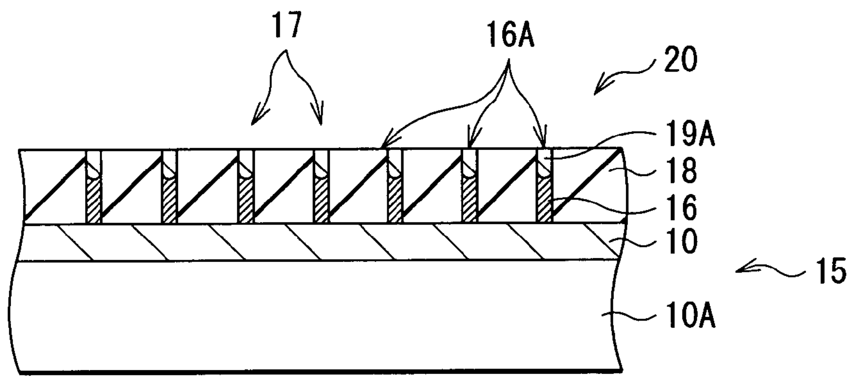

Referring to FIGS. 5A and 5B, the inserting step will be described below. At first, as shown in FIG. 5A, a thin film 19 made of, for example, a magnetic material such as iron is formed on the fixing layer 18 by, for example, a spin coating method, a vapor deposition method or a PVD method so as to block the open tips 16A. At this time, the thin film 19 enters into the carbon nanotubes 16 from the open tips 16A.

Next, as shown in FIG. 5B, the thin film 19 is polished by, for example, the CMP method until the fixing layer 18 is exposed, thereby the thin film 19 except for a portion entered in the carbon nanotubes 16 is removed. Therefore, a magnetic layer 19A made of iron is inserted around the tips of the carbon nanotubes 16, and the carbon nanotubes 16 in which a desired material is inserted in at least the tip portions thereof can be obtained.

Thus, the recording apparatus 20 according to the embodiment is formed. The recording apparatus 20 includes the carbon nanotubes 16 aligned in a desired pattern on the substrate 15, and the magnetic layer 19A made of a magnetic material inserted in at least the tip portions of the carbon nanotubes 16. The recording apparatus 20 includes the carbon nanotube structure 17 in which the carbon nanotubes 16 are aligned in a desired fine pattern, and the magnetic layer 19A made of iron is inserted into each carbon nanotube 16, so the length of magnetization can have a small dimension which is impossible to achieve by the conventional photolithography, so the recording density can be extremely high. The magnetic layer 19A inserted in each carbon nanotube 16 is separated from the magnetic layers 19A in other adjacent carbon nanotubes 16, so writing and reading of information on each magnetic layer 19A can be securely performed.

Moreover, as in the case of the second embodiment, the tips of the carbon nanotubes 16 are formed in a predetermined plane, and the tips are the open tips 16A. Therefore, the heights of the carbon nanotubes 16 in the carbon nanotube structure 17 can be equalized. Further, the fixing layer 18 is formed around the carbon nanotubes 16 to fix the carbon nanotubes 16 by the fixing layer 18. Therefore, the carbon nanotubes 16 can be tougher, and the recording apparatus 20 can be easily handled.

Figure 6:
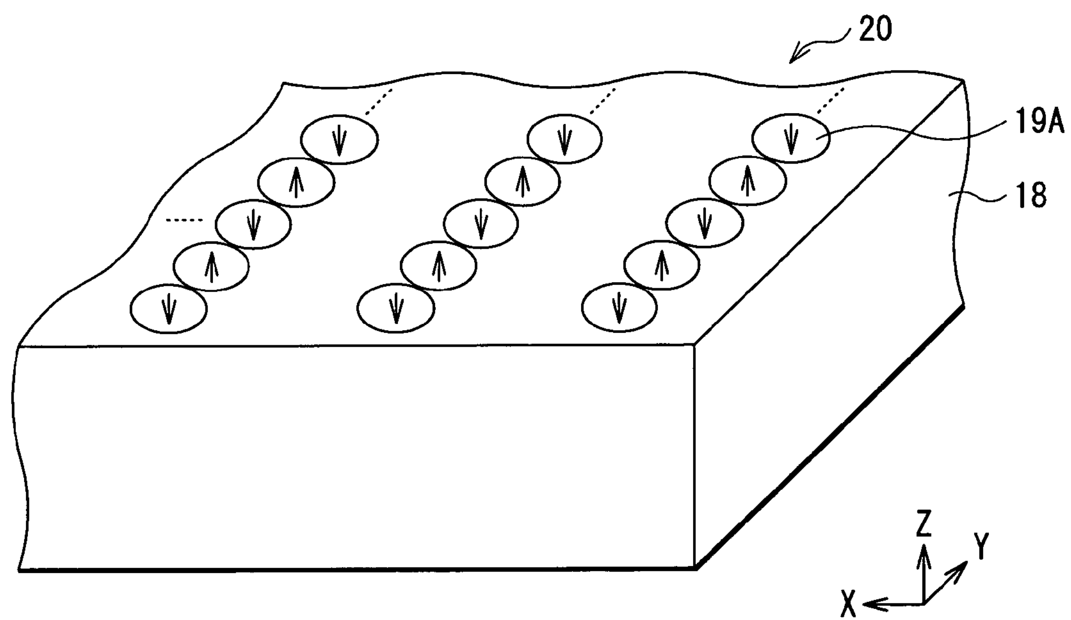
FIG. 6 is a schematic perspective view of an example of a recording state in the recording apparatus shown in FIGS. 5A and 5B.

FIG. 6 shows an example of a recording state in the recording apparatus 20. In the recording apparatus 20, as shown by arrows, recording (writing) and reproducing (reading) of a signal can be performed through controlling the magnetization directions of the magnetic layers 19A. As writing and reading of the signal, the signal may be written, for example, through generating a magnetic flux in a predetermined direction by a fine coil (not shown), and the signal may be read by a GMR head, or writing and reading of the signal may be performed by a so-called magneto-optical system.

Writing and reading on the recording apparatus 20 by, for example, the magneto optical system will be described below. Writing on the recording apparatus 20 is performed through the following steps. The temperature of the magnetic layers 19A made of iron is increased to a Curie temperature to align the magnetization directions of the magnetic layers 19A to a predetermined direction (deletion mode) by a bias magnetic field. After that, the magnetization direction of the bias magnetic field is aligned in a direction opposite to the deletion mode, and the temperature of only the magnetic layer 19A of a specific carbon nanotube 16 is increased by a laser beam of which the spot diameter is reduced by an optical lens (not shown), and the irradiation with a laser beam is stopped, thereby the magnetization direction of the magnetic layer 19A is changed to a direction opposite to that at the time of the deletion. Moreover, reading from the recording apparatus 20 is performed through, for example, the following steps. The magnetic layers 19A in the carbon nanotubes 16 are irradiated with a laser beam to detect the Kerr rotation angle of reflected light of the laser beam, thereby the magnetization direction of each magnetic layer 19A can be obtained as a reproducing signal. At this time, in the embodiment, the magnetic layers 19A are separated by the carbon nanotubes 16, so a predetermined magnetization direction can be stably kept without an influence of the magnetic layers 19A in adjacent carbon nanotubes 16.

Thus, in the embodiment, the carbon nanotube structure 17 in which the carbon nanotubes 16 are aligned in a desired fine pattern is included, and the magnetic layer 19A made of iron is inserted in each carbon nanotube 16, so a recording apparatus 20 with an extremely high recording density can be achieved. Moreover, the magnetic layers 19A are separated by the carbon nanotubes 16, so a predetermined magnetization direction can be stably kept for a long term without an influence of the magnetic layers 19A in adjacent carbon nanotubes 16. Therefore, the reliability of the recording apparatus 20 can be improved.

<<Modifications of Method of Manufacturing Tubular Carbon Molecule>>

Before describing a method of manufacturing a field electron emission device and a method of manufacturing an FED, modifications (1 through 11) of the method of manufacturing a carbon nanotube according to the first embodiment will be described below. The carbon nanotube manufactured by these modifications can be used for manufacturing the carbon nanotube 16 of which the height is equalized as shown in FIGS. 4A and 4B as in the case of the second embodiment. Moreover, through the use of the carbon nanotube manufactured by the modifications, the carbon nanotube 16 in which a desired material is included in a tip portion thereof as in the case of the third embodiment can be manufactured, or the recording apparatus 20 shown in FIG. 5A through 6 as in the case of the fourth embodiment can be manufactured. Further, the carbon nanotube manufactured by the modifications can be applied to a field electron emission device and an FED which will be described later.

[Modification 1]

At first, referring to FIGS. 7 through 13, Modification 1 will be described below. In the modification, in the melting step, the energy amount of an energy beam is modulated in a two-dimensional direction, that is, an X direction and a Y direction to apply an X-direction heat distribution 31X and a Y-direction heat distribution 31Y to the surface of the material substrate 10.

(Melting Step)

At first, referring to FIG. 7, the melting step will be described below. The X-direction heat distribution 31X includes an X-direction high temperature region 31XH and an X-direction low temperature region 31XL which are periodically formed through modulating the surface temperature of the material substrate 10 in an X direction. The Y-direction heat distribution 31Y includes a Y-direction high temperature region 31YH and a Y-direction low temperature region 31YL which are periodically formed through modulating the surface temperature of the material substrate 10 in a Y direction.

The X-direction heat distribution 31X and the Y-direction heat distribution 31Y are applied, for example, through diffracting the energy beam 12 by a diffraction grating 32 in which a non-transmission portion 32A and a transmission portion 32B are aligned in a two-dimensional direction. As the diffraction grating 32, for example, a diffraction grating in which a mask where the energy beam 12 does not pass is printed on the non-transmission portion 32A, or the like can be used.

Figure 8:
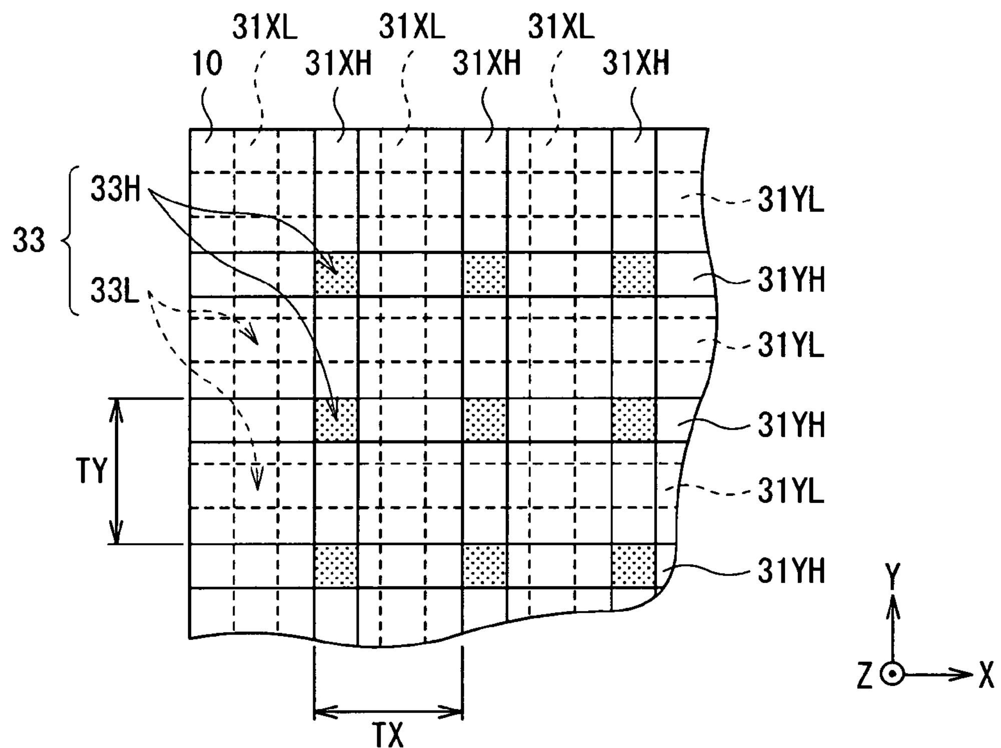
FIG. 8 is a schematic plan view of an example of a heat distribution formed on a surface of a material substrate shown in FIG. 7.

FIG. 8 shows a state where a heat distribution 33 is formed through overlaying the X-direction temperature distribution 31X and the Y-direction temperature distribution 31Y on the surface of the material substrate 10. As shown in FIG. 8, the heat distribution 33 including the high temperature region 33H in a position where the X-direction high temperature region 31XH and the Y-direction high temperature region 31YH are overlapped with each other, and the low temperature region 33L in a position where the X-direction low temperature region 31XL and the Y-direction low temperature region 31YL are overlapped with each other is formed on the surface of the material substrate 10. Thereby, the high temperature region 33H is aligned in a two-dimensional direction along a direction where the non-transmission portion 32A and the transmission portion 32B are aligned.

A spatial period TX in an X direction in the heat distribution 33, that is, a spacing (pitch) between the high temperature regions 33H in an X direction is determined by a periodic spacing PX in an X direction in the diffraction grating 32 and the wavelength λ of the energy beam 12. Moreover, a spatial period TY in a Y direction in the heat distribution 33, that is, a spacing (pitch) between the high temperature regions 33H in a Y direction is determined by a spatial spacing PY in a Y direction in the diffraction grating 32 and the wavelength λ of the energy beam 12. The smaller the wavelength λ is, or the smaller the periodic spacings PX and PY are, the more the spatial periods TX and TY in the heat distribution 33 can be reduced. In the embodiment, the periodic spacing PX in an X direction in the diffraction grating 32 means the sum of a dimension of one non-transmission portion 32A in an X direction and a dimension of one transmission portion 32B in an X direction, and the periodic spacing PY in a Y direction in the diffraction grating 32 means the sum of a dimension of one non-transmission portion 32A in a Y direction and a dimension of one transmission portion 32B in a Y direction.

Figure 9:
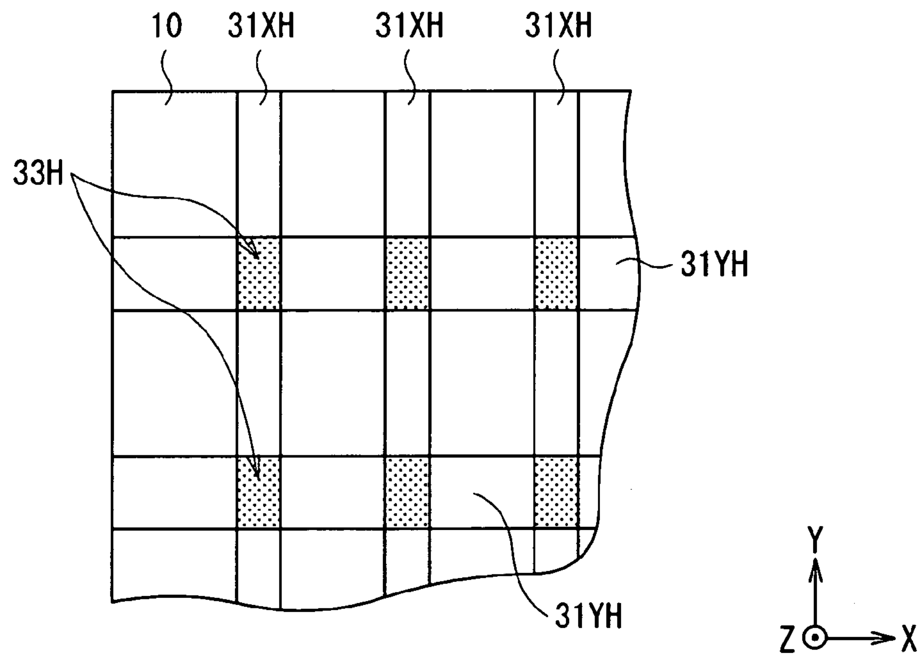
FIG. 9 is a plan view of another example of the heat distribution shown in FIG. 7.

The periodic spacing PX in an X direction and the periodic spacing PY in a Y direction in the diffraction grating 32 can be separately set. Therefore, as shown in FIG. 9, the spatial period TX in an X direction and the spatial period TY in a Y direction in the heat distribution 33 can be separately set.

As the diffraction grating 32, instead of a diffraction grating in which the non-transmission portion 32A and the transmission portion 32B are formed by mask printing, a diffraction grating in which a depression portion or a projection portion is formed can be used. In the case of the diffraction grating 32 in which projections and depressions are formed, the periodic spacing PX in an X direction in the diffraction grating 32 means a spacing (pitch) between the depression portions (or projection portions) in an X direction, and the periodic spacing PY in a Y direction in the diffraction grating 31 means a spacing (pitch) between the depression portions (or the projection portions) in a Y direction.

The energy amount of the energy beam 12 is set so that the temperature reaches a temperature at which the surface of the material substrate 10 in the low temperature region 33L is melted. Thereby, the whole surface of the material substrate 10 can be melted. At this time, when an excimer laser is used as the energy beam 12, the energy amount can be controlled by the number of irradiation with pulses of emitted light.

(Depositing Step)

Figure 10:
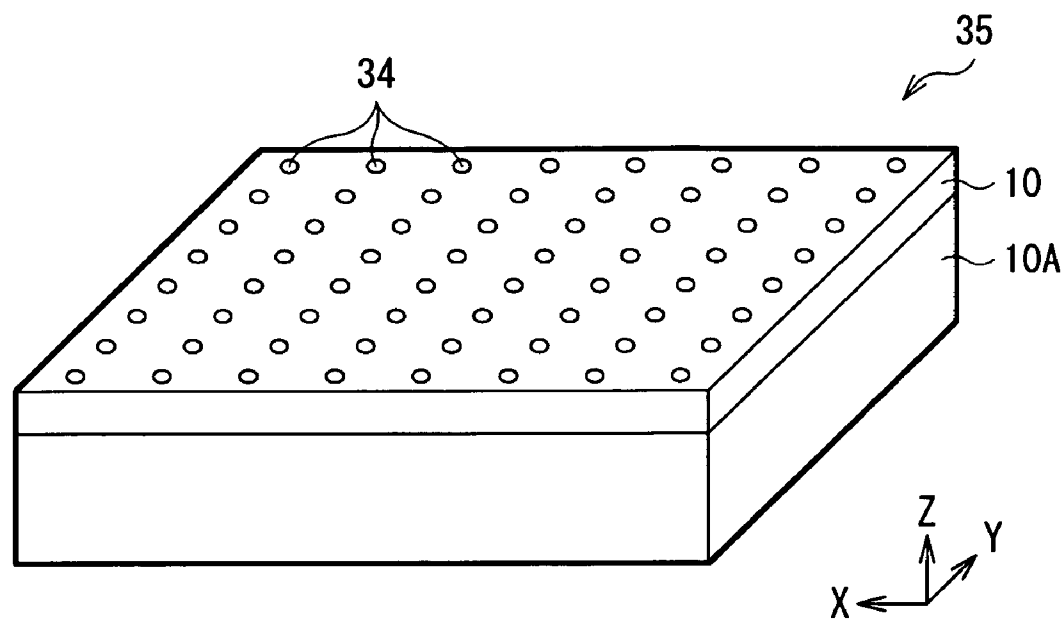
FIG. 10 is a schematic perspective view showing a step (depositing step) following the step of FIG. 7.
Figure 11:
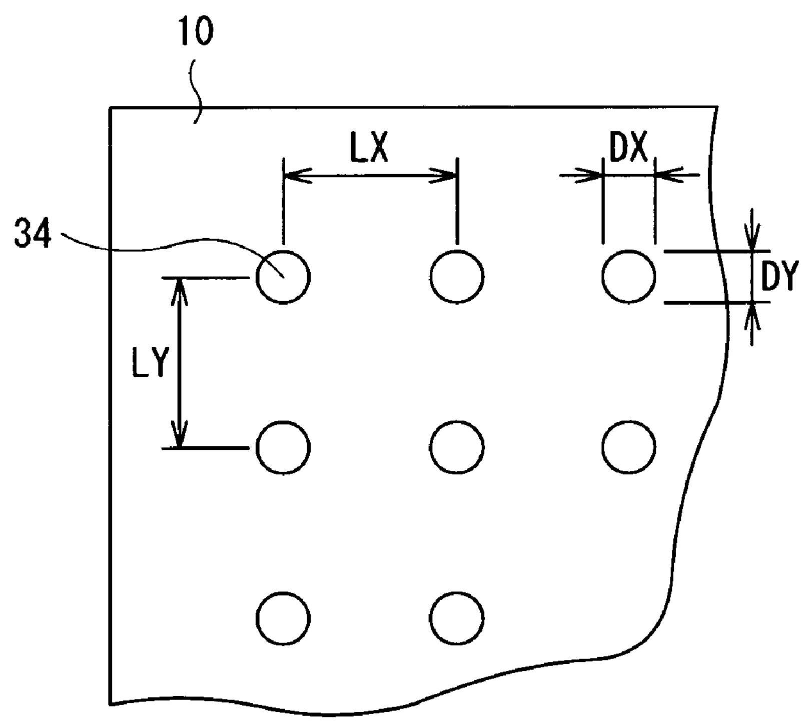
FIG. 11 is an enlarged plan view of a part of the surface of the material substrate shown in FIG. 10.

Next, referring to FIGS. 10 and 11, a depositing step will be described below. After the whole surface of the material substrate 10 is melted in the melting step, the irradiation with the energy beam 12 is stopped, and the heat of the surface of the material substrate 10 is dissipated so that the second material is deposited in a position corresponding to the heat distribution 33, that is, a position corresponding to the high temperature region 33H, thereby a substantially planar-shaped deposited region 34 is formed. Therefore, a substrate 35 with a pattern of the deposited region 34 can be obtained.

As the high temperature region 33H is aligned in a two-dimensional direction on the surface of the material substrate 10, the deposited region 34 is formed as a point-like pattern aligned in a two-dimensional direction on the surface of the material substrate 10 according to the high temperature region 33H. A dimension (diameter) DX in an X direction and a dimension (diameter) DY in a Y direction in the deposited region 34 are determined by the content of the second material in the material substrate 10. The larger the content of the second material is, the more the dimensions DX and DY of the deposited region 34 increase. The dimensions DX and DY of the deposited region 34 can be an arbitrary value larger than the size of the atom of the second material, so by controlling the content of the second material in the material substrate 10, the dimensions DX and DY of the deposited region 34 can be less than 50 nm which is impossible to achieve by the conventional photolithography technique.

Figure 12:
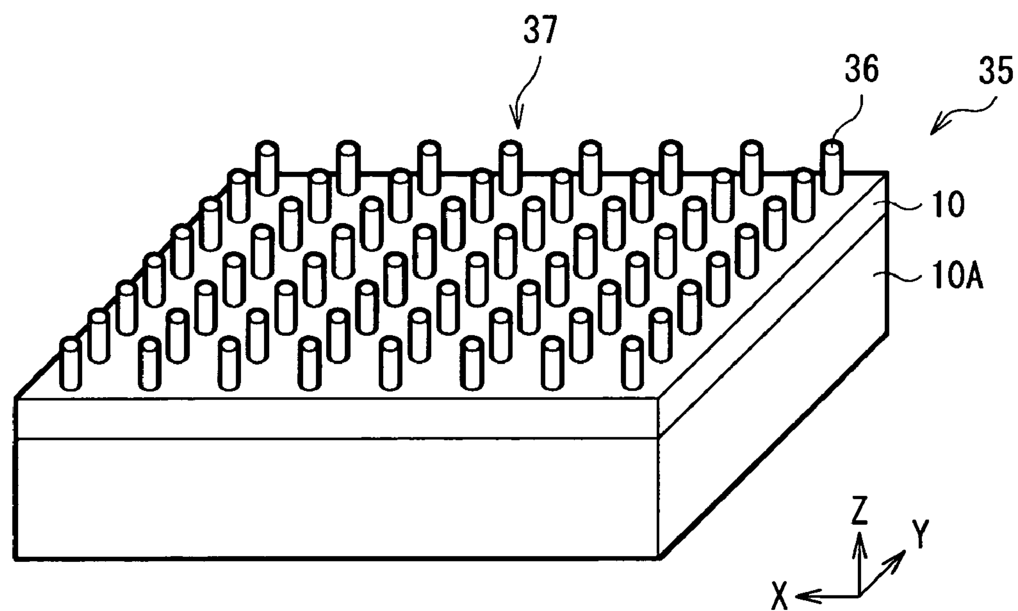
FIG. 12 is a schematic perspective view showing a step (growing step) following the step of FIG. 10.

Specific values of the dimensions DX and DY of the deposited region 34 are determined by the second material and the use of the deposited region 34; however, for example, as shown in FIG. 12, in the case where a carbon nanotube structure 37 in which a plurality of carbon nanotubes 36 are two-dimensionally aligned is formed through the use of iron deposited on the deposited region 34 as a catalyst, the dimensions DX and DY of the deposited region 34 are preferably within a range from 0.4 nm to less than 50 nm. It is because the diameter of the carbon nanotube 36 is 0.4 nm minimum.

The dimensions DX and DY of the deposited region 34 are more preferably within a range from 0.4 nm to 30 nm. It is because many carbon nanotubes 36 have a diameter ranging from 0.4 nm to 30 nm.

Moreover, the dimensions DX and DY of the deposited region 34 are more preferably within a range from 0.4 nm to 10 nm. It is because a possibility that a large number of carbon nanotubes 16 closely rise in an X direction or a Y direction in the deposited region 34 is reduced, so in the case where the carbon nanotube structure 37 is used as, for example, a field electron emission device, a decline in electric field strength on the surface of each carbon nanotube 36 can be prevented, and an applied voltage which is necessary for electric field emission can be reduced. Moreover, it is because in the case where the carbon nanotube structure 37 is used as, for example, a recording apparatus (memory), in some cases, it is necessary to form only one carbon nanotube 36 in one deposited region 34 in an X direction and a Y direction, so the diameter of the carbon nanotube 36 preferably matches the dimensions DX and DY of the deposited region 34.

Moreover, a spacing LX in an X direction and a spacing LY in a Y direction in the deposited region 34 are determined according to the spatial periods TX and TY in the heat distribution 33, that is, the periodic spacings PX and PY in the diffraction grating 32 and the wavelength λ of the energy beam 12. The smaller the wavelength λ is, or the smaller the periodic spacings PX and PY in the diffraction grating 32 are, the more the spacings LX and LY between the deposited regions 34 can be reduced, and the deposited regions 34 can be formed with fine spacings LX and LY which is impossible to achieve by the conventional photolithography.

The spacings LX and LY between the deposited regions 34 are preferably 100 nm or less, for example. In the conventional photolithography, as described above, the resolution limit is 50 nm, therefore, a minimum pattern which can be formed by the conventional photolithography includes, for example, a projection of 50 nm, a depression of 50 nm, and a projection of 50 nm, and a spacing between the patterns is twice as large as the resolution limit, that is, 100 nm. Moreover, the spacings LX and LY between the deposited regions 34 is more preferably 50 nm or less. It is because the resolution limit in conventional electron beam lithography is approximately 25 nm, so a spacing between minimum patterns which can be formed by the conventional electron beam lithography is twice as large as the resolution limit, that is, 50 nm.

Thus, the catalyst arranging step is completed, and a substrate 35 including the deposited regions 34 on the material substrate 10 is formed.

Figure 13:
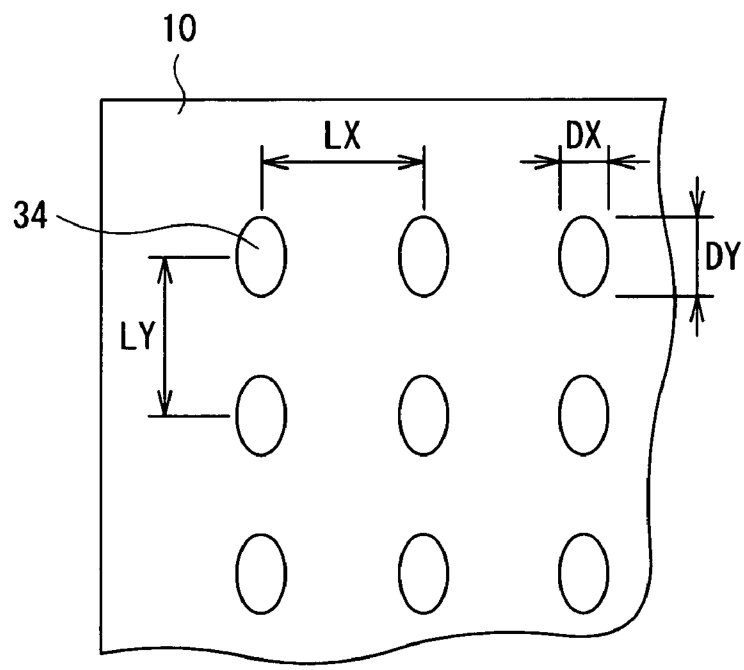
FIG. 13 is an enlarged plan view of a part of the surface of the material substrate in the case where a depositing step is carried out after forming the heat distribution shown in FIG. 9.

As shown in FIG. 9, when the spatial period TX in an X direction and the spatial period TY in a Y direction in the heat distribution 33 are separately set, according to the spatial periods TX and TY, the deposited regions 34 are formed in a oval shape as shown in FIG. 13.

(Growing Step)

Next, referring to FIG. 12, a growing step will be described below. A plurality of carbon nanotubes 36 are grown on the substrate 35 by the CVD method. Growing conditions can be, for example, the same as those in the first embodiment. The carbon nanotubes 36 are grown only in the deposited regions 34, so the carbon nanotube structure 37 in which carbon nanotubes 36 are two-dimensionally aligned according to the patterns of the deposited regions 34 is formed on the substrate 35.

Thus, in the modification, the energy amount of the energy beam 12 is modulated in a two-dimensional direction to form the heat distribution 33, so the patterns of the deposited regions 34 which is aligned in a two-dimensional direction can be formed on the surface of the material substrate 10.

Moreover, the energy beam 12 is diffracted by the diffraction grating 32 to form the heat distribution 33, so when the periodic spacings PX and PY in the diffraction grating 32 are reduced, the spatial periods TX and TY in the heat distribution 33 can be easily controlled, and the spacing LX and LY between the deposited regions 34 can be reduced.

[Modification 2]

Next, referring to FIGS. 14 through 17, Modification 2 will be described below. In the modification, the heat of the surface of the material substrate 10 is dissipated to form a projection on the surface of the material substrate 10, and the second material is deposited on a tip portion of the projection.

(Melting Step)

At first, for example, a melting step is carried out as in the case of FIG. 1 in the first embodiment. At this time, the energy amount of the energy beam 12 is controlled so as to exceed a certain value. For example, in the case where an excimer laser is used as the energy beam 12 as in the case of the first embodiment, the energy amount can be controlled by the number of irradiation with pulses of emitted light, and in the modification, the number of pulse irradiation is 100.

(Depositing Step)

Figure 14:
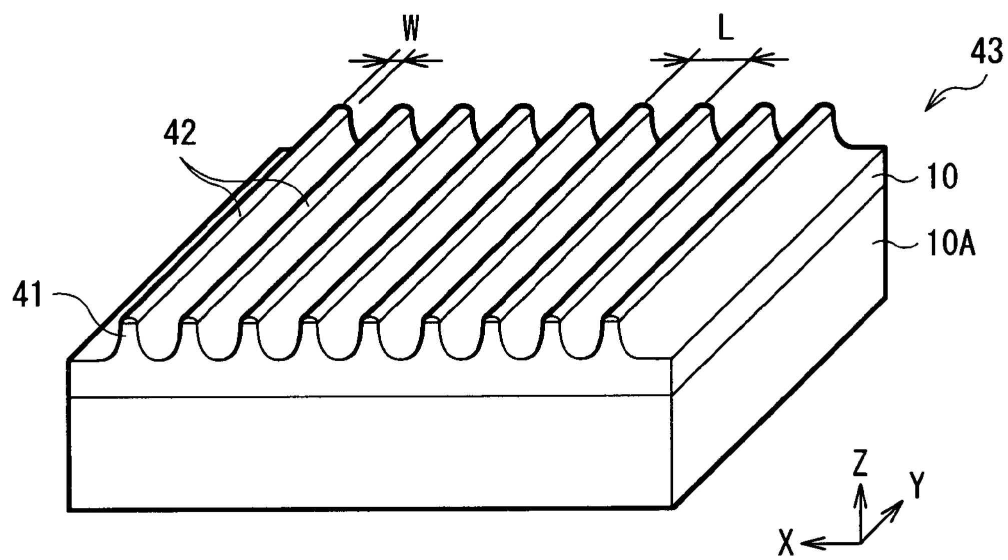
FIG. 14 is a schematic perspective view showing a depositing step in a method of manufacturing a carbon nanotube according to Modification 2 of the invention.

When the irradiation with the energy beam 12 is stopped after the surface of the material substrate 10 is melted in the melting step, in the case where the energy amount of the energy beam 12 applied in the melting step exceeds a certain amount, as shown in FIG. 14, the surface of the material substrate 10 corresponding to the high temperature region 11H is bulged to form a projection 41.

Figure 15:
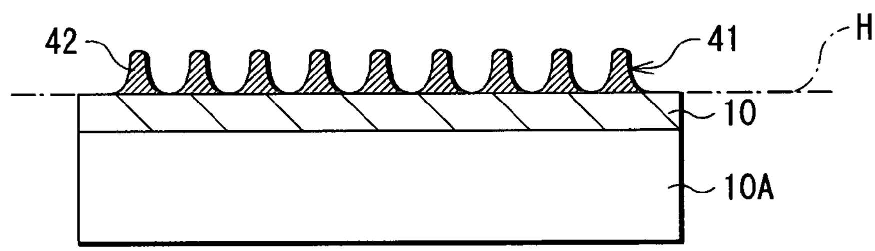
FIG. 15 is a sectional view of a modification of a deposited region shown in FIG. 14.
Figure 16:
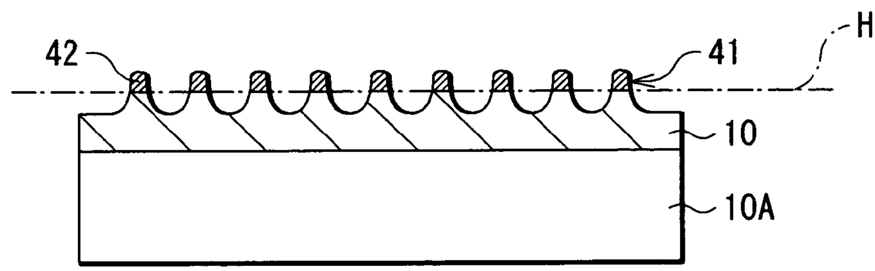
FIG. 16 is a sectional view of another modification of the deposited region shown in FIG. 14.

As the high temperature region 11H is linearly aligned in a one-dimensional direction corresponding to the groove 13A, the projection 41 is formed as the pattern of a linear rib (a projected rim) aligned in a one-dimensional direction corresponding to the high temperature region 11H. The projection 41 is solidified from a portion near the surface of the material substrate 10, so the second material (iron) is deposited around the tip which is solidified at the end to form the deposited region 42. Therefore, the deposited region 42 is formed in a tip portion of the projection 41. Herein, the tip portion is a portion including the tip of the projection 41 in the case where the projection 41 is cut along a horizontal plane H (refer to FIGS. 15 and 16) parallel to the surface of the material substrate 10. For example, the deposited region 42 may be formed only in the tip of the projection 41 as shown in FIG. 14, or the whole projection 41 may be the deposited region 42 as shown in FIG. 15. Alternately, as shown in FIG. 16, the deposited region 42 may be formed in a portion from the tip to a middle point of the projection 41.

Thereby, a substrate 43 including a pattern of the projection 41 in which the deposited region 42 made of iron is formed at least in the tip portion of the projection 41 is obtained.

Herein, "projection" means a projection from the surface of the substrate 43 with a height of 1 nm or more which is higher than the case of a planar-shaped deposited region 14 in the first embodiment.

The width (line width) W of the deposited region 42, that is, a dimension of the deposited region 42 in a modulation direction of the heat distribution 11 is determined by the content of the second material (iron) in the material substrate 10 as in the case of the first embodiment, and the larger the content of the second material (iron) is, the more the width W of the deposited region 42 increased. In principle, the width W of the deposited region 42 can have an arbitrary value larger than the size of the atom of the second material, so by controlling the content of the second material in the material substrate 10, the width W of the deposited region 42 can be less than 50 nm which is impossible to achieve by the conventional photolithography technique.

In the modification, unlike the first embodiment, the deposited region 42 is the projection 41, and the sectional area of the deposited region 42 is reduced toward the tip, so the width of the deposited region 42 can be easily reduced.

Figure 17:
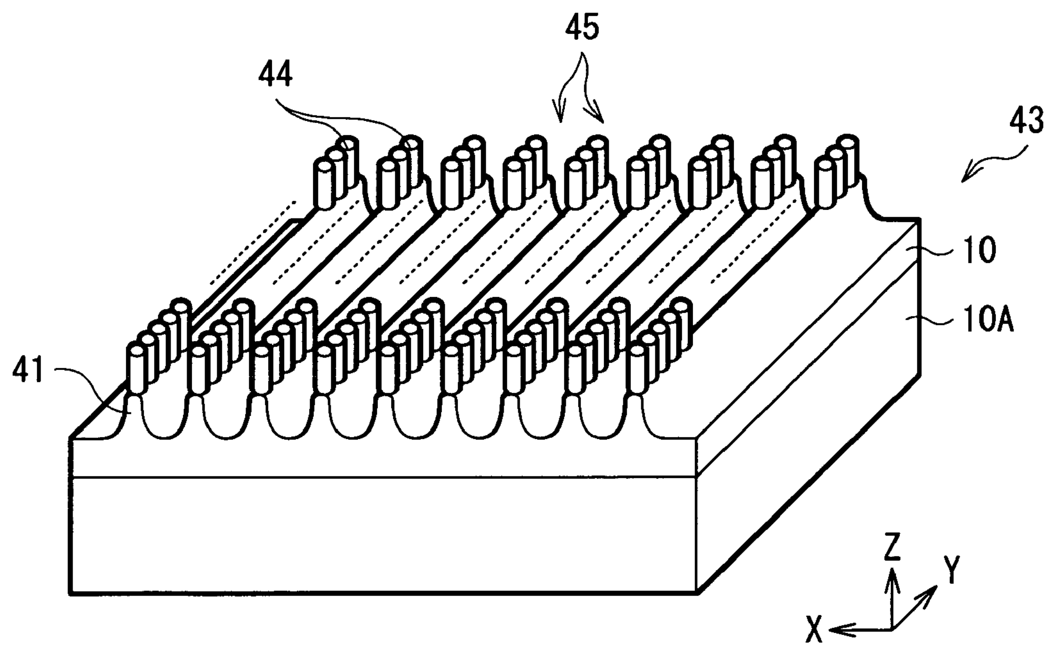
FIG. 17 is a schematic perspective view showing a step (growing step) following the step of FIG. 14.

The specific value of the width W of the deposited region 42 is determined by the second material and the use of the deposited region 42 as in the case of the width W of the deposited region 14 described in the first embodiment. For example, as shown in FIG. 17, in the case where a carbon nanotube structure 45 in which a plurality of carbon nanotubes 44 are linearly aligned is formed through the use of iron deposited in the deposited region 42 as a catalyst, the width W of the deposited region 42 is preferably within a range from 0.4 nm to less than 50 nm, and more preferably within a range from 0.4 nm to 30 nm, and more preferably within a range from 0.4 nm to 10 nm because of the same reasons as those in the first embodiment.

Moreover, a spacing L between the projections 41, that is, a spacing (pitch) between the deposited regions 42 in the modulation direction of the heat distribution 11 is determined according to the spatial period T of the heat distribution 11, that is, the periodic spacing P in the diffraction grating 13 and the wavelength λ of the energy beam 12. The smaller the wavelength λ is, or the smaller the periodic spacing P is, the more the spacing L between the projections 41 can be reduced, and the projections 41 and the deposited regions 42 can be formed with a fine spacing L which is impossible to achieve by the conventional photolithography. For example, the spacing L between the projections 41 is preferably 100 nm or less, and more preferably 50 nm or less because of the same reasons as those in the first embodiment.

Thus, the catalyst arranging step is completed, and the substrate 43 including the deposited region 42 on the tip portion of the projection 41 formed on the material substrate 10 is formed.

(Growing Step)

Next, referring to FIG. 17, a plurality of carbon nanotubes 44 are grown on the substrate 43 by the CVD method. Growing conditions are the same as those in the first embodiment. The carbon nanotubes 44 are grown only in the deposited regions 42, so the carbon nanotube structure 45 in which a plurality of carbon nanotubes 44 are linearly aligned in extreme tip portions of the projections 41 of the substrate 43 is formed.

Thus, in the modification, the projection 41 in which at least the tip portion thereof is made of the second material (iron) is formed in a predetermined position of the material substrate 10, so compared to the case where the pattern is formed in a planar shape, the width of the deposited region 42 can be finer, and compared to the first embodiment and Modification 1, a finer pattern can be formed.

[Modification 3]

Next, referring to FIGS. 18 through 20, Modification 3 will be described below. In the modification, a projection aligned in a two-dimensional direction is formed on the surface of the material substrate 10, and the second material is deposited on a tip portion of the projection.

(Melting Step)

Figure 7:
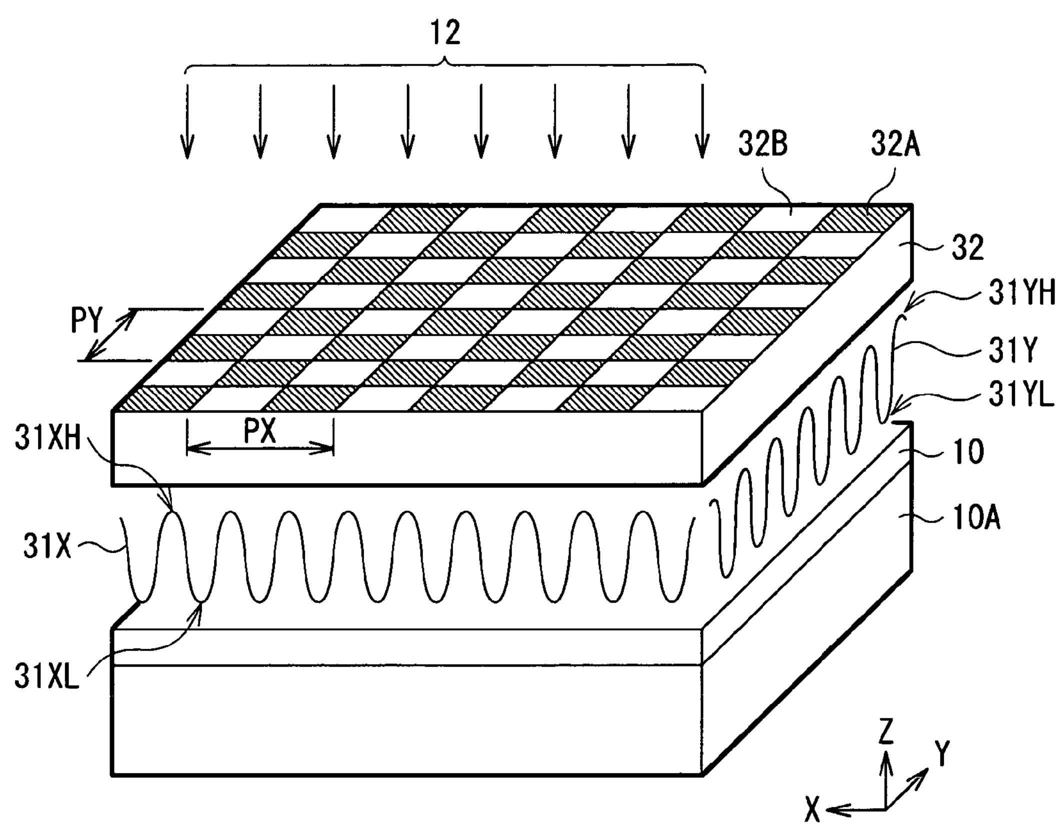
FIG. 7 is a schematic perspective view showing a melting step in a method of manufacturing a carbon nanotube according to Modification 1 of the invention.

At first, for example, as in the case of FIGS. 7 and 8 in Modification 1, a melting step is carried out. At this time, as in the case of Modification 2, the energy amount of the energy beam 12 is controlled so as to exceed a certain amount.

(Depositing Step)

Figure 18:
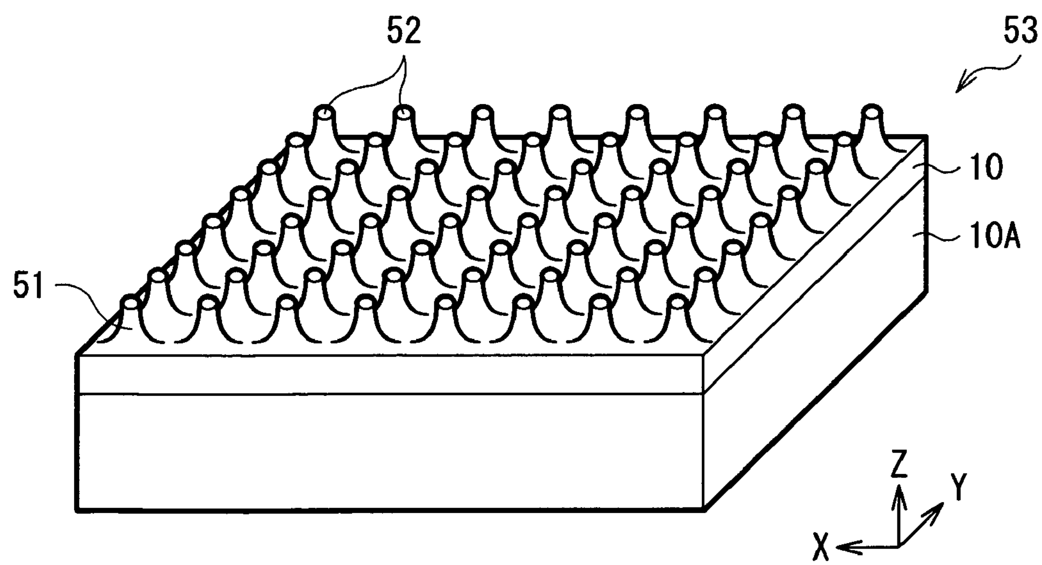
FIG. 18 is a schematic perspective view showing a depositing step in a method of manufacturing a carbon nanotube according to Modification 3 of the invention.
Figure 19:
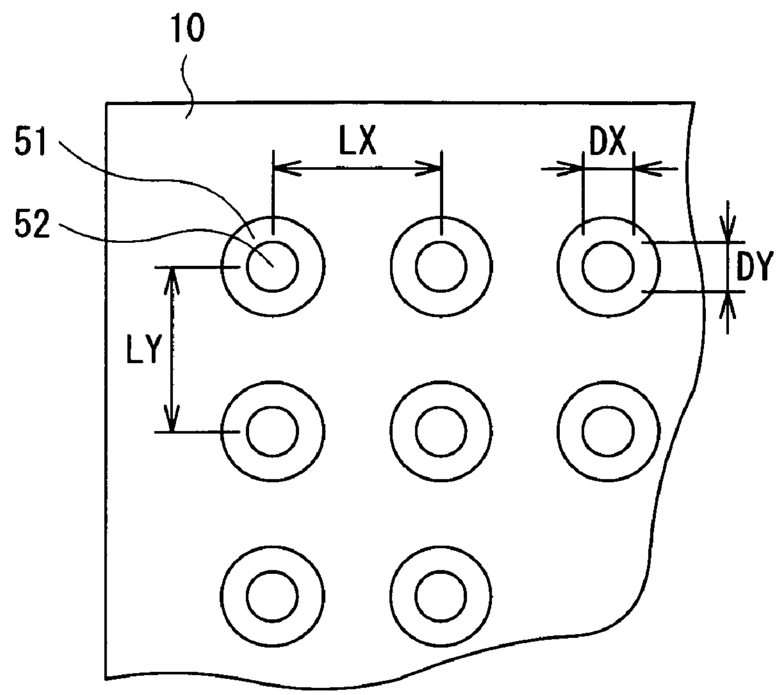
FIG. 19 is an enlarged plan view of a part of a surface of a material substrate shown in FIG. 18.

When the irradiation with the energy beam 12 is stopped after the surface of the material substrate 10 is melted in the melting step, in the case where the energy amount of the energy beam 12 applied in the melting step exceeds a certain amount, as shown in FIGS. 18 and 19, the surface of the material substrate 10 corresponding to the high temperature region 33H is bulged to form a projection 51.

As the high temperature region 33H is aligned in a two-dimensional direction on the surface of the material substrate 10, the projection 51 is formed in a conical pattern aligned in a two-dimensional direction on the surface of the material substrate 10 according to the high temperature region 11H. The projection 51 is solidified from a portion near the surface of the material substrate 10, so the second material is deposited around the tip which is solidified at the end to form a deposited region 52. Therefore, the deposited region 52 is formed in a tip portion of the projection 51. The meaning and the specific example of the tip portion are the same as those described in Modification 2 referring to FIGS. 15 and 16.

Thereby, a substrate 53 including a pattern of the projection 51 in which the deposited region 52 made of iron is formed at least in the tip portion is obtained.

A dimension (diameter) DX in an X direction and a dimension (diameter) DY in a Y direction in the deposited region 52 are determined by the content of the second material (iron) in the material substrate 10, and the larger the content of the second material (iron) is, the more the dimensions DX and DY of the deposited region 52 increases. In principle, the dimensions DX and DY of the deposited region 52 can have an arbitrary value larger than the size of the atom of the second material, so by controlling the content of the second material in the material substrate 10, the dimensions DX and DY of the deposited region 52 can be less than 50 nm which is difficult to achieve by the conventional photolithography technique.

The specific values of the dimensions DX and DY of the deposited region 52 are determined by the second material and the use of the deposited region 52 as in the case of the dimensions DX and DY of the deposited region 34 described in Modification 2. For example, as shown in FIG. 20, in the case where a carbon nanotube structure 55 in which a plurality of carbon nanotubes 54 are aligned in a two-dimensional direction is formed through the use of iron deposited in the deposited region 52 as a catalyst, the dimensions DX and DY of the deposited region 52 are preferably within a range from 0.4 nm to less than 50 nm, and more preferably within a range from 0.4 nm to 30 nm, and more preferably 0.4 nm to 10 nm because of the same reasons as those described in Modification 2.

Moreover, a spacing LX in an X direction and a spacing LY in a Y direction between the projections 51, that is, the deposited regions 52 are determined according to the spatial periods TX and TY of the heat distribution 33, that is, the periodic spacings PX and PY in the diffraction grating 32 and the wavelength λ of the energy beam 12. The smaller the wavelength λ is, or the smaller the periodic spacings PX and PY in the diffraction grating 32 are, the more the spacings LX and LY between the projections 51, that is, the deposited regions 52 can be reduced, and the projections 51 and the deposited regions 52 can be formed with fine spacings LX and LY which are impossible to achieve by the conventional photolithography. The spacings LX and LY between the projections 51, that is, the deposited regions 52 are preferably 100 nm or less, and more preferably 50 nm or less, because of the same reasons as those described in Modification 2.

Thus, the catalyst arranging step is completed, and the substrate 53 including the deposited region 52 on the tip portion of the projection 51 is formed.

(Growing Step)

Figure 20:
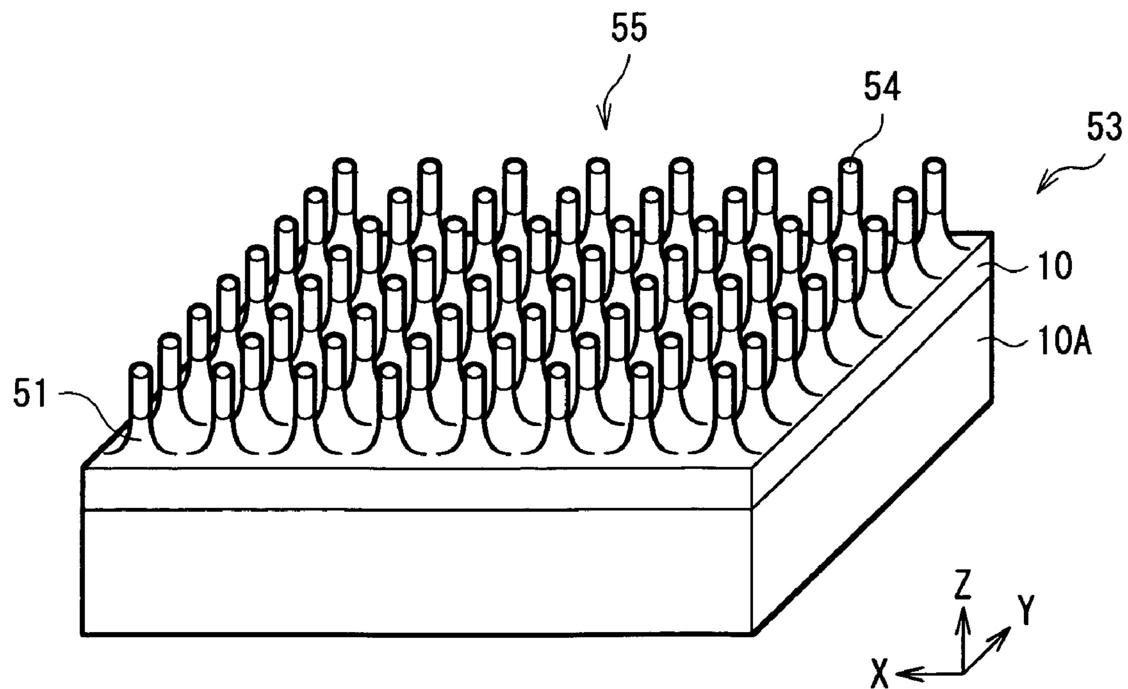
FIG. 20 is a schematic perspective view showing a step (growing step) following the step of FIG. 18.

Next, referring to FIG. 20, a plurality of carbon nanotubes 54 are grown on the substrate 53 by the CVD method. Growing conditions are the same as those in the first embodiment. The carbon nanotubes 54 are grown only in the deposited regions 53, so the carbon nanotube structure 55 in which the carbon nanotubes 54 are aligned in a two-dimensional direction in extreme tip portions of the projections 51 of the substrate 53 is formed.

Thus, in the modification, the pattern of the projection 51 in which at least the tip portion thereof is made of the second material is aligned in a two-dimensional direction in a predetermined position of the material substrate 10, so compared to the planar-shaped deposited region in the first embodiment and Modification 1, the deposited region 52 with a finer dimension can be formed.

[Modification 4]

Next, referring to FIGS. 21 through 25, Modification 4 will be described below. In the modification, the pattern of a projection made of a transfer material is formed on the surface of the material substrate 10 made of a transfer material (in this case, a catalyst metal), and the pattern of the projection is used as a master for transfer to transfer the pattern of the master for transfer to a substrate to be transferred, thereby to obtain a substrate, and a carbon nanotube is grown on the substrate.

More specifically, in the modification, a catalyst arranging step includes "a melting step" of applying the heat distribution 11 modulated according to a desired pattern to the surface of the material substrate 10 so as to melt the surface of the material substrate 10, "a projection forming step" of forming a projection in a position according to the heat distribution 11, that is, in a desired pattern through dissipating the heat of the surface of the material substrate 10, and "a transferring step" of transferring the pattern of the master for transfer to a substrate to be transferred so as to form a substrate.

(Melting Step)

At first, as in the case of Modification 2, a melting step is carried out. At this time, the material substrate 10 is made of iron as a metal catalyst in the embodiment.

The material of the material substrate 10 may be, for example, any material having a function as a metal catalyst for forming a carbon nanotube, and specific examples of the material are the same as those exemplified as the second material in the first embodiment.

(Projection Forming Step, Master Forming Step)

Figure 21:
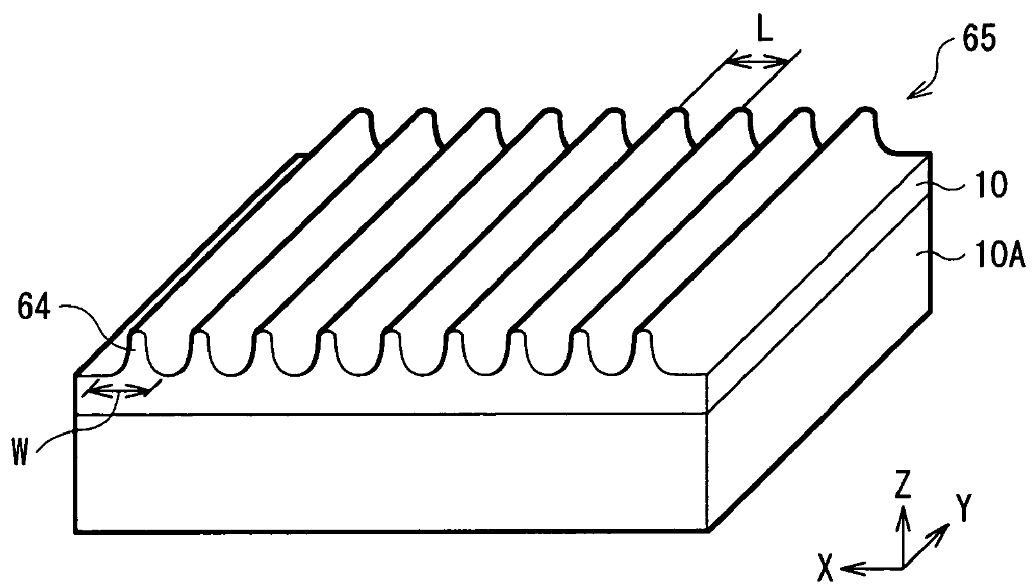
FIG. 21 is a schematic perspective view showing a projection forming step in a method of manufacturing a carbon nanotube according to Modification 4 of the invention.

Next, referring to FIG. 21, the projection forming step will be described below. When the irradiation with the energy beam 12 is stopped after the surface of the material substrate 10 is melted in the melting step, the temperature of the surface of the material substrate 10 gradually declines so that the surface of the material substrate 10 is solidified, and at this time, in the case where the energy amount of the energy beam 12 applied in the melting step exceeds a certain value, a projection 64 bulged from the surface of the material substrate 10 is formed in a position corresponding to the high temperature region 11H, and a master for transfer (hereinafter referred to as master) 65 having the projection 64 is formed on the surface of the material substrate 10.

As the projection 64 is linearly aligned in a one-dimensional direction corresponding to the groove 13A, the projection 64 is formed as the pattern of a linear rib (a projected rim) aligned in a one-dimensional direction. The width (line width) W of the projection 64, that is, a dimension of a bottom end portion of the projection 65 in the modulation direction of the heat distribution 11 is determined by a melting temperature and a cooling rate. The melting temperature can be controlled by the energy amount of the energy beam 12, that is, the number of pulse irradiation in the case of an excimer laser, and the higher the melting temperature is, the more the width W of the projection 64 increases. The cooling rate can be controlled by a method of disposing the material substrate 10 or a holder of the material substrate 10 in a vacuum or a gas atmosphere, a method by gas flow, a method of cooling in water or liquid nitrogen, a method of slowly cooling down while heating or the like, and the faster the cooling rate is, the more the width W of the projection 64 increases. In principle, the width W of the projection 64 can have an arbitrary value larger than the size of the atom of the material of the material substrate 10, so by controlling the melting temperature and the cooling rate, the width W of the projection 64 can be less than 50 nm which is impossible to achieve by the conventional photolithography.

The specific value of the width W of the projection 64 is determined by the use of a substrate which will be described later. For example, in the case of forming a carbon nanotube structure, the width W of the projection 64 is preferably within a range from 0.4 nm to less than 50 nm, more preferably within a range from 0.4 nm to 30 nm, and more preferably within a range from 0.4 nm to 10 nm because of the same reasons as those described in the first embodiment.

Moreover, a spacing L between the projections 64, that is, a spacing (pitch) between the projections 64 in the modulation direction of the heat distribution 11 is determined according to the spatial period T of the heat distribution 11, that is, the periodic spacing P in the diffraction grating 13 and the wavelength $\lambda$ of the energy beam 12. The smaller the wavelength $\lambda$ is, or the smaller the periodic spacing P is, the more the spacing L between the projections 64 can be reduced, so the projections 64 can be formed with a fine spacing L which is impossible to achieve by the conventional photolithography. For example, the spacing L between the projections 64 is preferably 100 nm or less, and more preferably 50 nm or less, because of the same reasons as that described in the first embodiment.

(Transferring Step)

Figure 22A:
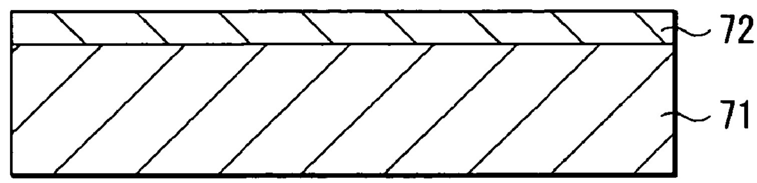
FIGS. 22A through 22C are schematic sectional views showing a step (transferring step) following the step of FIG. 21.

Next, referring to FIGS. 22A through 22C, the transferring step will be described below. At first, as shown in FIG. 22A, for example, a substrate to be transferred 71 on which a wiring pattern of a conductive film 72 is formed in advance is prepared.

Figure 22B:
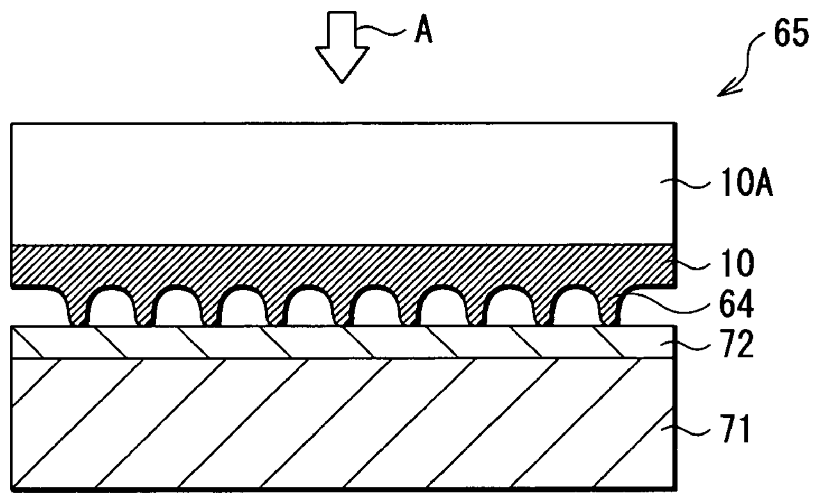

Next, as shown in FIG. 22B, the projection 64 of the master 65 and the conductive film 72 of the substrate to be transferred 71 closely face each other. At this time, in order to improve a transferring property, if necessary, a pressure is preferably applied in a direction of an arrow A. Moreover, a heating process is preferably carried out, because the transferring property can be further improved.

Figure 22C:
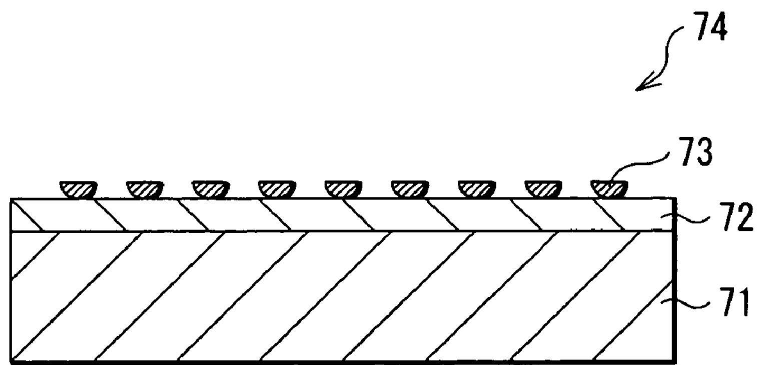

After that, when the master 65 is drawn away from the substrate to be transferred 71, as shown in FIG. 22C, the tip portion of the projection 64 is transferred to the substrate to be transferred 71. Thus, a substrate 74 in which the transfer pattern 73 made of the catalyst metal (iron) is formed on the substrate to be transferred 71 is formed. Therefore, a large number of substrates 74 can be manufactured through transferring the pattern of the projection 64 to a large number of substrates to be transferred 71 through the use of one master 65. In the case where the projection 64 is worn out by repeating the transfer, the melting step and the projection forming step are repeated again to recover the shape of the projection 64.

Figure 23:
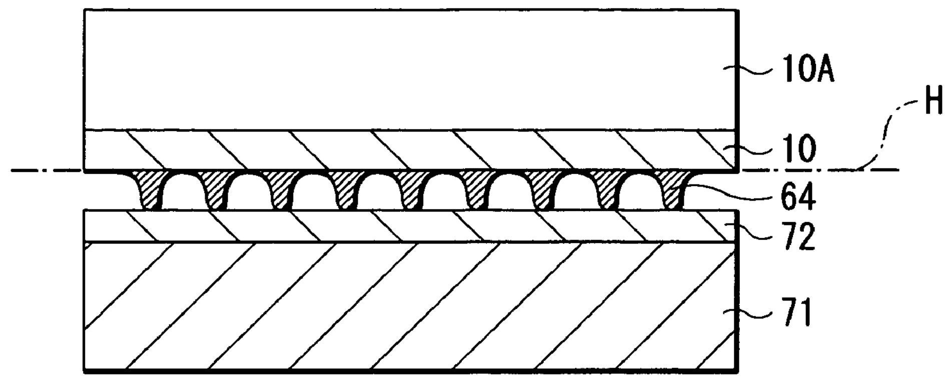
FIG. 23 is a sectional view showing a modification of a transfer pattern shown in FIGS. 22A through 22C.
Figure 24:
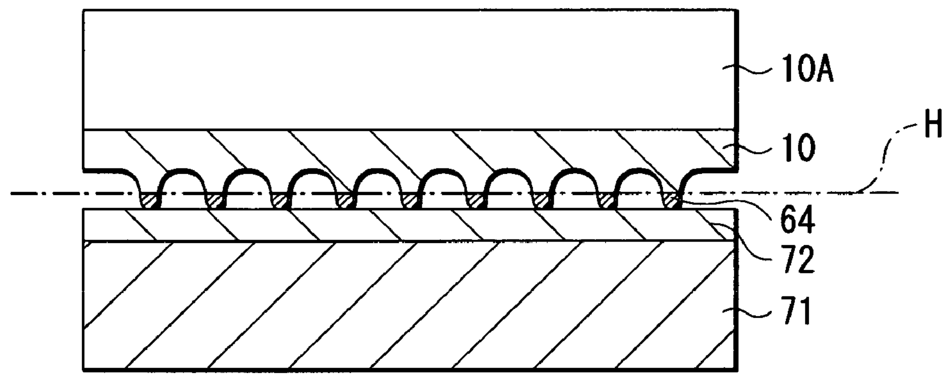
FIG. 24 is a sectional view of another modification of the transfer pattern shown in FIGS. 22A through 22C.

Herein, "the tip portion of the projection 64" means a portion including the tip of the projection 64 in the case where the projection 64 is cut along a horizontal plane H (refer to FIGS. 23 and 24) parallel to the surface of the material substrate 10. Therefore, for example, as shown in FIG. 22C, only the tip of the projection may be transferred to the substrate to be transferred 71, or as shown in FIG. 23, the whole projection 64 may be transferred to the substrate to be transferred 71. Alternately, as shown in FIG. 24, a portion from the tip to a middle point of the projection 64 may be transferred to the substrate to be transferred 71.

Thus, the catalyst arranging step is completed.

(Growing Step)

Figure 25:
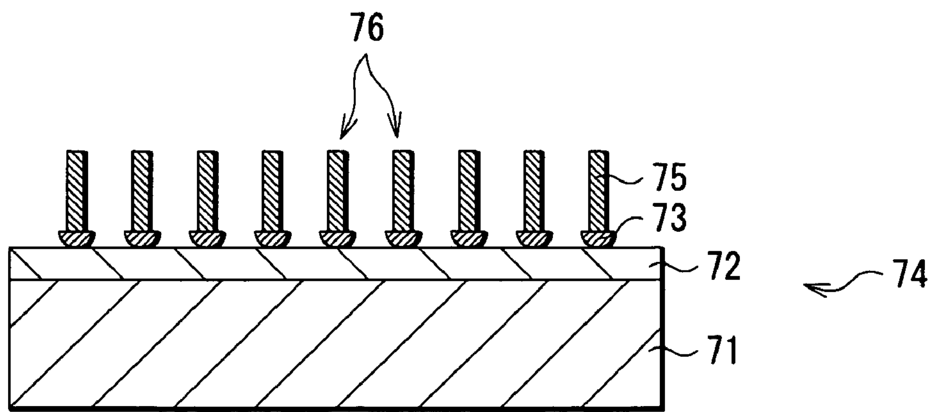
FIG. 25 is a schematic sectional view showing a step (growing step) following the step of FIG. 22C.

After the transfer pattern 73 is formed on the substrate to be transferred 71 to form the substrate 74, for example, as shown in FIG. 25, a carbon nanotube 75 is grown on the substrate 74 through the use of the transfer pattern 73 as a catalyst, thereby a carbon nanotube structure 76 in which a plurality of carbon nanotubes 75 are linearly aligned can be formed. Thus, the carbon nanotube structure 76 formed on the conductive film 72 can be used as a field electron emission device.

Thus, in the modification, after the heat distribution 11 is applied to the surface of the material substrate 10 made of the catalyst metal so as to melt the surface of the material substrate 10, the heat of the surface of the material substrate 10 is dissipated, so the master 65 having a fine pattern of the projection 64 made of the catalyst metal in a desired position can be formed. The width W of the projection 64 can be less than 50 nm which is impossible to achieve by the conventional photolithography through controlling the melting temperature and the cooling rate. Moreover, the projections 64 can be formed with a fine spacing L which is impossible to achieve by the conventional photolithography through controlling the spatial period T of the heat distribution 11.

Moreover, the master 65 having the pattern of the projection 64 can be formed by a dry process, so compared to a process using the conventional photolithography, the modification can obtain advantages that the production is easier; the reproducibility is superior; and the cost can be reduced.

Further, the heat distribution 11 is applied through diffracting the energy beam 12, so the spatial period T of the heat distribution 11 can be easily controlled through reducing the periodic spacing P in the diffraction grating 13, thereby the spacing L between the projections 64 can be reduced.

Moreover, in the modification, at least the tip portion of the projection 64 is transferred to the substrate to be transferred 71, so a large number of substrates 74 can be manufactured through transferring the projection 64 to a large number of substrates to be transferred 71 through the use of one master 65.

[Modification 5]

Next, referring to FIGS. 26 through 31, Modification 5 will be described below. The modification is the same as Modification 4, except that in the melting step, the energy amount of an energy beam is modulated in a two-dimensional direction, that is, an X direction and a Y direction to apply an X-direction heat distribution 31X and a Y-direction heat distribution 31Y to the surface of the material substrate 10. Therefore, the following description about Modification 5 is simplified.

(Melting Step)

At first, as in the case of Modification 3, a melting step is carried out. Herein, the material substrate 10 is made of iron (Fe) as a metal catalyst.

The material of the material substrate 10 may be any material having a function as a metal catalyst for forming a carbon nanotube, and specific examples of the material of the material substrate 10 is the same as those exemplified as the second material in the first embodiment.

(Projection Forming Step, Master Forming Step)

Figure 26:
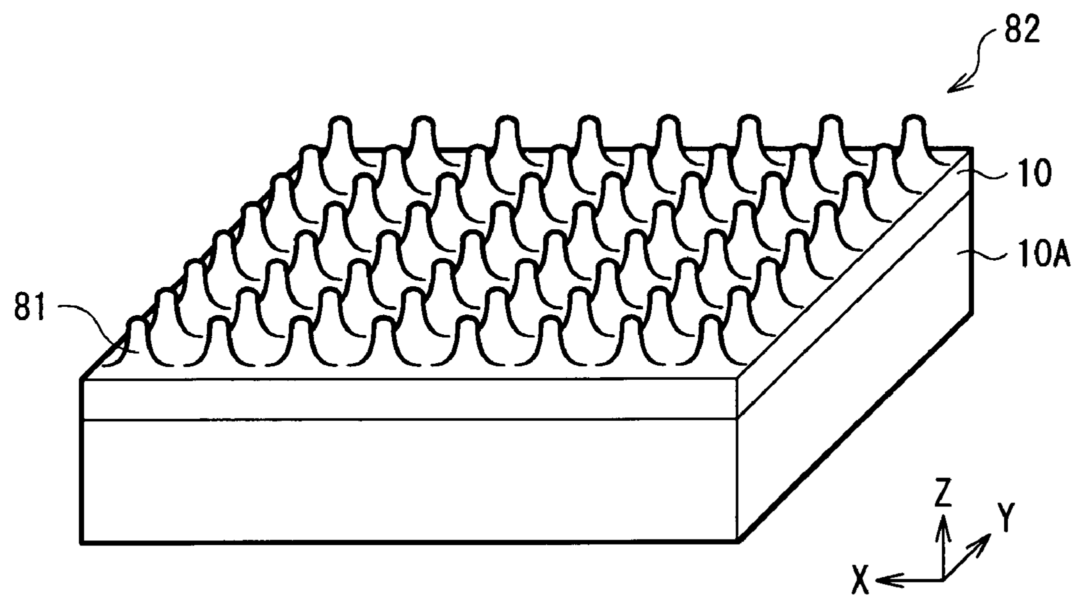
FIG. 26 is a schematic perspective view showing a projection forming step in a method of manufacturing a carbon nanotube according to Modification 5 of the invention.

Next, as in the case of Modification 4, the projection forming step and the master forming step are carried out. Thereby, as shown in FIG. 26, a master 82 having the pattern of a projection 81 aligned in a two-dimensional direction on the surface of the material substrate 10 is formed.

(Transferring Step)

Figure 27:
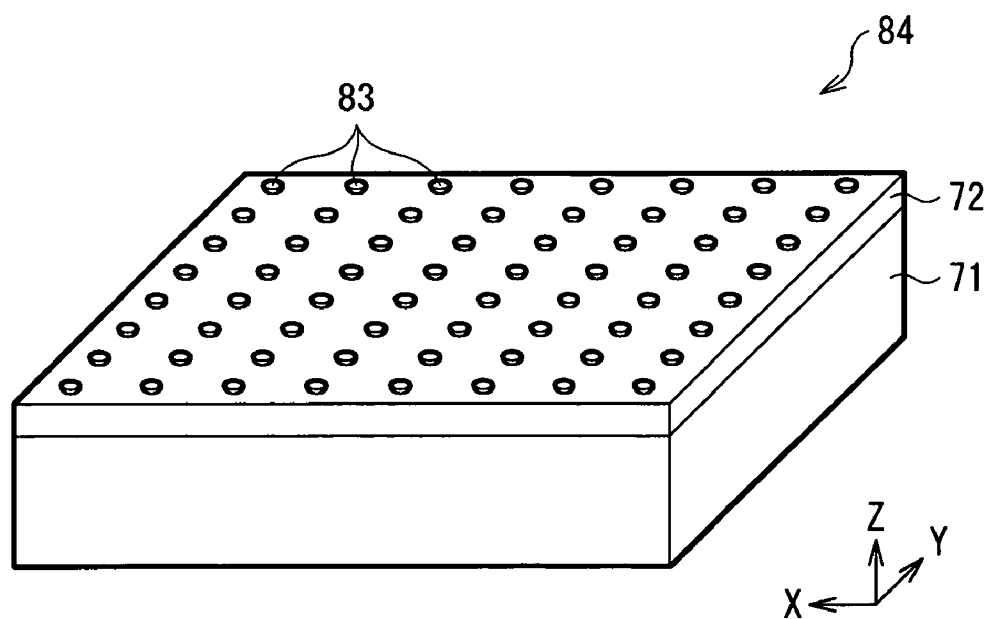
FIG. 27 is a schematic perspective view showing a step (transferring step) following the step of FIG. 26.

Then, as in the case of Modification 4, the transferring step is carried out, and as shown in FIG. 27, a substrate 84 in which a transfer pattern 83 made of the catalyst metal (iron) is aligned in a two-dimensional direction on the substrate to be transferred 71 is formed. Thus, the catalyst arranging step is completed.

(Growing Step)

Figure 28:
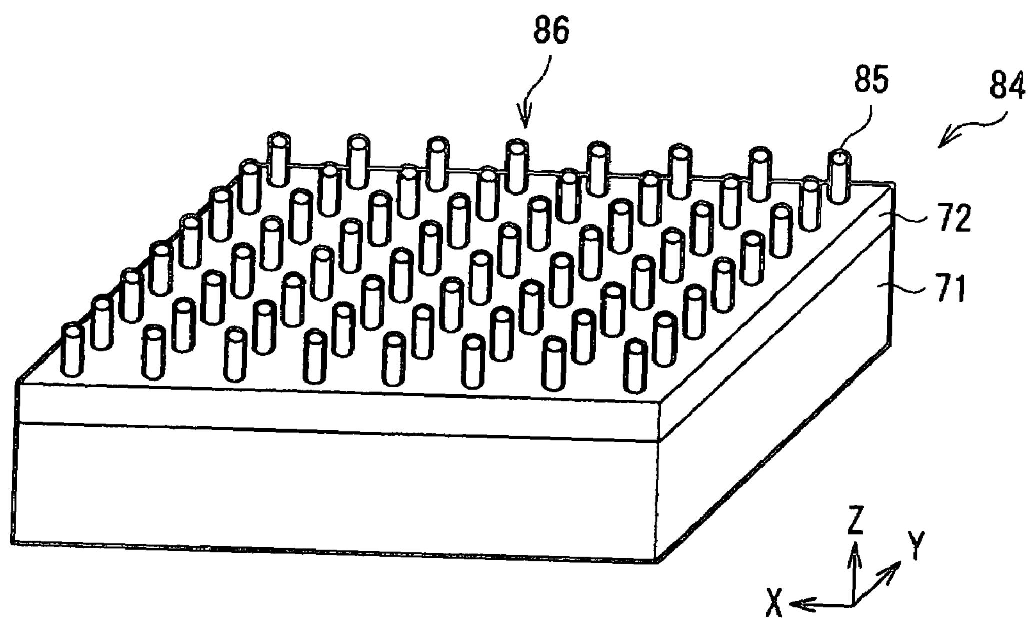
FIG. 28 is a schematic perspective view showing a step (growing step) following the step of FIG. 27.

Next, as in the case of Modification 4, the growing step is carried out, and as shown in FIG. 28, a carbon nanotube 85 is grown on the substrate 84 through the use of the transfer pattern 83 as a catalyst to form a carbon nanotube structure 86 in which a plurality of carbon nanotubes 85 are aligned in a two-dimensional direction.

Figure 29:
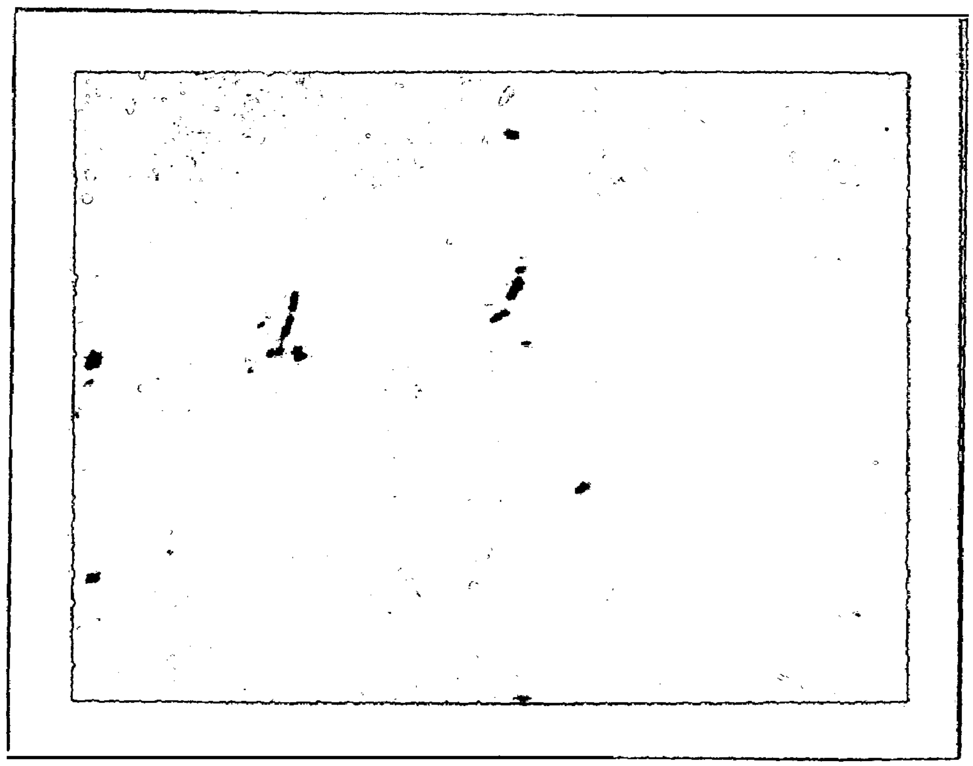
FIG. 29 is a microscope photograph of a carbon nanotube structure shown in FIG. 28.

FIG. 29 is a microscopic photograph (magnified by 37.5 times) of the carbon nanotube structure 86 formed on the substrate 84 through the above steps. A point-like white portion which is two-dimensionally distributed corresponds to the carbon nanotube 85 grown on the substrate 84 through the use of the transfer pattern transferred from the projection 81 of the master 82 as a catalyst.

Figure 30:
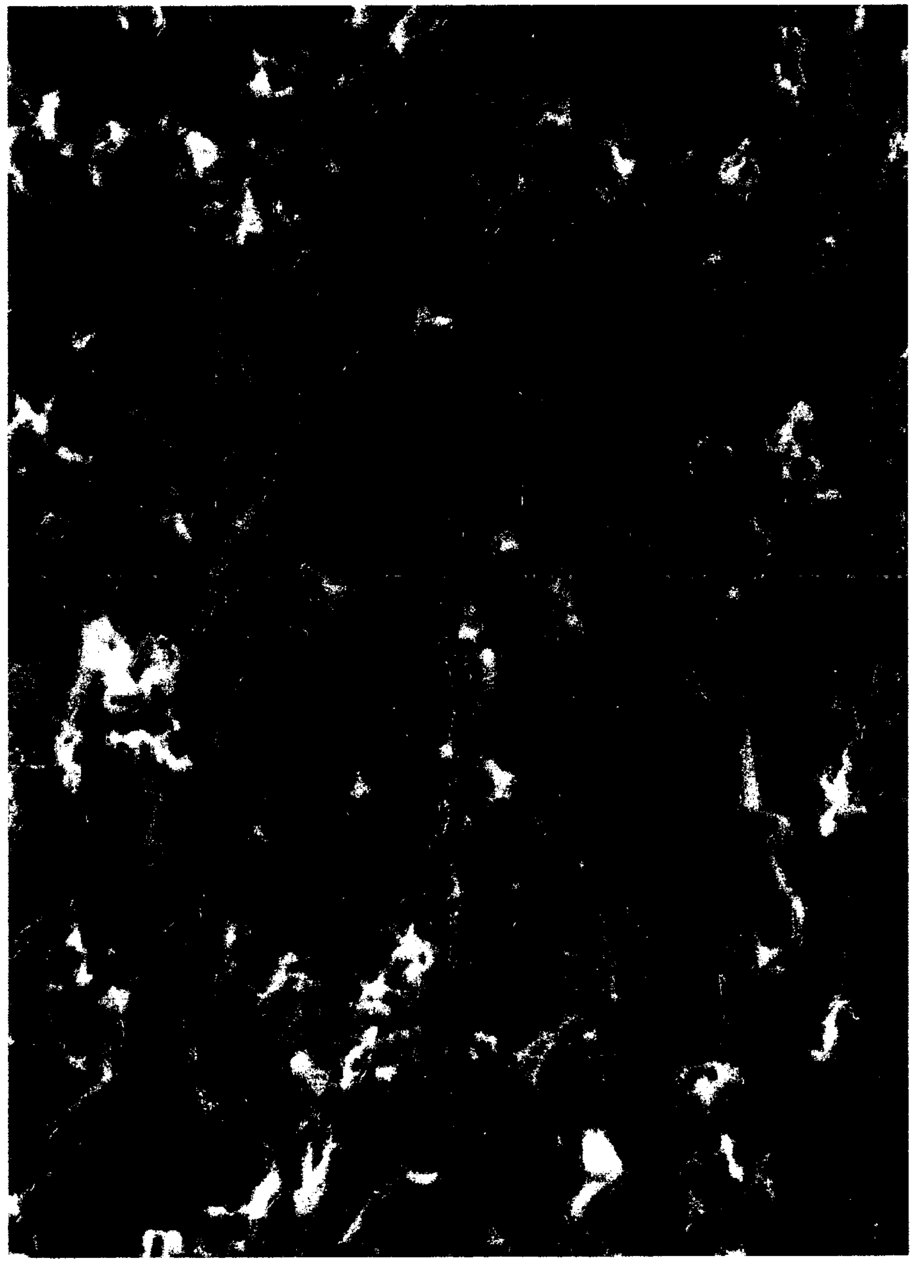
FIG. 30 is an SEM photograph showing an area around the center of a white portion shown in FIG. 29.
Figure 31:
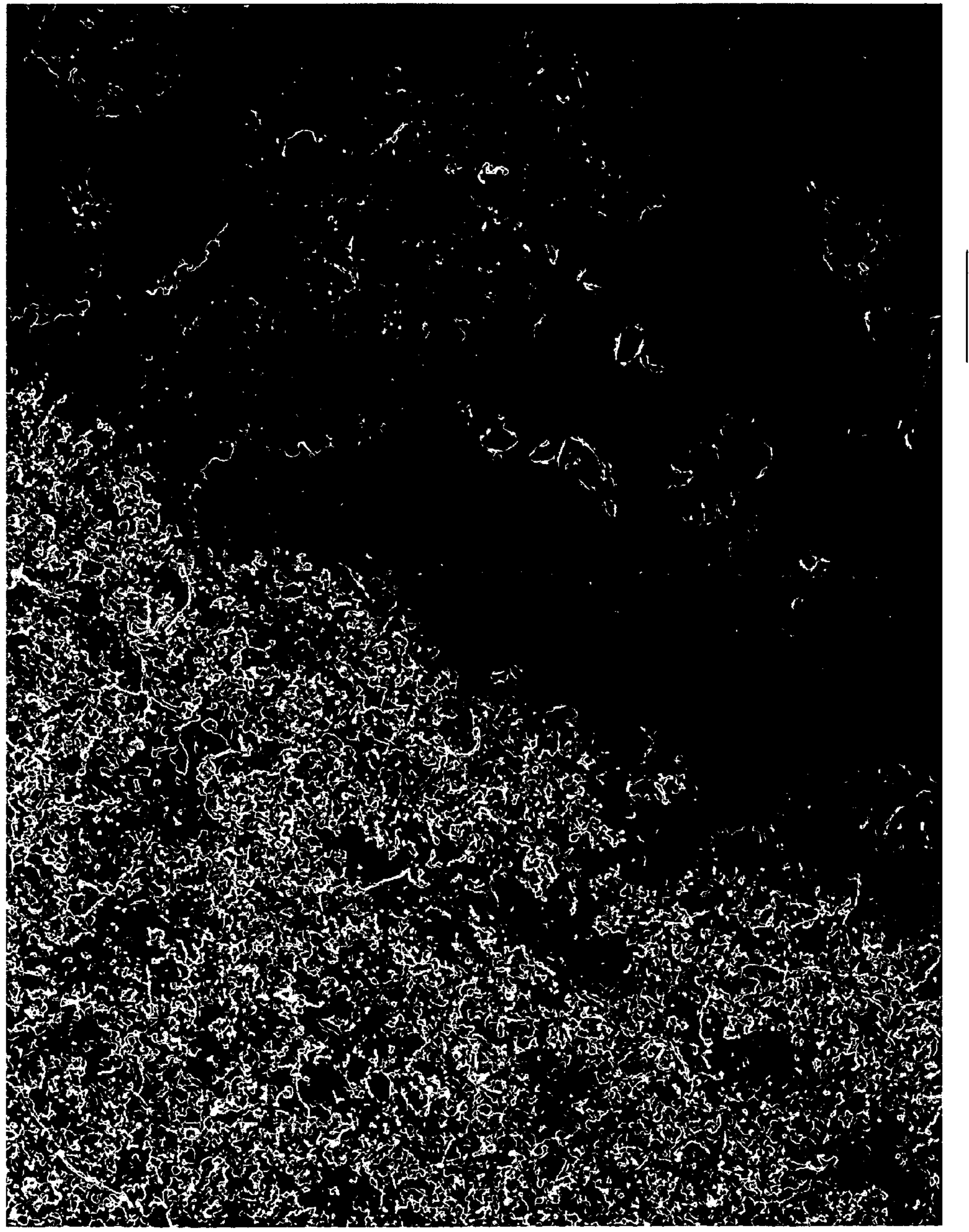
FIG. 31 is an SEM photograph showing an area around a boundary between a white portion and a black portion shown in FIG. 29.

FIG. 30 is a SEM (Scanning Electron Microscope) photograph (magnified by 50,000 times) showing an area around the center of the white portion in FIG. 29. As can be seen from FIG. 30, it is confirmed that the carbon nanotube is grown in the white portion. Moreover, FIG. 31 is a SEM photograph (magnified by 50,000 times) showing an area around the boundary between a white portion and a black portion around the white portion in FIG. 29. As can be seen from FIG. 31, it is confirmed that the carbon nanotube is grown in the white portion; however, the carbon nanotube is not observed in the black portion.

Thus, in the modification, the heat distribution 33 is formed through modulating the energy amount of the energy beam 12 in a two-dimensional direction, so the master 82 having the pattern of the projection 81 aligned in a two-dimensional direction can be formed.

Moreover, in the modification, when the tip portion of the projection 81 is transferred to the substrate to be transferred 71, a large number of the substrates 84 can be manufactured through transferring the projection 81 to a large number of substrates to be transferred 71 through the use of one master 82.

[Modification 6]

Next, referring to FIGS. 32A through 34, Modification 6 will be described below. The modification further includes a coating forming step in which a coating made of a transfer material such as a catalyst metal is formed on the surface of a projection formed on a substrate made of an arbitrary material by the same method as that in Modification 4.

(Melting Step and Projection Forming Step)

At first, a material substrate 90 made of, for example, silicon is prepared, and a melting step and a projection forming step are carried out as in the case of Modification 4 to form a master 92 having the pattern of a projection 91 on a surface of the material substrate 90.

(Coating Forming Step)

Figure 32A:
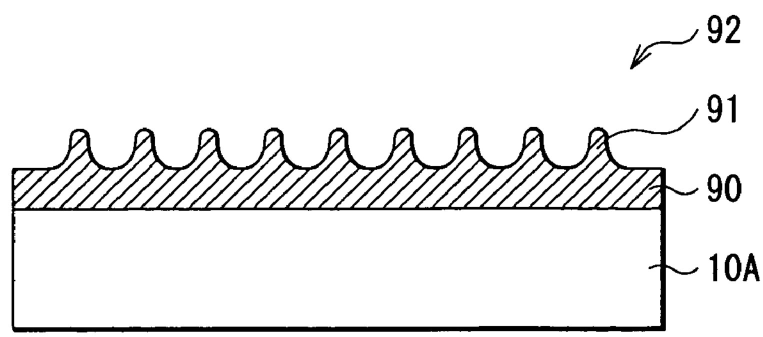
FIGS. 32A and 32B are schematic sectional views showing a coating forming step in a method of manufacturing a carbon nanotube according to Modification 6 of the invention.
Figure 32B:
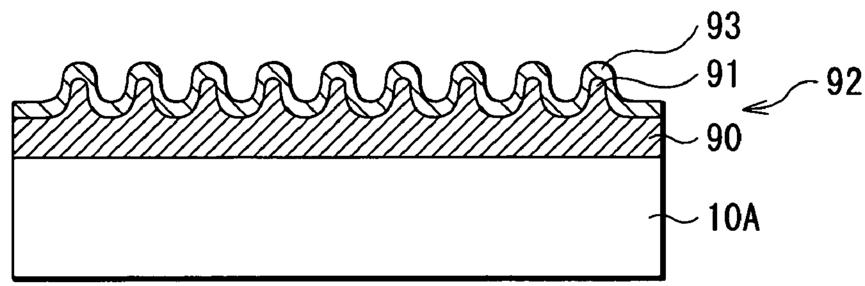

Next, as shown in FIG. 32B, a coating 93 is formed on the surface of the projection 91. In the modification, the coating 93 is formed of iron (Fe) as a metal catalyst, and the coating 93 with a substantially uniform thickness is formed all over the surface of the material substrate 90 including the projection 91; however, the thickness of the coating 93 is not necessarily uniform. The thickness of the coating 93 can be determined according to the height and the dimension of the projection 91, and in the embodiment, the thickness of the coating 93 is, for example, 5 nm. The coating 93 can be formed by, for example, vacuum deposition.

The transfer material as the material of the coating 93 may be any material having a function as a metal catalyst for forming a carbon nanotube, and specific examples of the transfer material are the same as those exemplified as the second material in the first embodiment.

(Transferring Step)

Figure 33A:
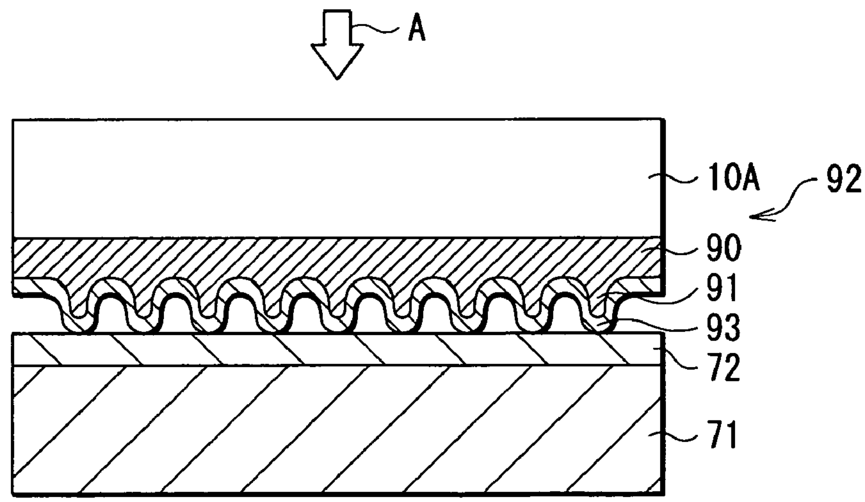
FIGS. 33A and 33B are schematic sectional views showing a step (transferring step) following the step of FIG. 32B.

Next, as shown in FIG. 33A, the projection 91 of the master 92 and the conductive film 72 of the substrate to be transferred 71 closely face each other. At this time, in order to improve a transferring property, as in the case of Modification 4, it is preferable that a pressure is applied in a direction of an arrow A or a heating process is carried out.

Figure 33B:
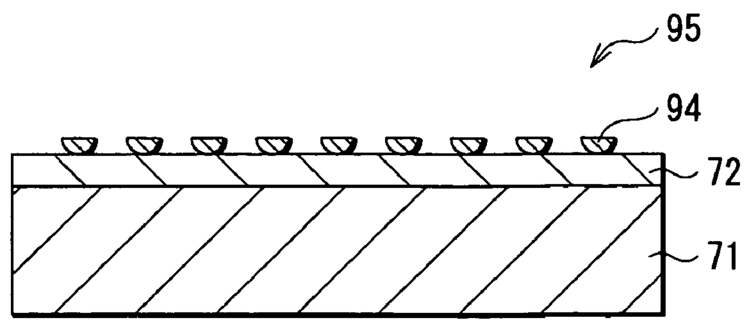

After that, when the master 92 is drawn away from the substrate to be transferred 71, as shown in FIG. 33B, for example, iron (Fe) as a metal catalyst constituting the coating 93 laid over the tip portion of the projection 91 is transferred on the substrate to be transferred 71. Thus, a substrate 95 having a transfer pattern 94 made of the same material as that of the coating 93 is formed. Therefore, a large number of substrates 95 can be manufactured through transferring the coating 93 to a large number of substrates to be transferred 71 through the use of one master 92. In the case where the coating 93 is worn out by repeating the transfer, the coating forming step can be repeated again to form another coating on the surface of the projection 91. At this time, another coating may be formed after removing the remaining coating 93, or another coating may be formed on the remaining coating 93.

Herein, the meaning and the specific example of "the tip portion" are the same as that described in Modification 4 referring to FIGS. 23 and 24.

Thus, the catalyst arranging step is completed.

(Growing Step)

Figure 34:
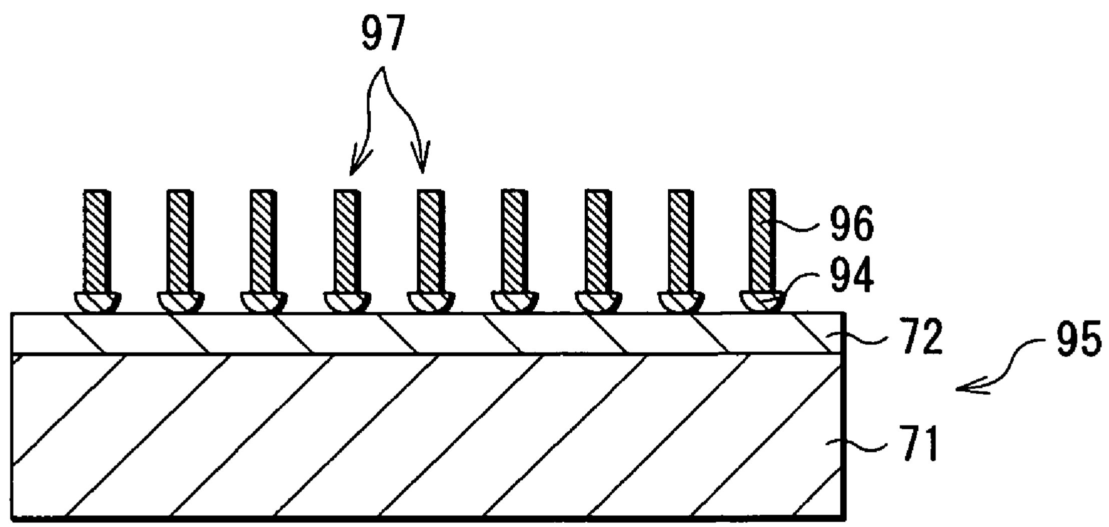
FIG. 34 is a schematic sectional view showing a step (growing step) following the step of FIG. 33B.

After the transfer pattern 94 is formed on the substrate to be transferred 71, for example, as shown in FIG. 34, a carbon nanotube 96 is grown on the substrate 95 through the use of the transfer pattern 94 as a catalyst, thereby a carbon nanotube structure 97 in which a plurality of carbon nanotubes 96 are linearly aligned can be formed.

Thus, in the modification, the coating 93 is formed on the surface of the projection 91, so only the coating 93 may be made of the transfer material such as a metal catalyst. Therefore, the material substrate 90 can be made of an arbitrary material, and the range of choices can be extended according to uses.

Moreover, in the modification, when the tip portion of the projection 91 covered with the coating 93 is transferred to the substrate to be transferred 71, a large number of substrates 95 can be manufactured through transferring the coating 93 to a large number of the substrates to be transferred 91 through the use of one master 92.

[Modification 7]

Next, referring to FIGS. 35A through 35C, Modification 7 will be described below. In the modification, in "the transferring step" in Modification 4, a relative position between the master 65 and the substrate to be transferred 71 is shifted to transfer the pattern of the master 65 to the substrate to be transferred 71 a plurality of times.

Figure 35A:
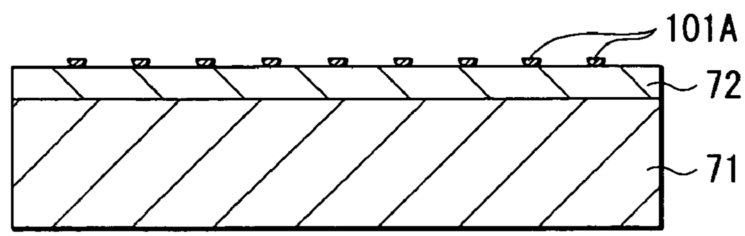
FIGS. 35A through 35C are schematic sectional views showing a transferring step in a method of manufacturing a carbon nanotube according to Modification 7 of the invention.

At first, as shown in FIG. 35A, the first transfer is carried out as described in Modification 4 referring FIGS. 22A through 22C to form a first transfer pattern 101A on the substrate to be transferred 71.

Figure 35B:
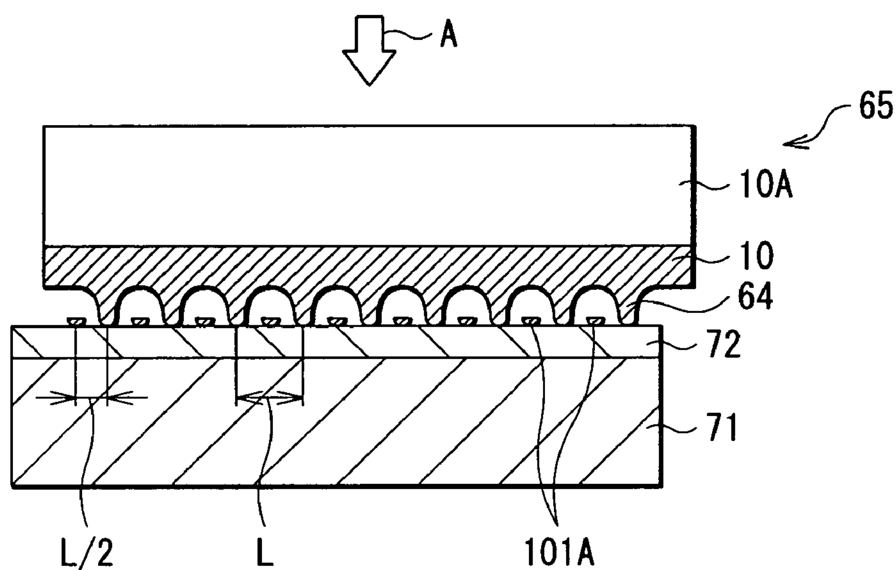
Figure 35C:
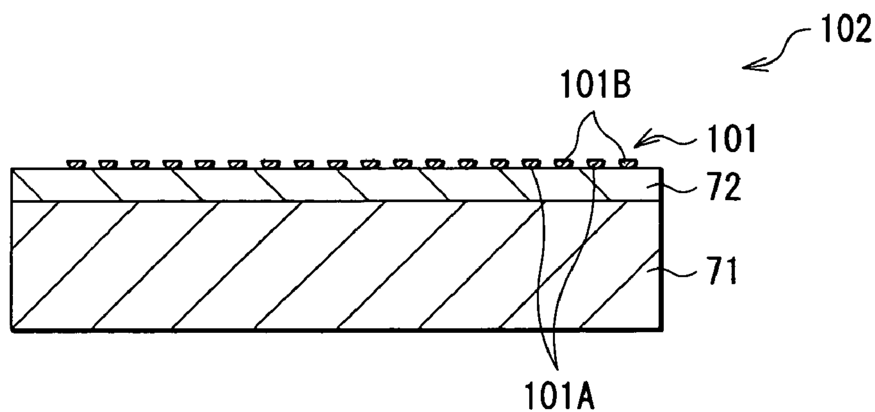

Next, as shown in FIG. 35B, the relative position between the master 65 and the substrate to be transferred 71 is shifted, for example, one-half of the spacing L between the projections 64 to carry out the second transfer. After that, when the master 65 is drawn away from the substrate to be transferred 71, as shown in FIG. 35C, a second transfer pattern 101B is formed in a middle position between the first transfer patterns 101A. Thus, a substrate 102 having a transfer pattern 101 including the first transfer pattern 101A and the second transfer pattern 101B can be obtained.

In the modification, the relative position between the master 65 and the substrate to be transferred 71 is shifted to transfer the pattern of the master 65 to the substrate to be transferred 71 a plurality of times, so a large number of substrates 102 having a finer transfer pattern 101 than that in the first embodiment can be manufactured.

In the modification, the transfer is carried out twice; however, the number of transfer may be further increased. In this case, the relative position between the master 65 and the substrate to be transferred 71 is preferably adjusted according to the number of transfer.

Moreover, in the modification, the relative position between the master 65 and the substrate to be transferred 71 is shifted, for example, one-half of the spacing L between the projections 64 to carry out the second transfer, thereby the first transfer pattern 101A and the second transfer pattern 101B are formed with a uniform spacing; however, a spacing between the first transfer pattern 101A and the second transfer pattern 101B is not necessarily uniform.

[Modification 8]

Next, referring to FIGS. 36A through 37, Modification 8 will be described below. In the modification, a metal substrate made of a catalyst metal or the like is pressed to a projection formed on a material substrate made of an arbitrary material by the same method as that in Modification 4 to adhere the catalyst metal to the tip of a projection.

(Melting Step and Projection Forming Step)

Figure 36A:
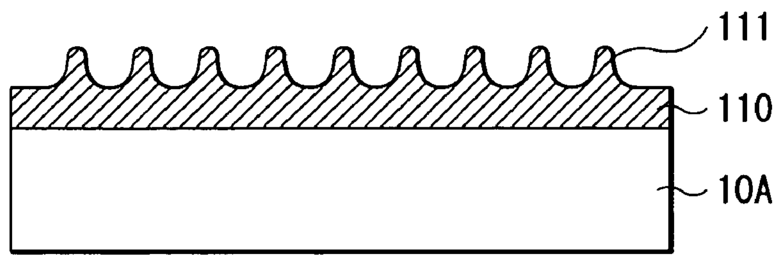
FIGS. 36A through 36C are schematic sectional views showing a catalyst arranging step in a method of manufacturing a carbon nanotube according to Modification 8 of the invention.

At first, a material substrate 110 made of, for example, silicon is prepared, and a melting step and a projection forming step are carried out as in the case of Modification 4 to form the pattern of a projection 111 on the surface of the material substrate 110 as shown in FIG. 36A.

(Adhering step)

Figure 36B:
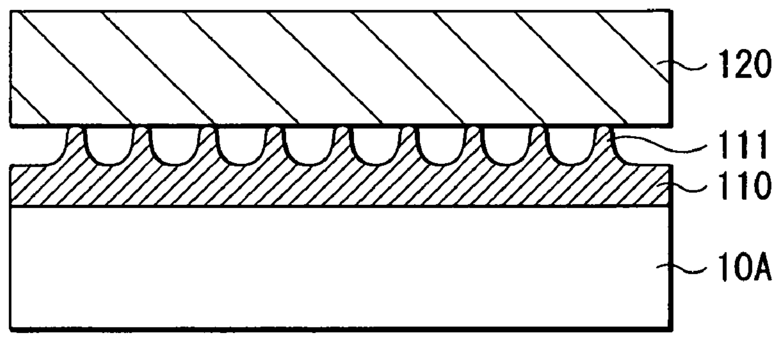
Figure 36C:
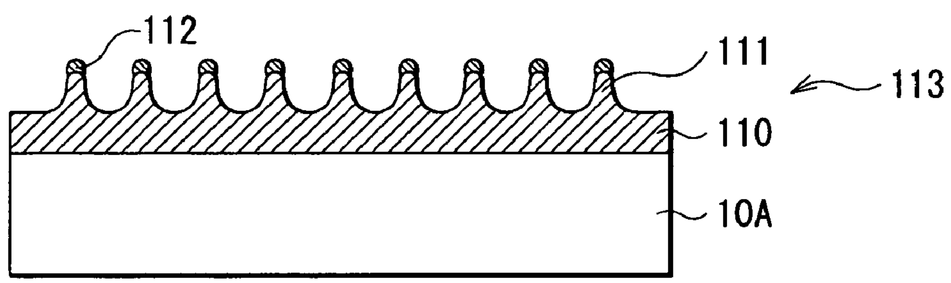

Next, as shown in FIG. 36B, the projection 111 of the material substrate 110 and a metal substrate 120 made of iron as a metal catalyst closely face each other. Thereby, as shown in FIG. 36C, iron constituting the metal substrate 120 is adhered to a tip portion of the projection 111 to form a substrate 113 having an adhered pattern 112 made of the same material as that of the metal substrate 120. At this time, in order to improve an adhesion property, it is preferable that a pressure is applied, or a heating process is carried out, as in the case of Modification 4.

The material of the metal substrate 120 may be any material having a function as a metal catalyst for forming a carbon nanotube, and specific examples of the material of the metal substrate 120 are the same as those exemplified as the second material in the first embodiment.

Thus, the catalyst arranging step is completed.

(Growing Step)

Figure 37:
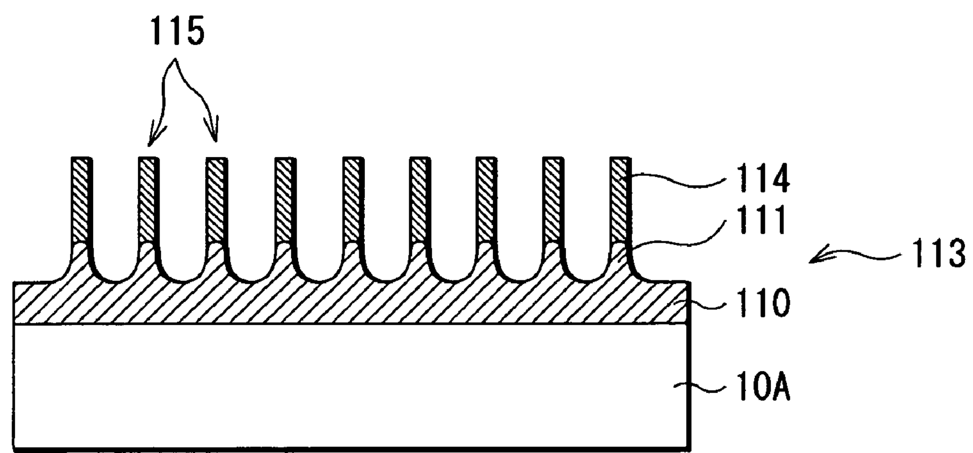
FIG. 37 is a schematic sectional view showing a step (growing step) following the step of FIG. 36C.

After the substrate 113 having the adhered pattern 112 is formed, for example, as shown in FIG. 37, a carbon nanotube 114 is grown on the substrate 113 through the use of the adhered pattern 112 as a catalyst, thereby a carbon nanotube structure 115 in which a plurality of carbon nanotubes 114 are linearly aligned can be formed.

Thus, in the modification, the projection 111 and the metal substrate 120 closely face each other to form the adhered pattern 112 made of the same material as that of the metal substrate 120 on the tip portion of the projection 111, so the adhered pattern 112 made of the metal catalyst can be easily formed. Moreover, the material of the material substrate 110 is arbitrarily chosen, so the range of choices can be extended according to uses.

Moreover, in the modification, when the substrate 113 in which the adhered pattern 112 is formed is used as a master to transfer the adhered pattern 112 adhered to the tip portion of the projection 111 to the substrate to be transferred 71, a large number of substrates can be manufactured through transferring the adhered pattern 112 to a large number of the substrate to be transferred 71 through the use of one master.

[Modification 9]

Next, referring to FIGS. 38 through 40, Modification 9 will be described below. A catalyst arranging step in the modification includes "a melting step" of applying the heat distribution 11 modulated according to a desired pattern to the surface of the material substrate 10 so as to melt the surface of the material substrate 10, "a projection forming step" of forming a projection in a position corresponding to the heat distribution 11, that is, in a desired pattern through dissipating the heat of the surface of the material substrate 10, and "a planarizing step" of planarizing the surface of the projection. After that, "a growing step" of growing a carbon nanotube on a top surface of the planarized projection is carried out.

(Melting Step)

At first, as in the case of Modification 2, the melting step is carried out. In the modification, the material substrate 10 is made of iron (Fe) as a metal catalyst.

The material of the material substrate 10 may be any material having a function as a metal catalyst for forming a carbon nanotube, and specific examples of the material of the material substrate 10 are the same as those exemplified as the second material in the first embodiment.

(Projection Forming Step)

When the irradiation with the energy beam 12 is stopped after the surface of the material substrate 10 is melted in the melting step, the temperature of the surface of the material substrate 10 gradually declines to solidify the surface of the material substrate 10. At this time, in the case where the energy amount of the energy beam 12 applied in the melting step exceeds a certain value, as shown in FIG. 38, a projection 134 bulged from the surface of the material substrate 10 is formed in a position corresponding to the high temperature region 11H.

As the high temperature region 11H is linearly aligned in a one-dimensional direction corresponding to the groove 13A, the projection 134 is formed as the pattern of a linear rib (a projected rim) aligned in a one-dimensional direction. The width (line width) W of the projection 134, that is, a dimension of a bottom end portion of the projection 134 in the modulation direction of the heat distribution 11 is determined by a melting temperature and a cooling rate. The melting temperature can be controlled by the energy amount of the energy beam 12, that is, the number of pulse irradiation in the case of an excimer laser, and the higher the melting temperature is, the more the width W of the projection 134 increases. The cooling rate can be controlled by a method of disposing the material substrate 10 or a holder of the material substrate 10 in a vacuum or a gas atmosphere, a method by gas flow, a method of cooling in water or liquid nitrogen, a method of slowly cooling down while heating or the like, and the faster the cooling rate is, the more the width W of the projection 134 increases. In principle, the width W of the projection 134 can have an arbitrary value larger than the size of the atom of the material of the material substrate 10, so by controlling the melting temperature and the cooling rate, the width W of the projection 134 can be less than 50 nm which is impossible to achieve by the conventional photolithography.

The specific value of the width W of the projection 134 is determined by the use of a substrate which will be described later. For example, in the case of forming a carbon nanotube, the width W of the projection 134 is preferably within a range from 0.4 nm to less than 50 nm, more preferably within a range from 0.4 nm to 30 nm, and more preferably within a range from 0.4 nm to 10 nm because of the same reasons as those described in the first embodiment.

Moreover, a spacing L between the projections 134, that is, a spacing (pitch) between the projections 134 in the modulation direction of the heat distribution 11 is determined according to the spatial period T of the heat distribution 11, that is, the periodic spacing P in the diffraction grating 13 and the wavelength $\lambda$ of the energy beam 12. The smaller the wavelength $\lambda$ is, or the smaller the periodic spacing P is, the more the spacing L between the projections 134 can be reduced, so the projections 134 can be formed with a fine spacing L which is impossible to achieve by the conventional photolithography. For example, the spacing L between the projections 134 is preferably 100 nm or less, and more preferably 50 nm or less, because of the same reasons as those described in the first embodiment.

(Planarizing step)

Figure 39A:
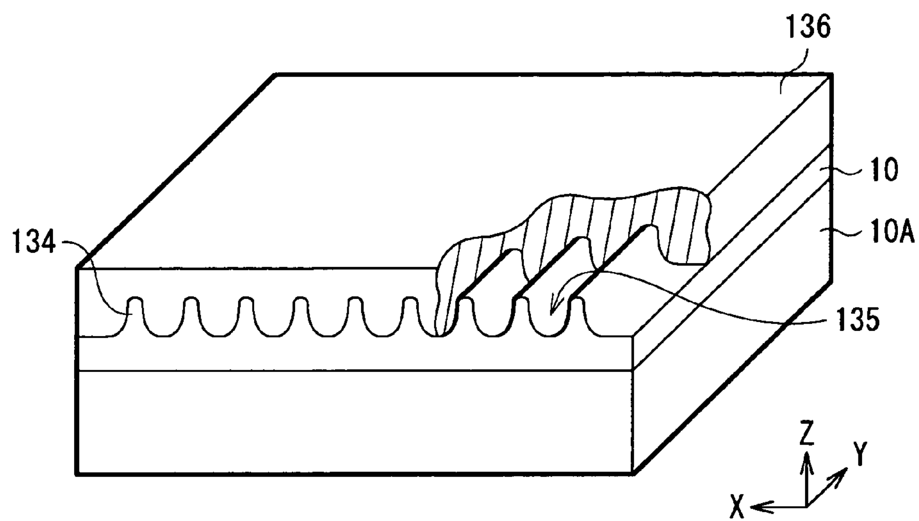
FIGS. 39A and 39B are schematic cutaway perspective views showing a step (planarizing step) following the step of FIG. 38.

Next, as shown in FIG. 39A, a filling layer 136 is formed in a depression portion 135 around the projection 134. The filling layer 136 is used as a palanarization layer in the case where the top surface of the projection 134 is planarized by CMP as will be described later, and the filling layer 136 is formed through coating with, for example, silicon dioxide by SOG, or through the use of the CVD method. As the material of the filling layer 136, instead of the above-described silicon dioxide, an insulating material such as silicon nitride, polyimide, PMMA or a metal oxide film, or a semiconductor material such as silicon or germanium may be used.

The filling layer 136 may be formed so that the projection 134 is covered with the filling layer 136, or so that a part of the projection 134, for example, an extreme tip portion of the projection 134 is projected from the filling layer 136.

Figure 39B:
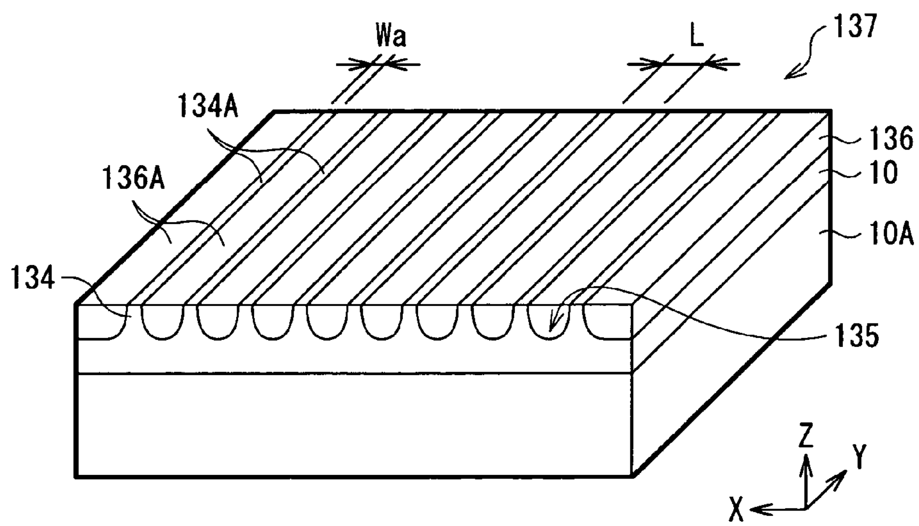

Next, as shown in FIG. 39B, the projection 134 and the filling layer 136 are polished by, for example, CMP to planarize a top surface 134A of the projection 134 and a top surface 136A of the filling layer 136. Thereby, a substrate 137 including the projection 134 which has the planarized top surface 134A and the filling layer 136 with which the side surface of the projection 134 is covered, and from which the top surface 134A of the projection 134 is exposed is obtained.

The width Wa of the planarized top surface 134A can be controlled within a range of a value that the width W of the projection 134 can take by a polishing time by CMP. In other words, the projection 134 has a sectional area which is gradually reduced toward the tip, so the longer the polishing time is, the more the width Wa of the top surface 134A increases. The spacing L between the projections 134 is the same before and after planarization.

Therefore, when the top surface 134A of the projection 134 is planarized, the width Wa of the top surface 134A can be less than 50 nm which is impossible to achieve by the conventional photolithography as in the case of the width W of the projection 134, and variations in the area and the shape of the top surface 134A can be reduced, and the height can be uniform.

Thus, the catalyst arranging step is completed.

(Growing step)

Figure 40:
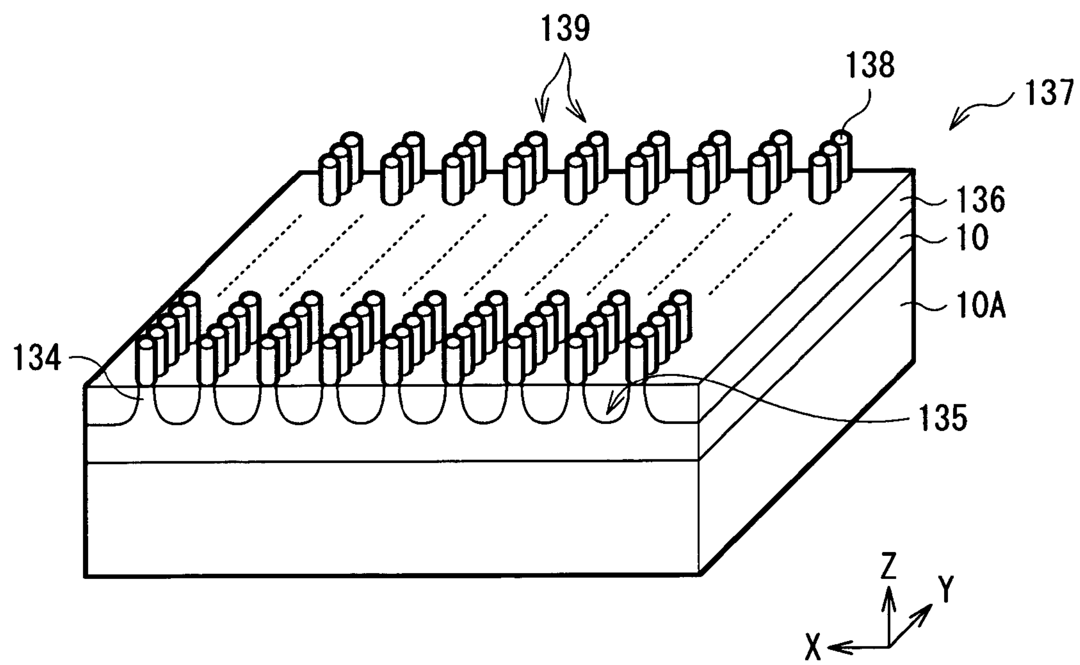
FIG. 40 is a schematic perspective view showing a step (growing step) following the step of FIG. 39.

After the top surface 134A of the projection 134 is planarized, for example, as shown in FIG. 40, a carbon nanotube 138 is grown on the substrate 137 through the use of iron exposed at the top surface 134A as a catalyst, thereby a carbon nanotube structure 139 in which a plurality of carbon nanotubes 138 are linearly aligned can be formed.

Thus, in the modification, after the heat distribution 11 is applied to the surface of the material substrate 10 so as to melt the surface of the material substrate 10, the heat of the surface of the material substrate 10 is dissipated to form a pattern of the projection 134 in a position corresponding to the heat distribution 11, and then, the top surface 134A of the projection 134 is planarized. Therefore, the width W of the projection 134 and the width Wa of the top surface 134A can be less than 50 nm which is impossible to achieve by the conventional photolithography through controlling the melting temperature and the cooing rate. Moreover, through controlling the spatial period T of the heat distribution 11, the projections 134 can be formed with a fine spacing L which is impossible to achieve by the conventional photolithography.

Moreover, the substrate 137 having the pattern of the projection 134 can be formed by a dry process, so compared to a process using the conventional photolithography, the modification can obtain advantages that the production is easier; the reproducibility is superior; and the cost can be reduced.

Further, the heat distribution 11 is applied through diffracting the energy beam 12, so the spatial period T of the heat distribution can be easily controlled through reducing the periodic spacing P in the diffraction grating 13, thereby the spacing L between the projections 134 can be reduced.

Moreover, in the modification, the top surface 134A of the projection 134 is planarized, so the width Wa of the top surface 134A can be less than 50 nm which is impossible to achieve by the conventional photolithography as in the case of the width W of the projection 134, and variations in the area and the shape of the top surface 134A can be reduced, and the height can be uniform.

[Modification 10]

Next, Modification 10 of the invention will be described below. The modification further includes a top surface transferring step of transferring the pattern of the projection in the substrate 137 obtained in Modification 9 to another substrate to be transferred through the use of the substrate 137 as a master.

(Melting Step, Projection Forming Step and Planarizing Step)

Figure 41:
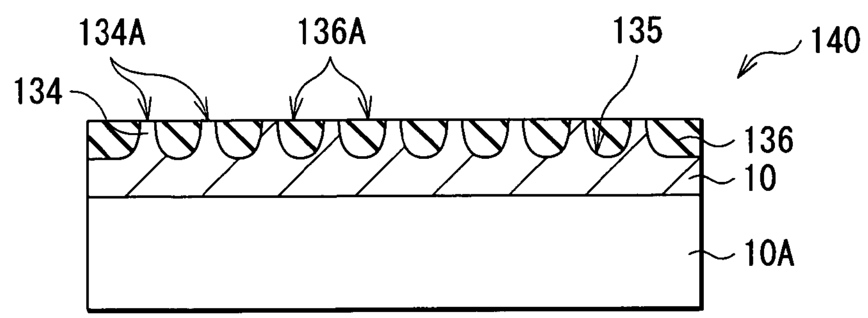
FIG. 41 is a schematic sectional view showing a master in a method of manufacturing a carbon nanotube according to Modification 10 of the invention.

At first, as shown in FIG. 41, a master for transfer (hereinafter referred to as master) 140 having a projection of which the top surface is planarized is formed. The master 140 is formed through carrying out a melting step, a projection forming step and a planarizing step as in the case of the substrate 137 in Modification 9. In other words, the projection 134 and the filling layer 136 are formed on the material substrate 10, and the top surface 134A of the projection 134 and the top surface 136A of the filling layer 136 are planarized.

(Top Surface Transferring Step)

Figure 42A:
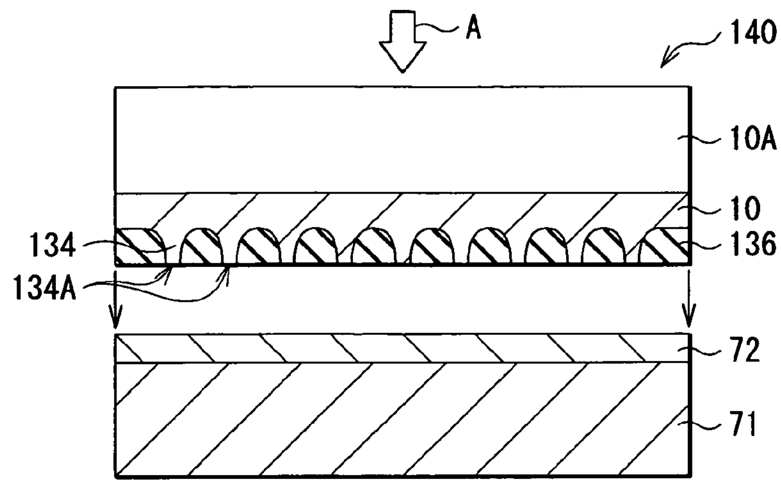
FIGS. 42A and 42B are schematic sectional views showing a step (top surface transferring step) following the step of FIG. 41.

Next, as shown in FIG. 42A, the same substrate to be transferred 71 as that in Modification 4 is prepared, and the top surface 134A of the projection 134 of the master 140 and the conductive film 72 of the substrate to be transferred 71 closely face each other. At this time, in order to improve the transferring property, a pressure is preferably applied in a direction of an arrow A, if necessary. Moreover, a heating process is more preferably carried out, because the transferring property can be further improved.

Figure 42B:
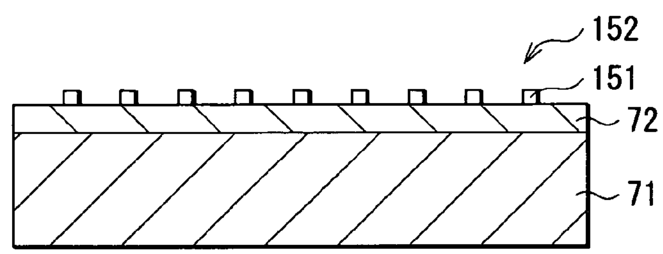

After that, when the master 140 is drawn away from the substrate to be transferred 71, as shown in FIG. 42B, the pattern of the top surface 134A of the projection 134 is transferred to the substrate to be transferred 71. Thus, a substrate 152 having a transfer pattern 151 made of iron is formed on the substrate to be transferred 71. Therefore, a large number of substrates 152 can be manufactured through transferring the top surface 134A of the projection 134 to a large number of substrates to be transferred 71 through the use of one master 140. Moreover, by the planarizing step, variations in the area and the shape of the top surface 134A of the projection 134 are reduced, and the height is uniform, so variations in the area and the shape of the transfer pattern 141 are reduced. Therefore, a fine transfer pattern 151 can be formed with high precision. Moreover, in the case where the projection 134 is worn out by repeating the transfer, when polishing in the planarizing step is repeated again, the shape of the top surface 134A of the projection 134 can be recovered.

Thus, the catalyst arranging step is completed.

(Growing Step)

Figure 43:
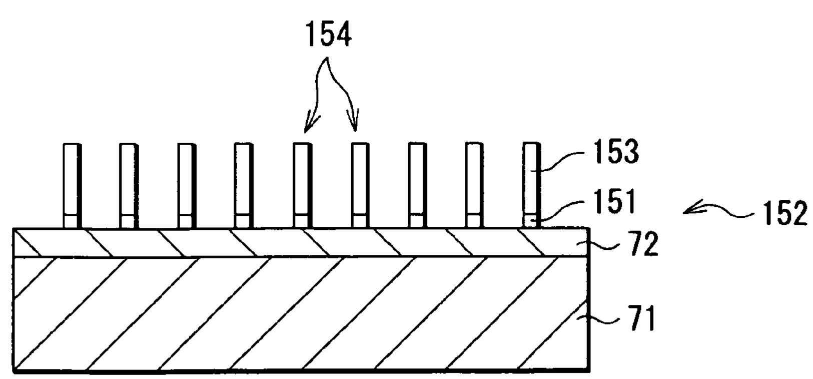
FIG. 43 is a schematic sectional view showing a step (growing step) following the step of FIG. 42B.

After the transfer pattern 151 is formed on the substrate to be transferred 71 to form the substrate 152, for example, as shown in FIG. 43, a carbon nanotube 153 is grown on the substrate 152 through the use of the transfer pattern 151 as a catalyst, thereby the carbon nanotube structure 154 in which a plurality of carbon nanotubes 153 are linearly aligned can be formed. The carbon nanotube structure 154 formed on the conductive film 72 can be used as a field electron emission device.

Thus, in the embodiment, the top surface 134A of the projection 134 is transferred to the substrate to be transferred 71, so a large number of substrates 152 can be manufactured through transferring the top surface 134A of the projection 134 to a large number of substrates to be transferred 71 through the use of one master 140. Moreover, by the planarizing step, variations in the area and the shape of the top surface 134A of the projection 134A is small, and the height is uniform, so the transfer pattern 151 can be formed with high precision.

[Modification 11]

Next, Modification 10 will be described below. In the modification, as in the case of Modification 9, after the pattern of a projection is formed on the surface of the material substrate 10, a control layer which retards the growth of a carbon nanotube is formed on the surface of the projection except for an extreme tip portion. In other words, in the modification, the catalyst arranging step includes "a melting step" of applying the heat distribution 11 modulated according to a desired pattern to the surface of the material substrate 10 so as to melt the surface of the material substrate 10, "a projection forming step" of forming a projection in a position corresponding to the heat distribution 11, that is, in a desired pattern through dissipating the heat of the surface of the material substrate 10, and "a control layer forming step" of forming the control layer which retards the growth of the carbon nanotube on the surface of the projection except for the extreme tip portion. After that, "a growing step" of growing the carbon nanotube in the extreme tip portion of the projection which is not covered with the control layer is carried out.

(Melting Step and Projection Forming Step)

Figure 38:
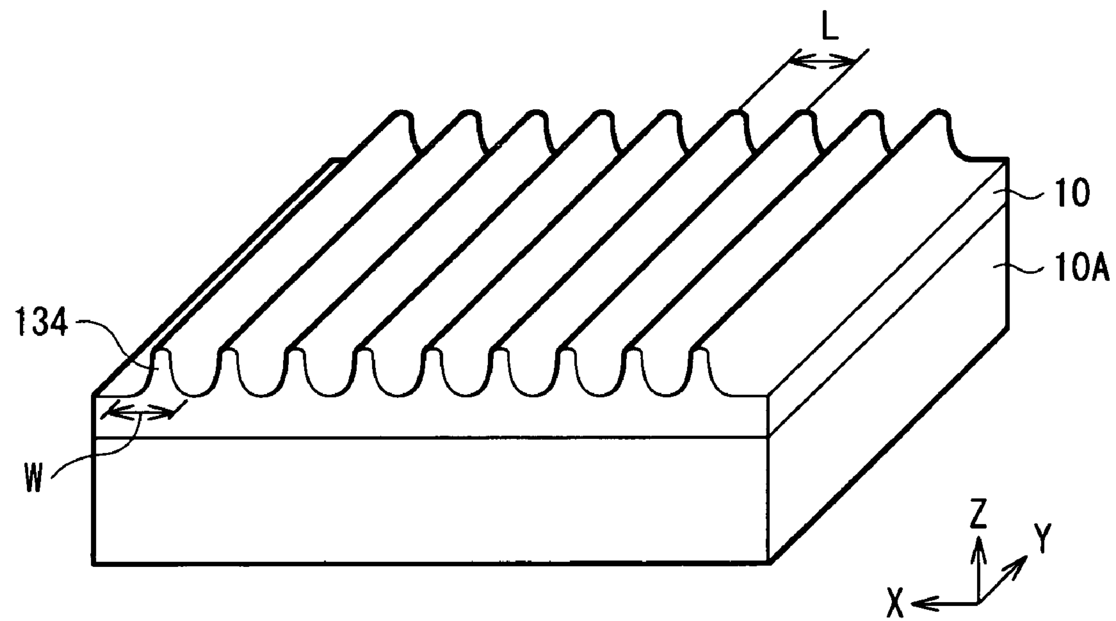
FIG. 38 is a schematic perspective view showing a projection forming step in a method of manufacturing a carbon nanotube according to Modification 9 of the invention.

At first, as in the case of Modification 9, the melting step and the projection forming step are carried out, and as shown in FIG. 38, the pattern of the projection 134 is formed on the surface of the material substrate 10.

(Control Layer Forming Step)

Figure 44:
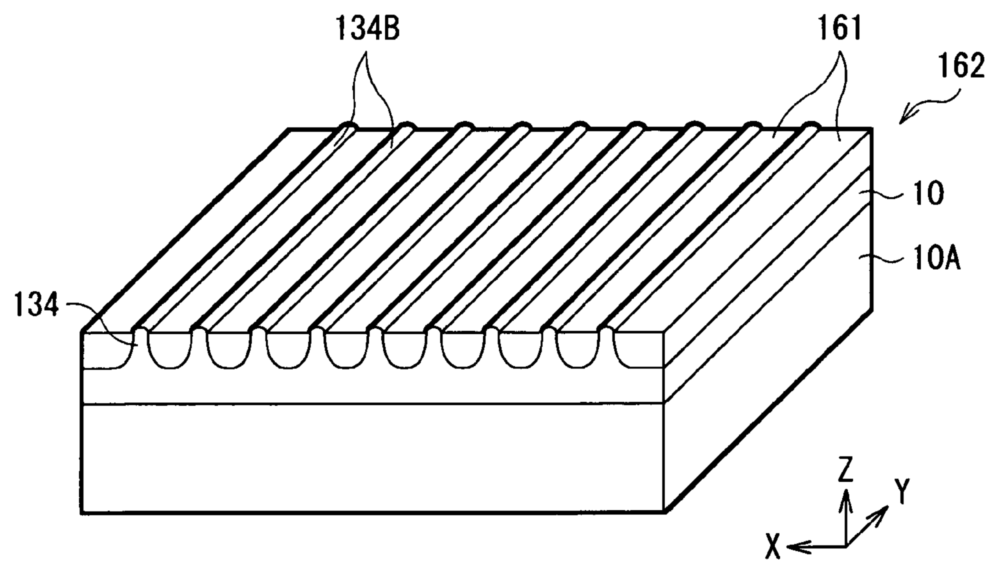
FIG. 44 is a schematic perspective view showing a control layer forming step in a method of manufacturing a carbon nanotube according to Modification 11 of the invention.

Next, as shown in FIG. 44, the control layer 161 is formed on the surface of the projection 134 except for an extreme tip portion 134B. The control layer 161 retards the growth of the carbon nanotube from the side surface of the projection 134 in the growing step which will be described later to limit a region where the carbon nanotube is grown, and the control layer 161 is formed through applying, for example, silicon dioxide by SOG, or through CVD or the like. As the material of the control layer 161, as in the case of the filling layer 136 in Modification 9, instead of silicon dioxide, an insulating material such as silicon nitride, polyimide, PMMA or an insulating material such as a metal oxide film, or a semiconductor material such as silicon or germanium may be used. In particular, in the case where the insulating material is used as the material of the control layer 161, an area around the extreme tip portion 134B of the projection 134 is filled with the control layer 161 made of the insulating material, so compared to the case where no insulator exists around the carbon nanotube, a higher electric field can be concentrated on the carbon nanotube.

Thus, the catalyst arranging step is completed, and a substrate 162 in which the control layer 161 is formed on the surface of the projection 134 except for the extreme tip portion 134B is formed.

(Growing Step)

Figure 45:
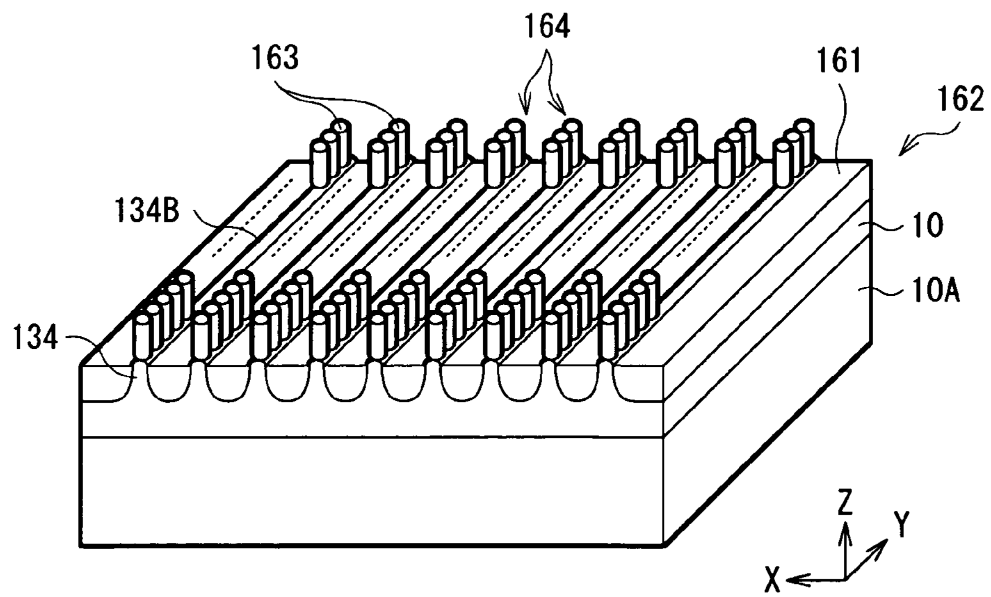
FIG. 45 is a schematic perspective view showing a step (growing step) following the step of FIG. 44.

After the substrate 162 is formed, for example, as shown in FIG. 45, a carbon nanotube 163 is grown through the use of iron exposed to the extreme tip portion 134B of the projection 134 as a catalyst, thereby a carbon nanotube structure 164 in which a plurality of carbon nanotubes 163 are linearly aligned can be formed.

Thus, in the modification, the control layer 161 is formed on the surface of the projection except for the extreme tip portion 134B of the projection 134, so the carbon nanotube 163 can be grown only on the extreme tip porting 134B of the projection 134.

<<Method of Manufacturing Field Electron Emission Device and Method of Manufacturing Display Unit>>

Fifth Embodiment

Next, referring to FIGS. 46 through 49, a method of manufacturing a field electron emission device and a method of manufacturing a display unit according to a fifth embodiment of the invention will be described below. In the methods according to the embodiment, a field electron emission device including a cathode which uses a carbon nanotube is formed, and the methods includes "a catalyst arranging step" of arranging a metal having a catalyst function for a carbon nanotube through the use of melting by a modulated heat distribution, and "a cathode forming step" of forming a cathode through growing the carbon nanotube. The obtained field electron emission device is used as, for example, a cathode panel of an FED through "a separation groove forming step" of forming a separation groove on the surface of the substrate so as to avoid the metal arranged in the catalyst arranging step.

The catalyst arranging step is the same as the catalyst arranging step described in the first embodiment, and the catalyst arranging step includes "a melting step" of applying the heat distribution 11 modulated according to a desired pattern to the surface of the material substrate 10 so as to melt the surface of the material substrate 10, and "a depositing step" of depositing the second material in a position corresponding to the heat distribution 11, that is, in a desired pattern through dissipating the heat of the surface of the material substrate 10. Moreover, the cathode forming step is substantially the same as the growing step in the method of manufacturing a tubular carbon molecule described in the first embodiment. Therefore, like components are donated by like numerals as of the first embodiment. Moreover, a part overlapping with the manufacturing steps in the first embodiment will be described referring to FIGS. 1 through 3.

(Catalyst Arranging Step)

At first, in the melting step, the modulated heat distribution 11 is applied to the material substrate 10 by the step shown in FIG. 1. Next, in the depositing step, the second material is deposited in a position corresponding to the high temperature region 11H of the heat distribution 11 by the step shown in FIG. 2 to form a substantially planar-shaped deposited region 14. Thus, the catalyst arranging step is completed, and the substrate 15 having the deposited region 14 on the material substrate 10 is formed.

(Cathode Forming Step)

Figure 3:
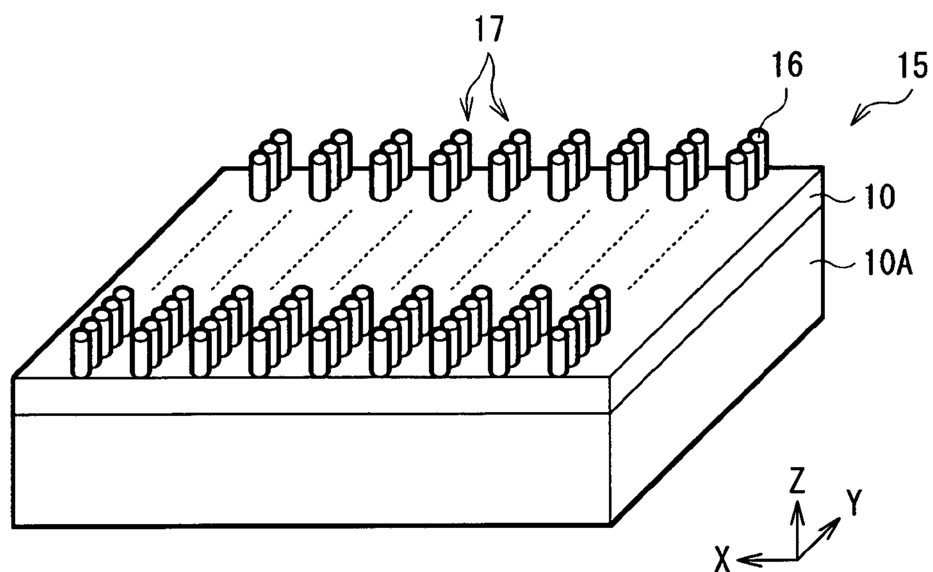
FIG. 3 is a schematic perspective view showing a step (growing step) following the step of FIG. 2.
Figure 46:
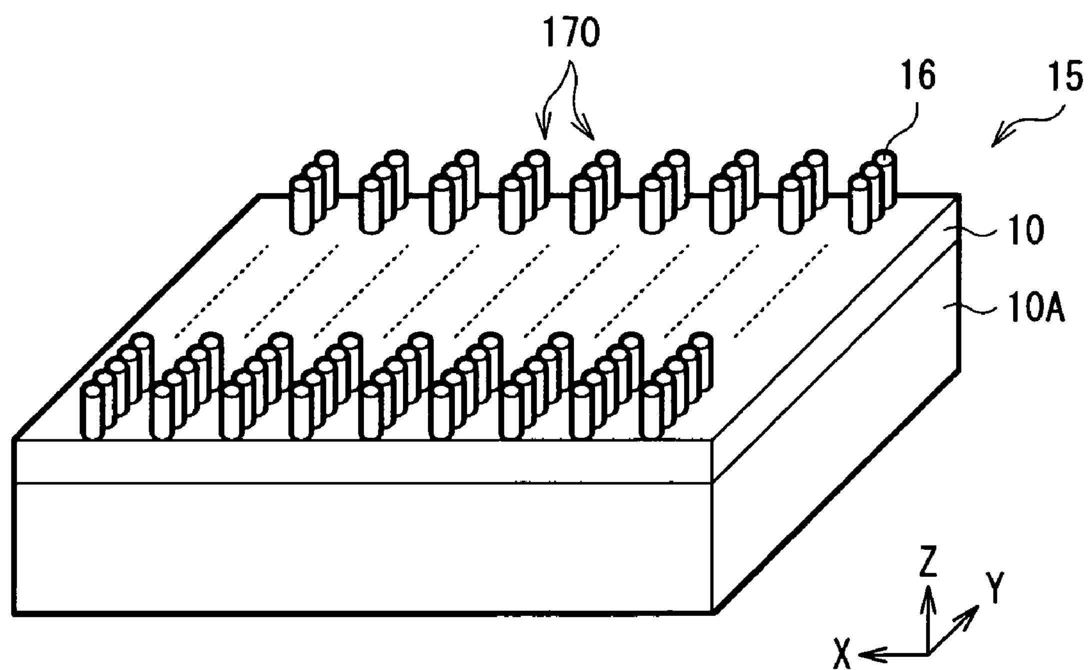
FIG. 46 is a schematic perspective view showing a cathode forming step in a method of manufacturing a field electron emission device and a method of manufacturing an FED according to a first embodiment of the invention.

Next, a plurality of carbon nanotubes 16 are grown on the substrate 15 by the CVD method through the step shown in FIG. 3. Thereby, as shown in FIG. 46, a cathode 170 in which the carbon nanotubes 16 are linearly aligned according to the pattern of the deposited region 14 is formed. The diameter of the carbon nanotube 16 can be determined by the kind of a carbon compound as a material and growing conditions. The less the number of carbon nanotubes 16 included in one cathode 170 is, the more it is preferable, because an electric field is more easily concentrated.

(Separation Groove Forming Step)

Then, referring to FIGS. 47 and 48, the separation groove forming step will be described below. In the separation groove forming step, a separation groove is formed on the surface of the substrate 15 to separate the cathodes 170 from each other.

Figure 47:
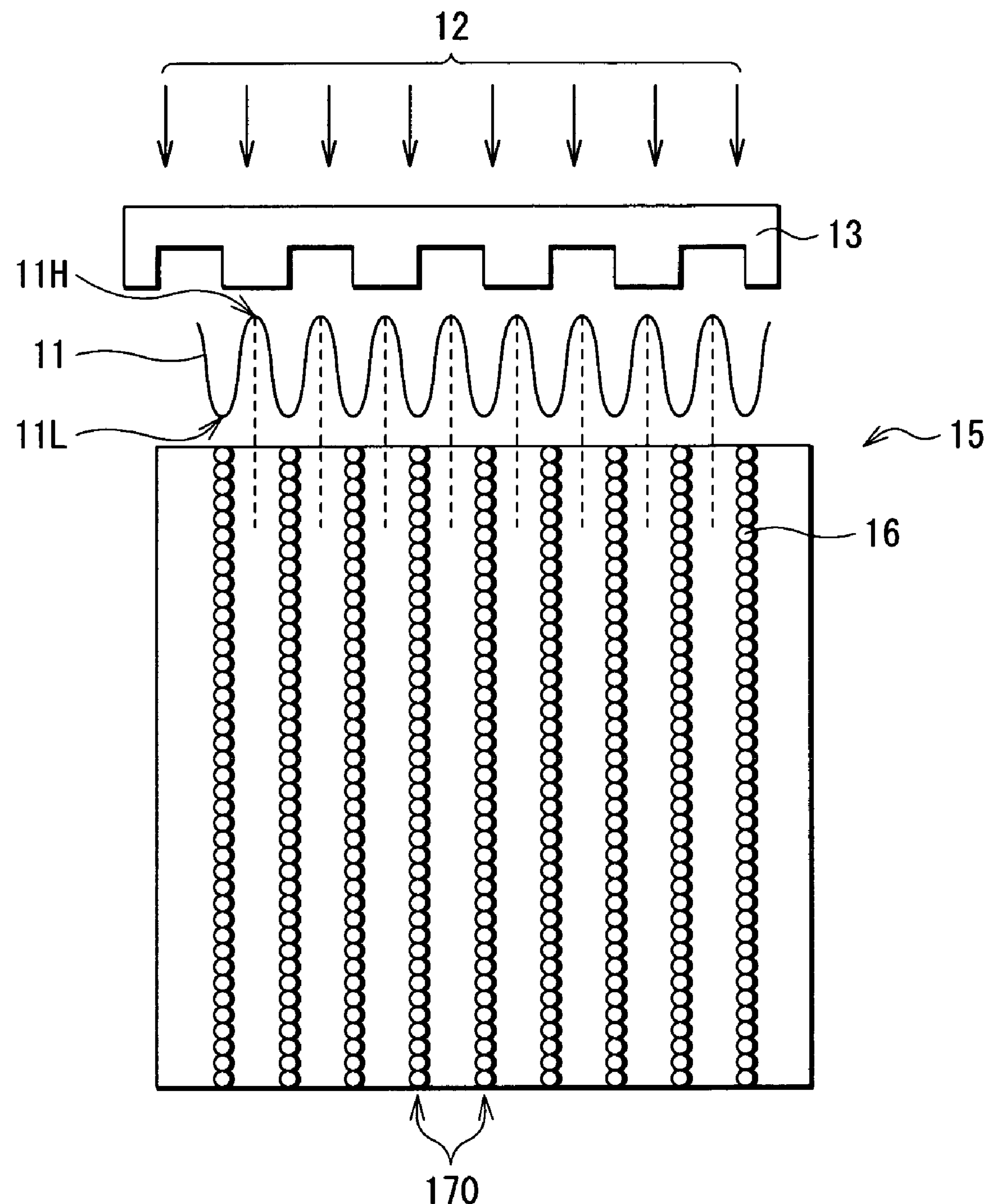
FIG. 47 is a schematic plan view showing a step (separation groove forming step) following the step of FIG. 46.

At first, as shown in FIG. 47, the heat distribution 11 which is formed through diffracting the energy beam 12 by the diffraction grating 13 and has a phase shift of 180° from that in the melting step is applied to the surface of the substrate 15. In other words, a relative position between the substrate 15 and the diffraction grating 13 is shifted one-half of a spacing (pitch) between arrays of carbon nanotubes 16 from the position in the melting step so that the high temperature region 11H of the heat distribution 11 is formed in a middle position between the arrays of the carbon nanotubes 16.

The energy amount of the energy beam 12 is set so that the surface of the substrate 15 is cut (ablated) in the high temperature region 11H. Thereby, as shown in FIG. 48, a parallel separation groove 180 is formed in a middle position between the arrays of the carbon nanotubes 16 so as to avoid a position where the carbon nanotubes 16 are formed. At this time, the position where the carbon nanotubes 16 are formed corresponds to the low temperature region 11L, so the energy amount of the energy beam 12 is low, and the temperature of the carbon nanotubes 16 is limited to, for example, 400° C. or less. Therefore, no adverse effect by the heat distribution 11 is exerted on the carbon nanotubes 16.

It is preferable that the supporting body 10A is made of an insulating material such as silicon dioxide ($SiO_2$), aluminum oxide ($Al_2O_3$), plastic or glass, and the material substrate 10 is completely cut at the time of forming the separation groove 180, because the cathodes 170 can be electrically separated from each other by the separation groove 180. Moreover, it is preferable that the separation groove 180 is formed so as to be engaged in the supporting body 10A, because the cathodes 170 can be electrically separated from each other more securely.

Thus, a field electron emission device including the substrate 15, a plurality of cathodes 170 including carbon nanotubes 16 which are aligned in a desired pattern on the substrate 15, and the separation groove 180 formed on the substrate 15 to separate the cathodes 170 from each other can be obtained. Each cathode 170 includes one array of carbon nanotubes 16 linearly aligned.

(FED)

Figure 49:
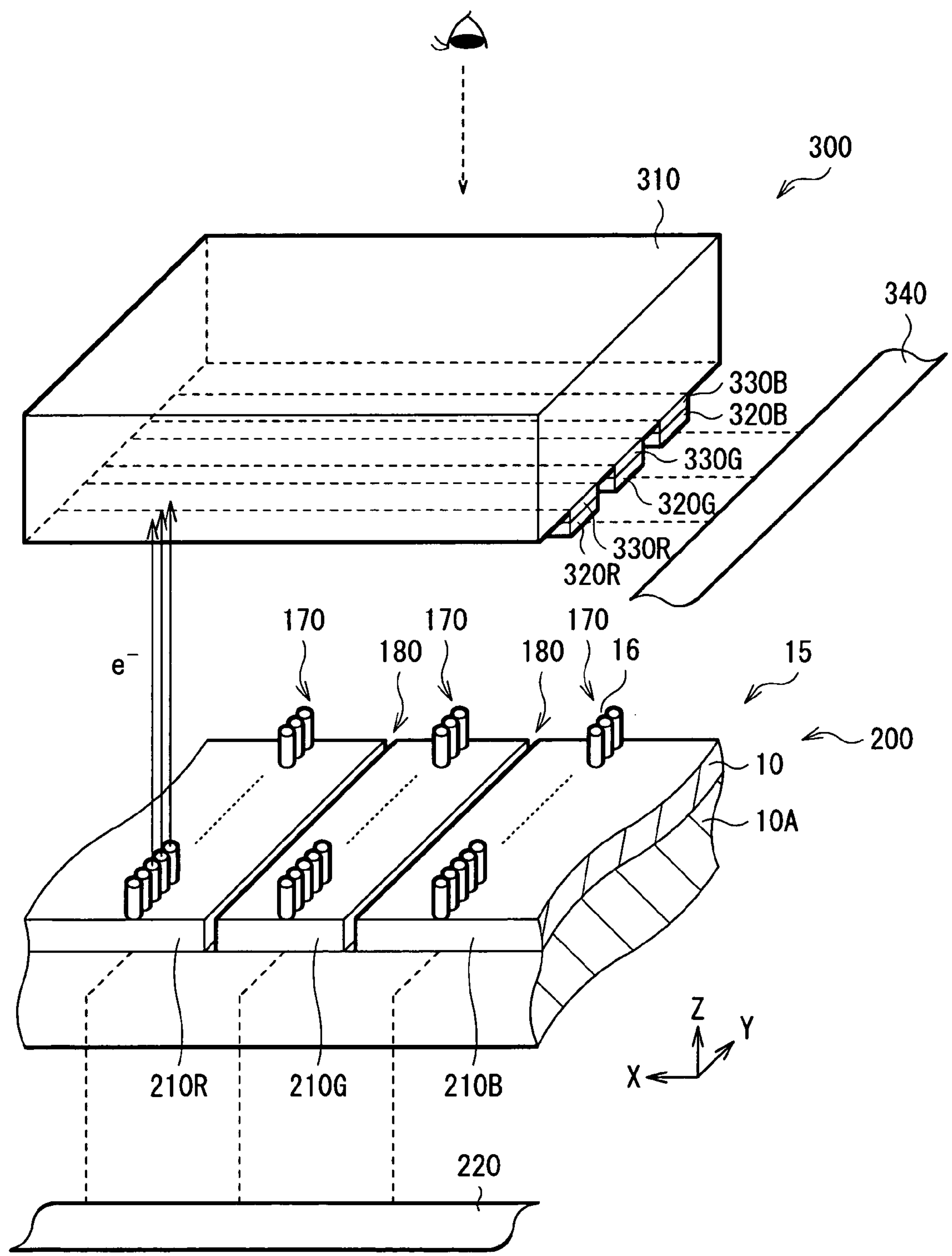
FIG. 49 is a perspective view of a brief structure of an FED using a field electron emission device which includes a cathode shown in FIG. 48.

FIG. 49 shows a schematic view of an FED using such a field electron emission device. In the FED, a cathode panel 200 and an anode panel 300 are combined as one unit so as to face each other, and the interior of the FED is in a high vacuum state.

The cathode panel 200 includes the substrate 15 on which the above-described cathodes 170 are formed. As the cathode panel 200, the combination of a plurality of substrates 15 can be used according to necessary screen dimensions and the size of the substrate 15. The cathode 170 is connected to a data driver 220 through a cathode electrode for red (R) 210R, a cathode electrode for green (G) 210G, and cathode electrode for blue (B) 210B. As the cathode electrodes 210R, 210G and 210B, the material substrate 10 cut by the separation groove 180 may be used, or another wiring may be laid.

In the anode panel 300, an anode electrode for R 320R, an anode electrode for G 320G and an anode electrode for B 320B are alternately aligned on a transparent substrate 310 made of a glass material or the like on a pixel-by-pixel basis. The anode electrodes 320R, 320G and 320B are aligned orthogonal to the cathode electrodes 210R, 210G and 210B, respectively. Moreover, a scan driver 340 is connected to the anode electrodes 320R, 320G and 320B. A phosphor film for R 330R, a phosphor film for G 330G and a phosphor film for B 330B are formed on the surfaces of the anode electrodes 320R, 320G and 320B on a side closer to the transparent substrate 310, respectively.

In the FED, for example, when a voltage is selectively applied between the anode electrodes 320R, 320G and 320B and the cathode electrodes 210R, 210G and 210B, field electron emission occurs in the cathodes 170 in an intersection point to emit electrons $e^-$ toward the anode electrodes 320R, 320G and 320B. The electrons e-emitted from the cathodes 170 pass through a fine hole (not shown) disposed in each of the anode electrodes 320R, 320G and 320B to collide with the phosphor films 330R, 330G and 330B, thereby a phosphor emits light. A desired image is displayed by the light emission from the phosphor. In this case, the carbon nanotubes 16 of the cathodes 170 are formed in the deposited regions 14 made of iron which is deposited with a fine width W and a fine spacing L which are impossible to achieve by the conventional photolithography, so a high-resolution image is clearly displayed.

Thus, in the embodiment, the patterns of the deposited regions 14 made of iron having a catalyst function for forming the carbon nanotube 16 are formed through the use of melting by the modulated heat distribution 11, and the cathodes 170 are formed through growing the carbon nanotubes 16 through the use of the patterns of the deposited regions 14, so the patterns of the deposited regions 14 with a fine width W and a fine spacing L which is impossible to achieve by the conventional photolithography are formed through controlling the heat distribution 11, thereby the cathodes 170 in which the carbon nanotubes 16 are regularly aligned according to the patterns of the deposited regions 14 can be obtained. Therefore, a fine-pitch FED which can clearly display a higher definition image can be achieved through the use of the field electron emission device including the cathodes 170.

Moreover, the substrate 15 having the pattern of the deposited region 14 can be formed by a dry process, so compared to the process using the conventional photolithography, the embodiment can obtain advantages that the production is easier; the reproducibility is superior; and the cost can be reduced.

Further, in the embodiment, after the heat distribution 11 is applied to the surface of the material substrate 10 made of silicon including iron as an additives so as to melt the surface of the material substrate 10, the heat of the surface of the material substrate 10 is dissipated, so iron can be selectively deposited in a position corresponding to the heat distribution 11 to form a pattern made of a substantially planar-shaped deposited region 14.

In addition, in the embodiment, the energy beam 12 is diffracted to apply the heat distribution 11, so when the periodic spacing P in the diffraction grating 13 is reduced, the spatial period T of the heat distribution 11 can be easily controlled, and the spacing L between the deposited regions 14 can be reduced with high precision.

In addition, in the embodiment, the separation groove 180 is formed on the surface of the substrate 15 so as to avoid the carbon nanotubes 16, so the cathodes 170 are separated from each other by the separation groove 180, and when the cathodes 170 are used as the cathode panel 200 of the FED, the data driver 220 is connected to each cathode 170, thereby a voltage can be selectively applied.

Further, the heat distribution 11 is applied through diffracting the energy beam 12 so as to form the separation groove 180, so the separation groove 180 can be formed in a middle position between the arrays of the carbon nanotubes 16 which are formed with a fine spacing with high precision. Moreover, a plurality of separation grooves 180 can be formed in a shorter time than in the case of using typical laser ablation, and no adverse effect by heat is exerted on the carbon nanotubes 16.

[Modification 12]

Figure 50:
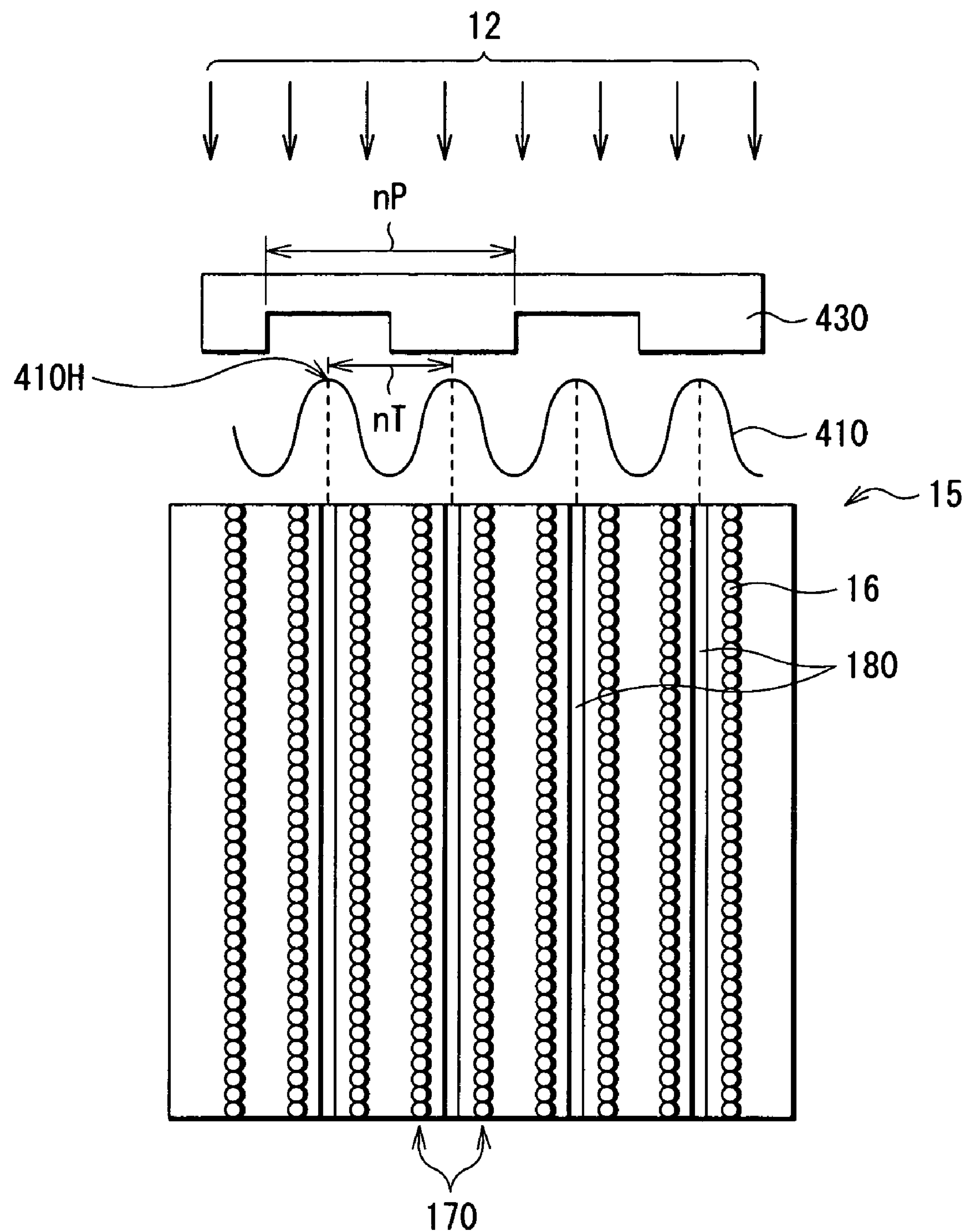
FIG. 50 is a schematic plan view showing a separation groove forming step according to Modification 12 of the invention.

Next, referring to FIG. 50, Modification 12 of the fifth embodiment will be described below. In the modification, a separation groove 180 is formed every plurality of arrays of the carbon nanotubes 16, for example, every two arrays, and each of a plurality of cathodes 170 includes two arrays of the carbon nanotubes 16. Likewise, one separation groove 180 can be formed every three arrays or four arrays of the carbon nanotubes 16, although it is not shown.

The separation groove 180 can be formed every plurality of arrays, when the spatial period of a heat distribution 410 applied to the surface of the substrate 15 is, for example, an integral multiple (nT; n is a positive integer and $n \geqq 2$) of the spatial period T of the heat distribution 11 in the melting step. The spatial period can be controlled, for example, through setting the periodic spacing in a diffraction grating 430 used in the separation groove forming step to an integral multiple (nP; n is a positive integer and n≧2) of the periodic spacing P in the diffraction grating in the melting step. Moreover, the spatial period can be controlled through controlling the wavelength λ or the incident angle of the energy beam 12.

A relative position between the substrate 15 and the diffraction grating 430 is controlled so that a high temperature region 410H of the heat distribution 410 is formed in a middle position between the arrays of the carbon nanotubes 16 as in the case of the first embodiment.

In the modification, the separation groove 180 can be formed every plurality of arrays of the carbon nanotubes 16.

[Modification 13]

Figure 51:
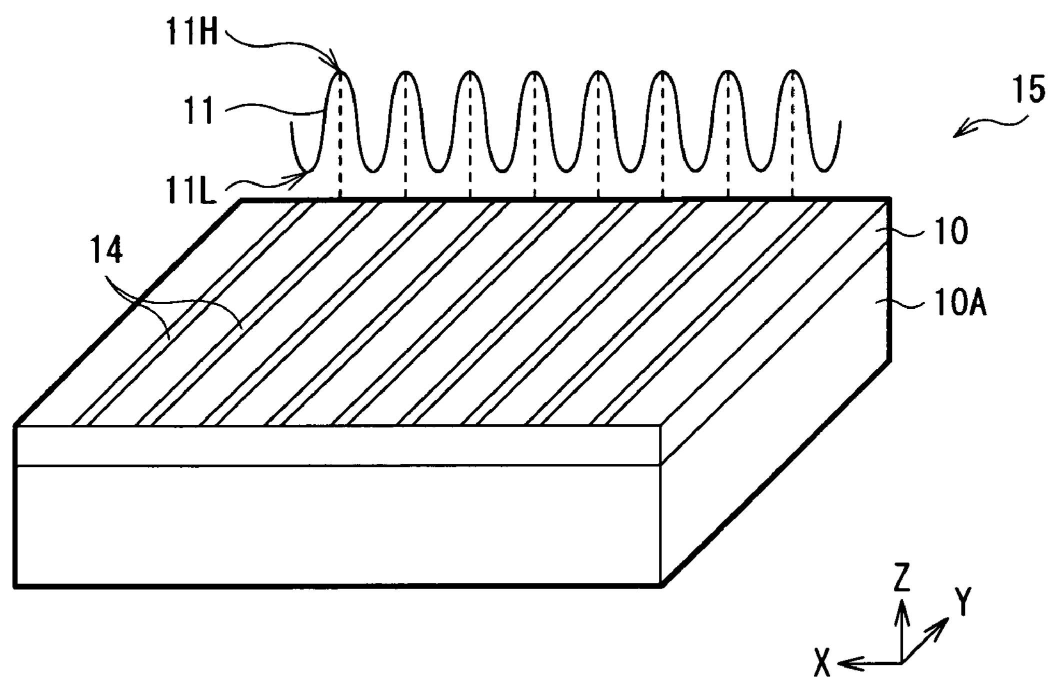
FIG. 51 is a schematic perspective view showing a separation groove forming step in a method of manufacturing a field electron emission device according to Modification 13 of the invention.
Figure 52:
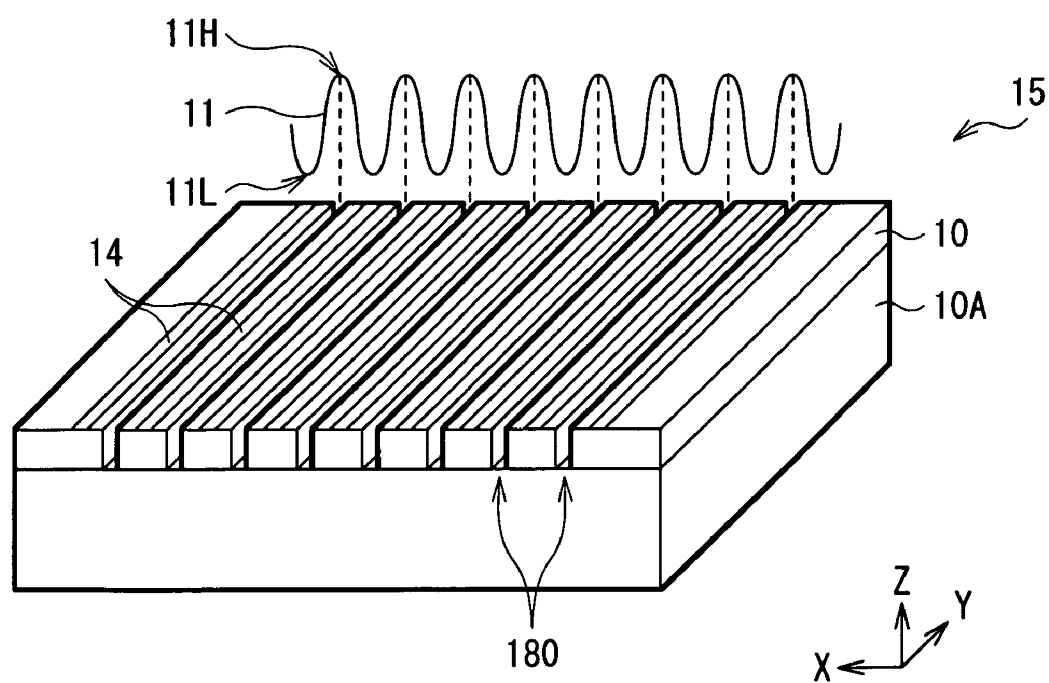
FIG. 52 is a schematic perspective view showing a step (separation groove forming step) following the step of FIG. 51.

Next, referring to FIGS. 51 through 53, Modification 13 of the invention will be described below. In the modification, after the pattern of the deposited region 14 is formed, the separation groove forming step is carried out before forming the cathodes 170 through growing the carbon nanotubes 16.

(Melting Step and Depositing step)

Figure 2:
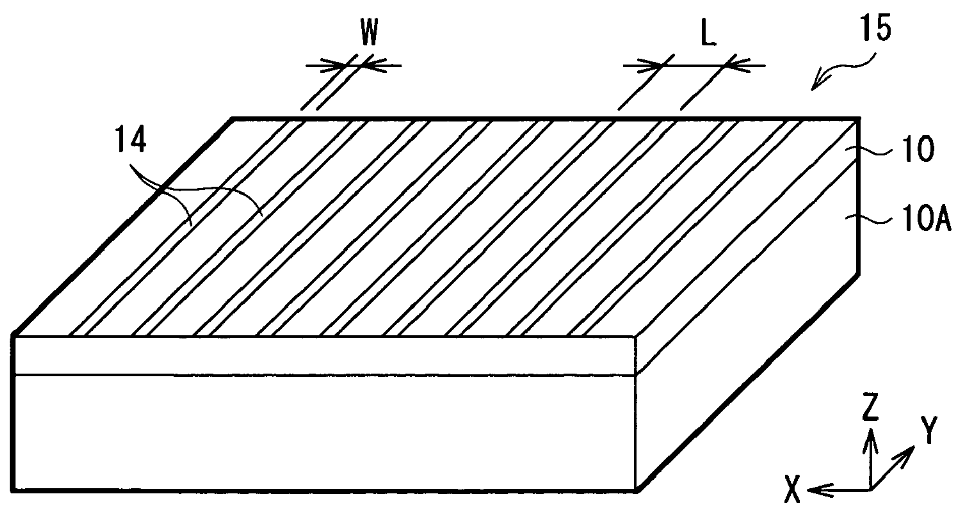
FIG. 2 is a schematic perspective view showing a step (depositing step) following the step of FIG. 1.

At first, as in the case of the fifth embodiment, a melting step and a depositing step are carried out by the steps shown in FIGS. 1 and 2 to form the substrate 15 having the pattern of the deposited region 14.

(Separation Groove Forming Step)

Next, referring to FIGS. 51 and 52, the separation groove forming step will be described below. At first, as shown in FIG. 51, the heat distribution 11 which is formed through diffracting the energy beam 12 by the diffraction grating 13 and having a phase shift of 180° from that in the melting step is applied to the surface of the substrate 15. In other words, a relative position between the substrate 15 and the diffraction grating 13 is shifted one-half of a spacing (pitch) between the deposited regions 14 from the position in the melting step so that the high temperature region 11H of the heat distribution 11 is formed in a middle position between the deposited regions 14.

The energy amount of the energy beam 12 is set so that the surface of the substrate 15 is cut in the high temperature region 11H. Thereby, as shown in FIG. 52, the parallel separation groove 180 is formed in a middle position between the patterns of the deposited regions 14 so as to avoid the pattern of the deposited region 14.

(Cathode Forming Step)

Figure 53:
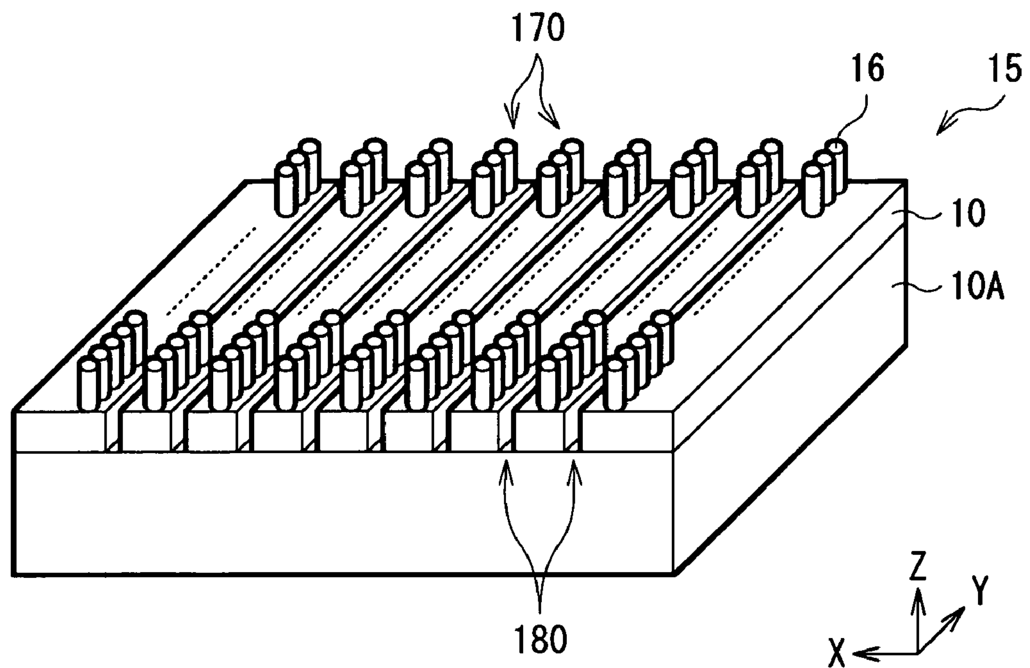
FIG. 53 is a schematic perspective view showing a step (cathode forming step) following the step of FIG. 52.

Next, as shown in FIG. 53, as in the case of the fifth embodiment, the carbon nanotubes 16 are grown in the deposited regions 14 by the step shown in FIG. 3 to form the cathodes 170.

In the modification, the cathodes 170 are formed through growing the carbon nanotubes 16 after forming the separation groove 180, so an adverse effect by the heat distribution 11 can securely be prevented from being exerted on the carbon nanotubes 16.

[Modification 14]

Figure 54:
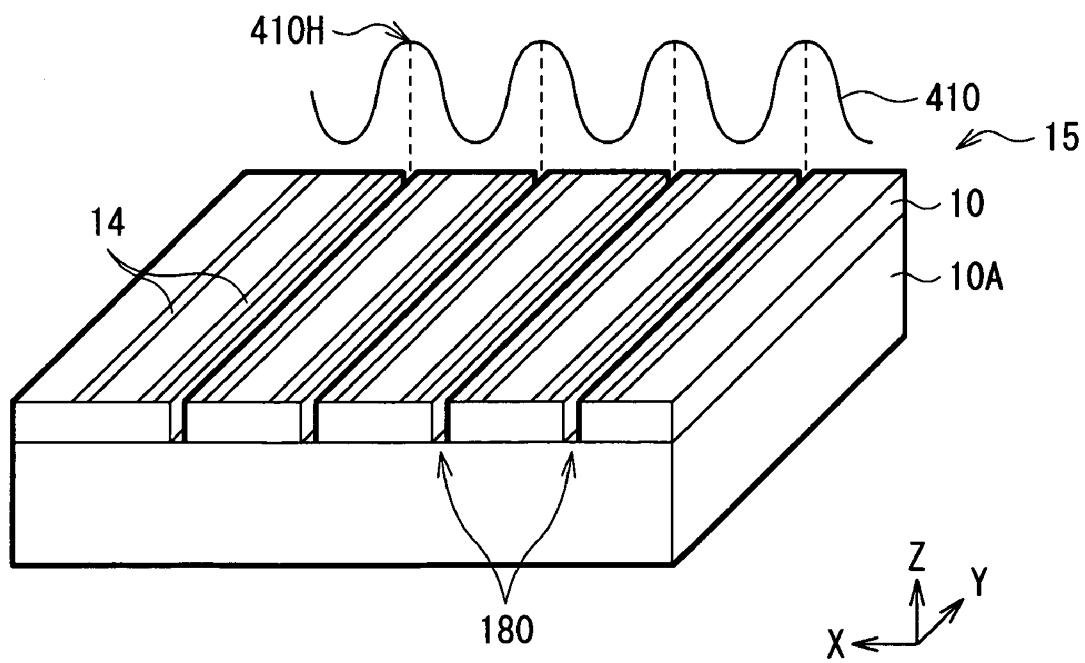
FIG. 54 is a schematic perspective view showing a separation groove forming step according to Modification 14 of the invention.

FIG. 54 shows a separation groove forming step in Modification 14 of the invention. In the modification, by the method according to Modification 13, the separation groove 180 is formed every plurality of deposited regions 14, for example, every two deposited regions 14 as in the case of Modification 12.

[Modification 15]

Figure 55:
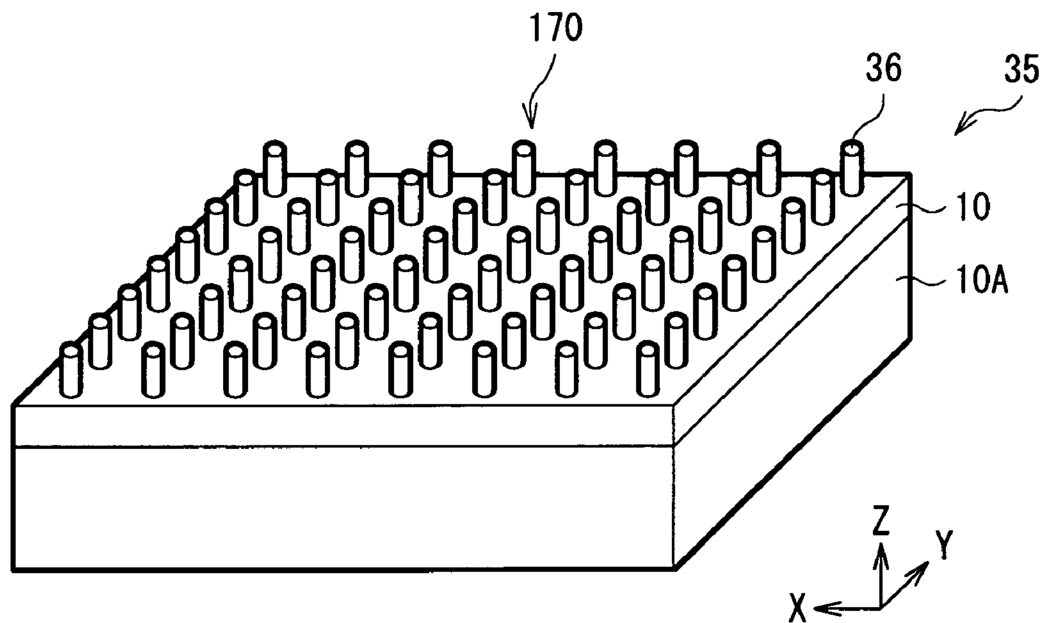
FIG. 55 is a schematic perspective view showing a cathode forming step in a method of manufacturing a field electron emission device and a method of manufacturing an FED according to Modification 15 of the invention.
Figure 56:
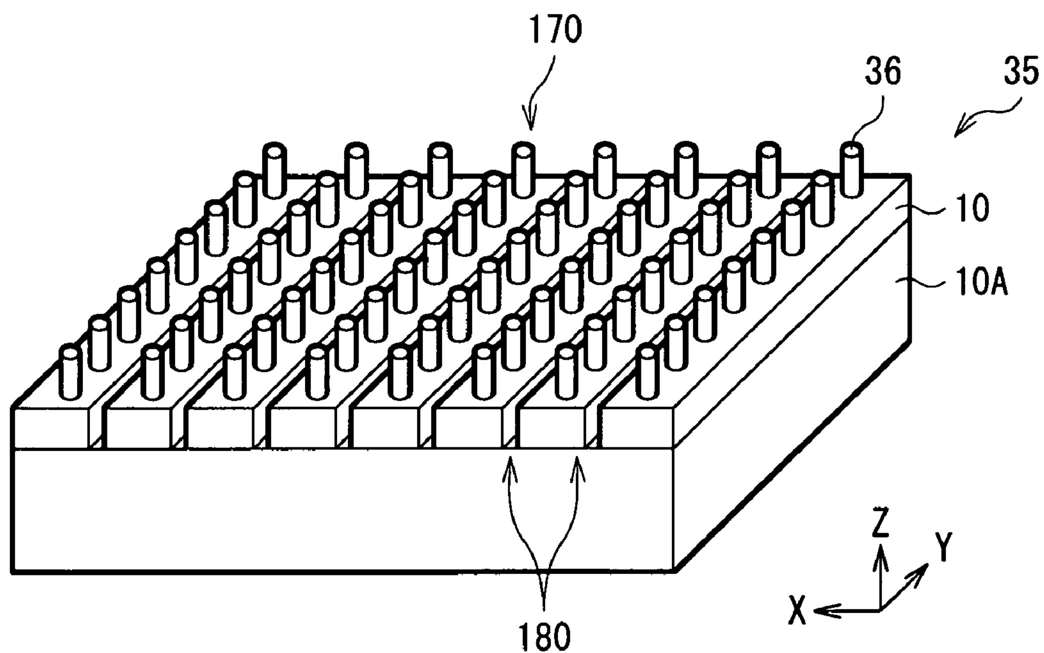
FIG. 56 is a schematic perspective view showing a step (separation groove forming step) following the step of FIG. 55.
Figure 57:
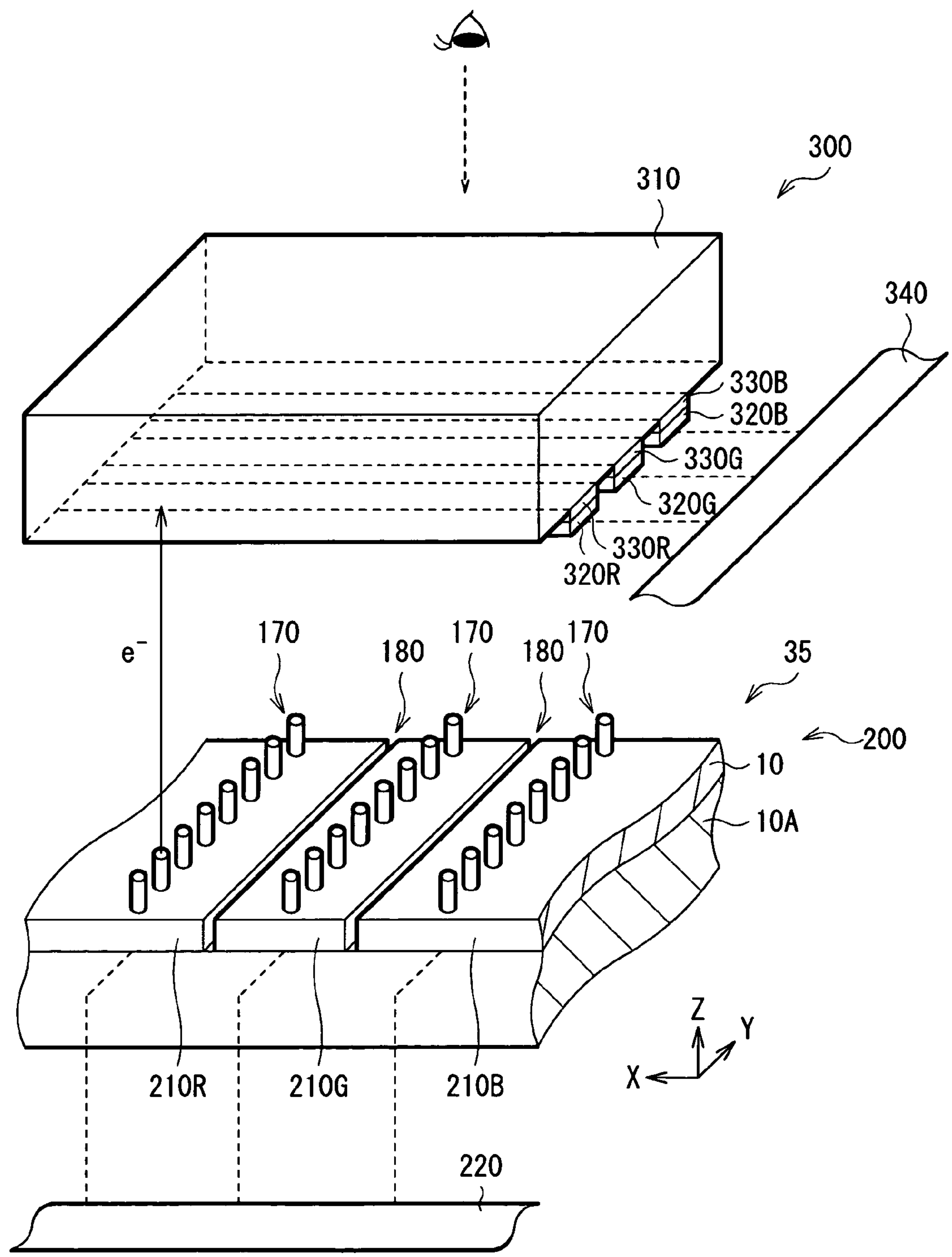
FIG. 57 is a perspective view showing a brief structure of an FED using a field electron emission device which includes a cathode shown in FIG. 56.

FIGS. 55 through 57 show another modification of the fifth embodiment. In the modification, in the melting step in the fifth embodiment, as in the case of Modification 1, the energy amount of an energy beam is modulated in a two-dimensional direction, that is, an X direction and a Y direction to apply an X-direction heat distribution 81X and a Y-direction heat distribution 81Y to the surface of the material substrate 10. In the modification, like components are donated by like numerals. Moreover, a part overlapping with the manufacturing steps in Modification 1 will be described referring to FIGS. 7 through 11, and 13, and a part overlapping with the manufacturing steps in the fifth embodiment will be described referring to FIGS. 47 and 48.

(Catalyst Arranging Step)

At first, as in the case of Modification 1, a melting step is carried out by the step shown in FIGS. 7 through 9 to apply the heat distribution 33 to the surface of the material substrate 10. Next, as in the case of Modification 1, a depositing step is carried out by the step shown in FIGS. 10, 11 and 13 to deposit the second material in a position corresponding to the heat distribution 33, that is, a position corresponding to the high temperature region 33H, thereby the deposited region 34 is formed. Therefore, the substrate 35 having the pattern of the deposited region 34 can be obtained.

(Cathode Forming Step)

Next, as in the case of Modification 1, as shown in FIG. 55, the cathodes 170 are formed by the step shown in FIG. 12 through growing the carbon nanotubes 36 on the substrate 35 by, for example, the CVD method. The carbon nanotubes 36 are grown only on the deposited region 34, so the cathodes 170 in which the carbon nanotubes 36 are aligned in a two-dimensional direction are formed. The less the number of the carbon nanotubes 36 included in one cathode 170 is, the more it is preferable, because an electric field can be easily concentrated.

(Separation Groove Forming Step)

Figure 48:
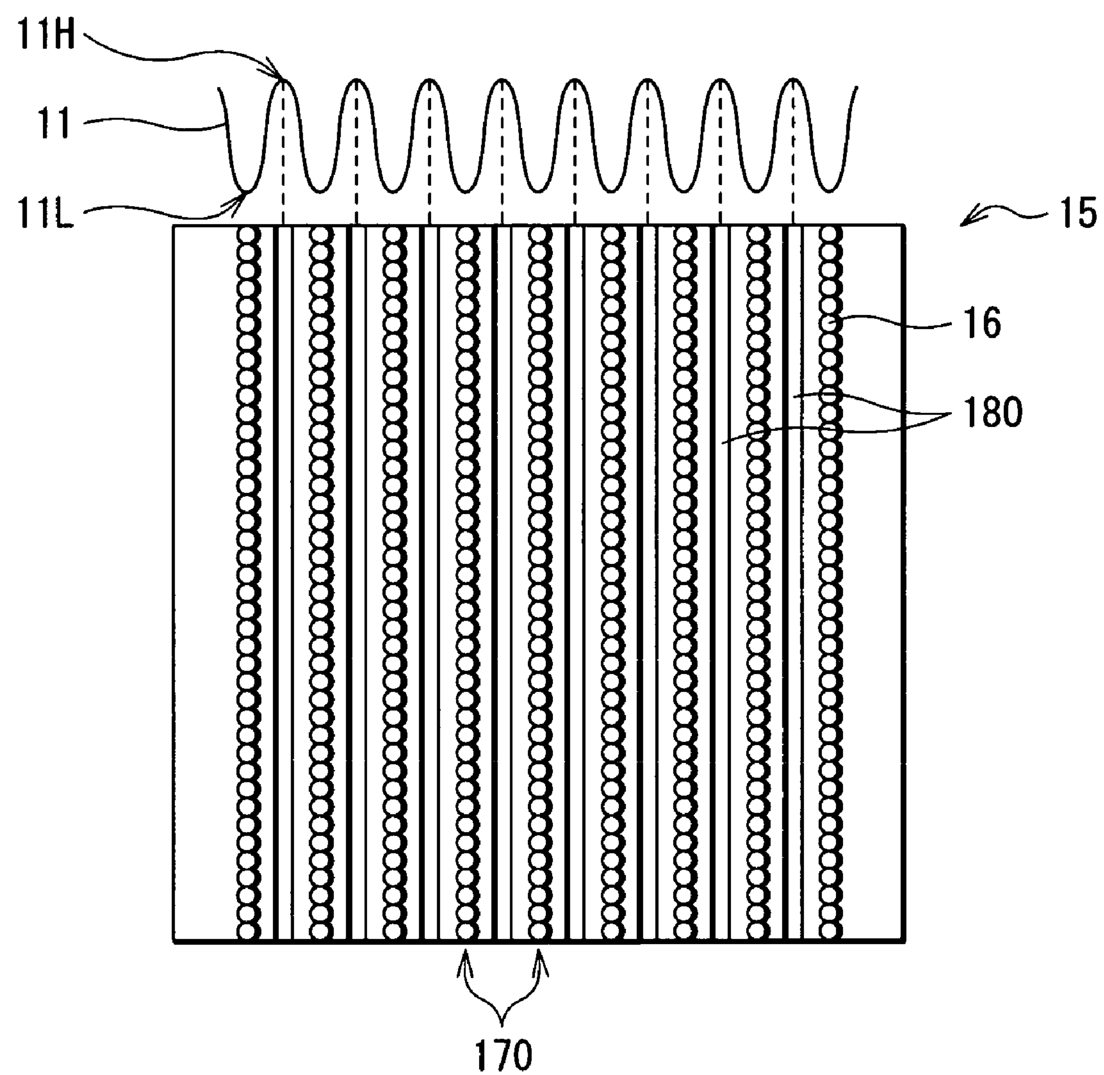
FIG. 48 is a schematic plan view showing a step (separation groove forming step) following the step of FIG. 47.

Then, as in the case of the fifth embodiment, a separation groove-forming step is carried out by the step shown in FIGS. 47 and 48. Thereby, as shown in FIG. 56, the parallel separation groove 180 is formed in a middle position so as to avoid the carbon nanotubes 36 aligned in a two-dimensional direction.

Thus, a field electron emission device including a plurality of cathodes 170 each of which includes one array of the carbon nanotube 36 aligned with a spacing and the separation groove 180 separating the cathodes 170 from each other can be obtained.

(FED)

FIG. 57 is a schematic view of an FED using such a field electron emission device. In the FED, the cathode panel 200 and the anode panel 300 are combined as one unit so as to face each other, and the interior of the FED is in a high vacuum state. The cathode panel 300 includes the substrate 35 on which the above-described cathodes 170 are formed. The anode panel 300 has the same structure as that in the fifth embodiment.

In the FED, for example, when a voltage is selectively applied between the anode electrodes 320R, 320G and 320B, and the cathode electrodes 210R, 210G and 210B, field electron emission occurs in the cathodes 170 in an intersection point so that the phosphors of the phosphor films 330R, 330G and 330B emit light to display a desired image. In this case, the carbon nanotubes 36 of the cathodes 170 are two-dimensionally aligned with a spacing, so an electric field strength on the surface of each carbon nanotube 36 increases to improve an electron emission property.

Thus, in the modification, as in the case of Modification 1, the energy amount of the energy beam 12 is modulated in a two-dimensional direction to form the heat distribution 33, so the pattern of the deposited region 34 aligned in a two-dimensional direction can be formed on the surface of the material substrate 10.

Moreover, as in the case of Modification 1, the energy beam 12 is diffracted by the diffraction grating 32 to form the heat distribution 33, so the spatial periods TX and TY of the heat distribution 33 can be easily controlled through reducing the periodic spacings PX and PY in the diffraction grating 32, thereby the spacings LX and LY between the deposited regions 34 can be reduced.

[Modification 16]

Figure 58:
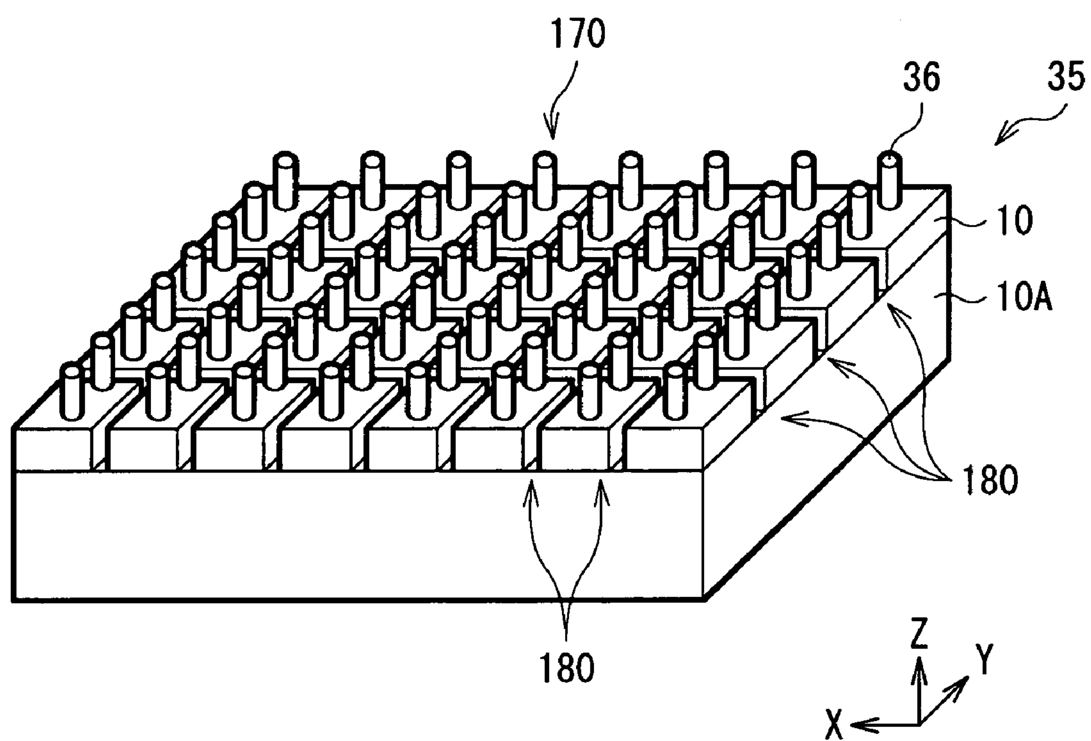
FIG. 58 is a schematic perspective view showing a separation groove forming step according to Modification 16 of the invention.

FIG. 58 shows the separation groove 180 formed in a grid shape in the separation groove forming step of Modification 15. In this case, a spaing in an X direction and a spacing in a Y direction in the separation groove 180 can be separately set.

In the case where the separation groove 180 is formed in such a grid shape, in a cathode electrode used as a cathode panel of an FED, wiring can be laid, for example, through making a hole from the backside of the substrate 35.

Moreover, in addition to the modification shown in FIG. 58, the separation groove forming step of Modification 15 can be variously modified. For example, after the deposited region 34 is formed, the separation groove forming step may be carried out before forming the cathodes 170 through growing the carbon nanotubes 36. Moreover, the separation groove 180 can be formed every plurality of arrays of the carbon nanotubes 36, for example, every two arrays.

Sixth Embodiment

Next, referring to FIGS. 59A through 62, a method of manufacturing a field electron emission device and a method of manufacturing a display unit according to a sixth embodiment of the invention will be described below. In the embodiment, in a catalyst arranging step, as in the case of Modification 2, the heat of the surface of the material substrate 10 is dissipated to form a projection on the surface of the material substrate 10, and the second material is deposited on a tip portion of the projection to form a substrate including a pattern of the projection in which at least the tip portion thereof is made of the second material. Moreover, in the embodiment, in a cathode forming step, the substrate and the electrode face each other, and an electric field is applied between them to vertically grow a carbon nanotube at a low voltage. Except for them, the manufacturing methods according to the embodiment are the same as those in the fifth embodiment, so like components are donated by like numerals as of the fifth embodiment. Moreover, a part overlapping with the manufacturing steps in Modification 2 will be described referring to FIGS. 1 and 14 through 17, and a part overlapping with the manufacturing steps in the fifth embodiment will be described referring to FIGS. 47 and 48.

(Catalyst Arranging Step)

At first, as in the case of Modification 2, after a melting step is carried out by the step shown in FIG. 1, a depositing step is carried out by the step shown in FIGS. 14 through 16, thereby the substrate 43 including the pattern of the projection 41 in which the deposited region 42 made of iron is formed in at least a tip portion thereof is formed.

(Cathode Forming Step)

Figure 59A:
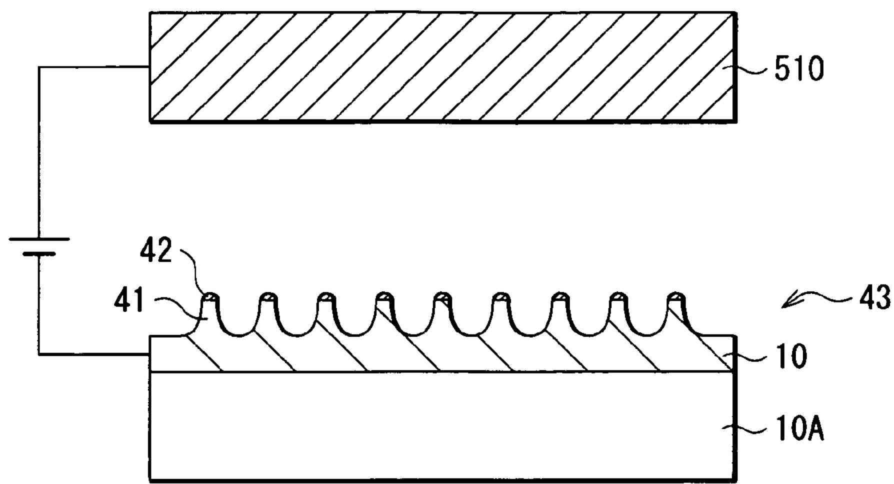
FIGS. 59A and 59B are schematic sectional views showing a cathode forming step in a method of manufacturing a field electron emission device and a method of forming an FED according to a sixth embodiment of the invention.
Figure 59B:
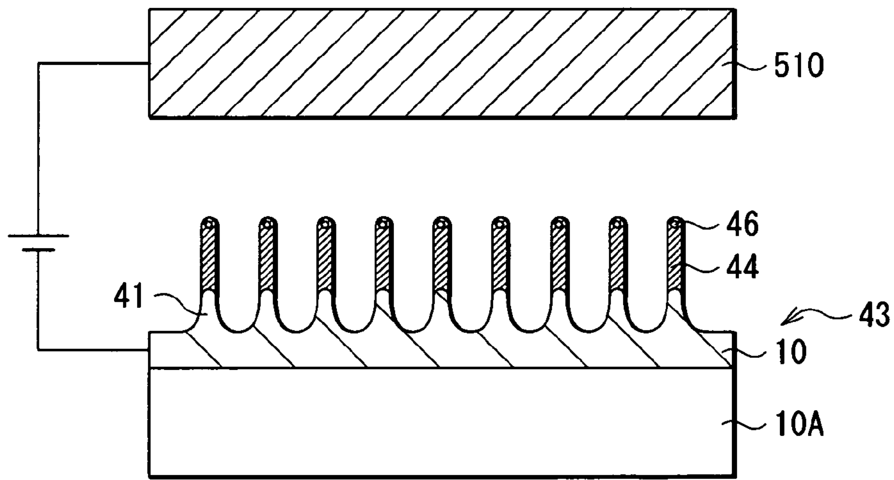
Figure 60:
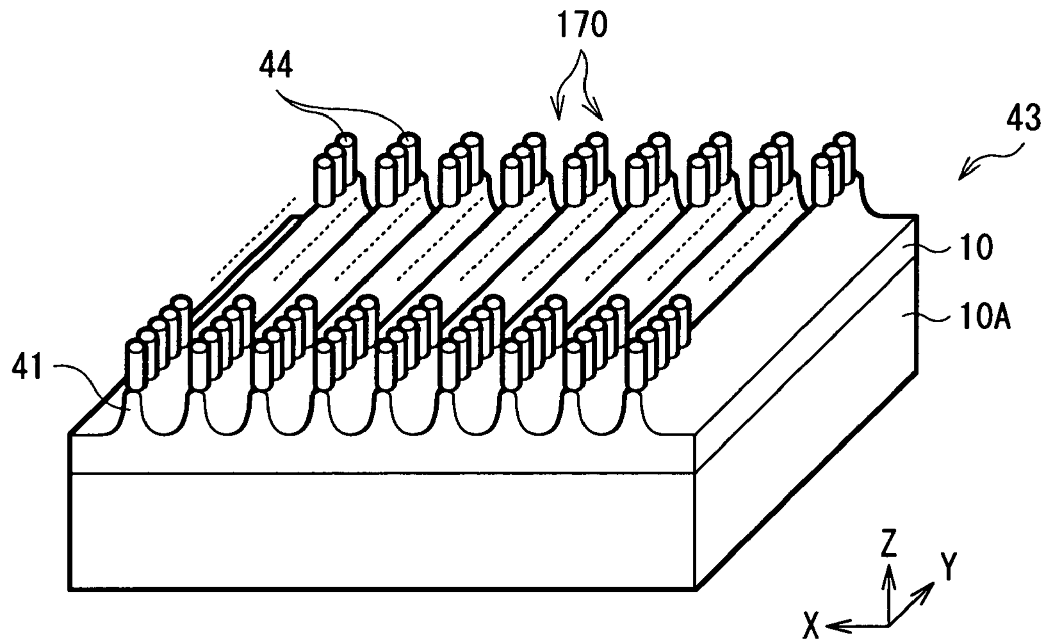
FIG. 60 is a schematic perspective view showing a step (cathode forming step) following the step of FIG. 59B.

Next, referring to FIGS. 59A through 60, a cathode forming step will be described below. As in the case of Modification 2, by the step shown in FIG. 17, the carbon nanotubes 44 are grown on the substrate 43 by, for example, the CVD method, the PECVD method or the like to form the cathode 170 (refer to FIG. 60). At this time, as shown in FIG. 59A, the substrate 43 and an electrode 510 made of, for example, carbon (C) face each other, and a voltage is applied between them. As the projection 41 is formed on the substrate 43, an electric field is increased in a position of the projection 41, so as shown in FIG. 59B, the carbon nanotubes 44 can be vertically grown. Therefore, the growth directions of the carbon nanotubes 44 can be controlled to a uniform direction at a low voltage. In the cathode 170 obtained by the above-described steps, the orientations of the carbon nanotubes 44 are high, so when the cathode 170 is used as the cathode of the FED, the electron emission property can be improved. In the grown carbon nanotubes 44, a second material 46 deposited on the deposited region 42, that is, iron in the embodiment is included.

In the case where the carbon nanotubes 44 are grown while applying an electric field, as the first material constituting the material substrate 10, for example, a high conductive material such as silicon to which, for example, phosphorus (P) is added is preferably used.

(Separation Groove Forming Step)

Figure 61:
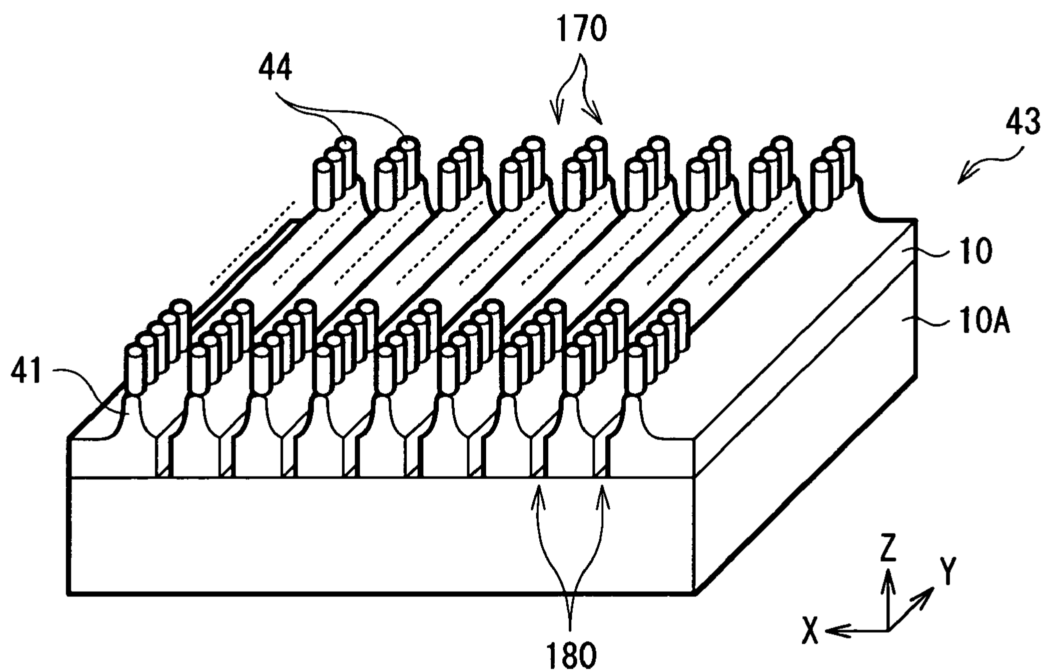
FIG. 61 is a schematic perspective view showing a step (separation groove forming step) following the step of FIG. 60.

Next, as in the case of the fifth embodiment, a separation groove forming step is carried out by the step shown in FIGS. 47 and 48. Thereby, as shown in FIG. 61, the separation groove 180 is formed in a middle position between arrays of carbon nanotubes 44 so as to avoid the arrays of the carbon nanotubes 44.

Thus, the field emission device including a plurality of cathodes 170 each of which includes one array of the carbon nanotubes 44 linearly aligned, and the separation groove 180 separating the cathodes 170 from each other can be obtained.

(FED)

Figure 62:
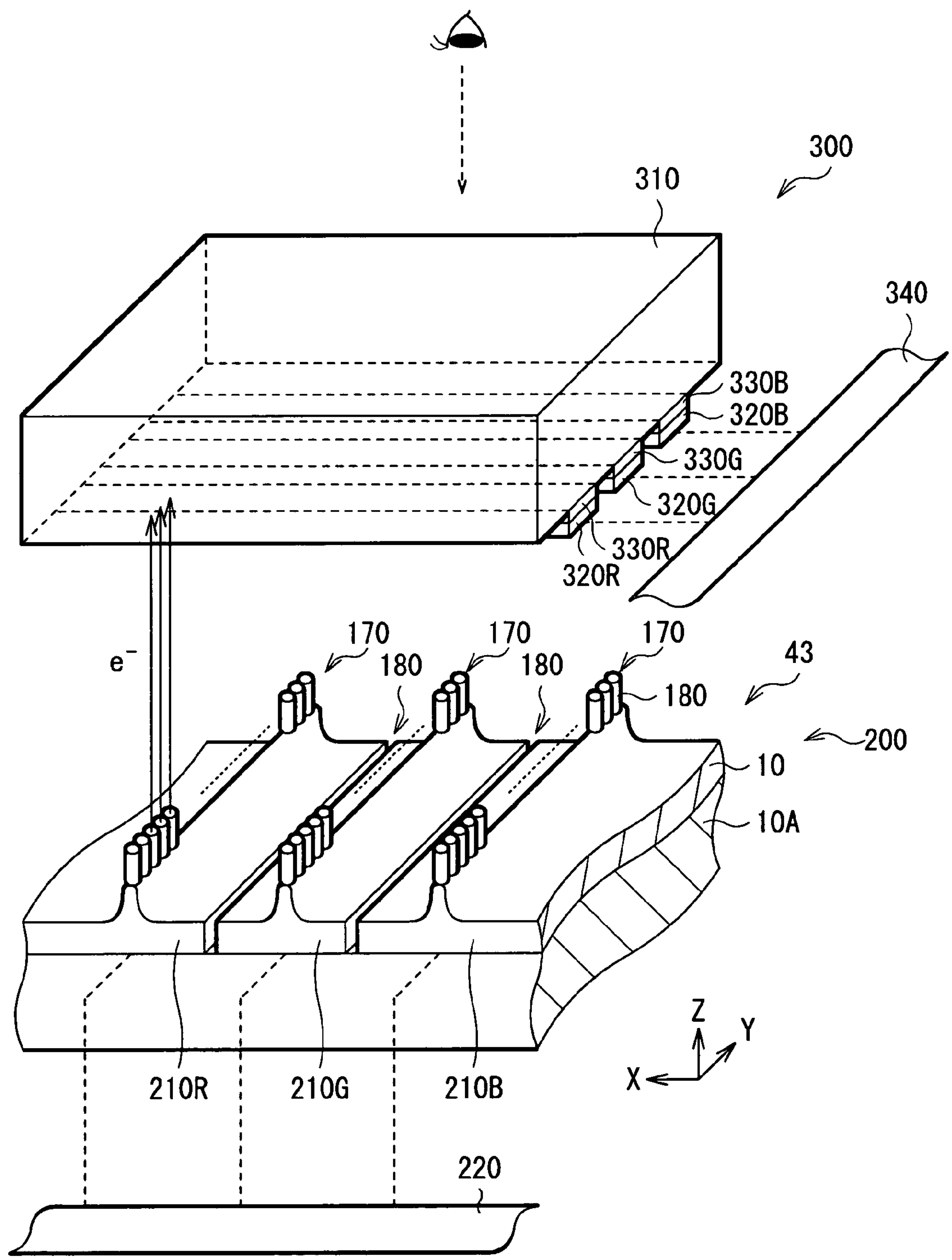
FIG. 62 is a perspective view showing a brief structure of an FED using a field electron emission device which includes a cathode shown in FIG. 61.

FIG. 62 shows a schematic view of an FED using such a field electron emission device. In the FED, the cathode panel 200 and the anode panel 300 are combined as one unit so as to face each other, and the interior of the FED is in a high vacuum state. The cathode panel 200 includes the substrate 43 on which the above-described cathodes 170 are formed. The anode panel 300 has the same structure as that in the first embodiment.

In the FED, for example, when a voltage is selectively applied between the anode electrodes 320R, 320G and 320B, and the cathode electrodes 210R, 210G and 210B, field electron emission occurs in the cathodes 170 positioned in an intersection point, and the phosphors of the phosphor films 330R, 330G and 330B emit light to display a desired image. In this case, the growth directions of the carbon nanotubes 44 of the cathodes 170 are vertically aligned, and the orientations of the carbon nanotubes 44 are high, so the amount of emitted electrons is equalized, and the electron emission property can be improved. Moreover, variations in intensity can be prevented.

Thus, in the embodiment, the projection 41 in which at least a tip portion thereof is made of the second material (iron) is formed in a predetermined position of the material substrate 10, so compared to the case where the pattern is formed in a planar shape, the width of the deposited region 42 can be reduced, and compared to the fifth embodiment, a finer pattern can be formed.

Moreover, in the embodiment, the substrate 43 and the electrode 510 face each other, and a voltage is applied between them, so the growth directions of the carbon nanotubes 44 can be controlled to a uniform direction at a low voltage. Therefore, the orientations of the carbon nanotubes 44 of the cathode 170 can be improved, and when the cathode 170 is used as the cathode of the FED, the electron emission property can be improved, and variations in intensity can be prevented.

[Modification 17]

Figure 63A:
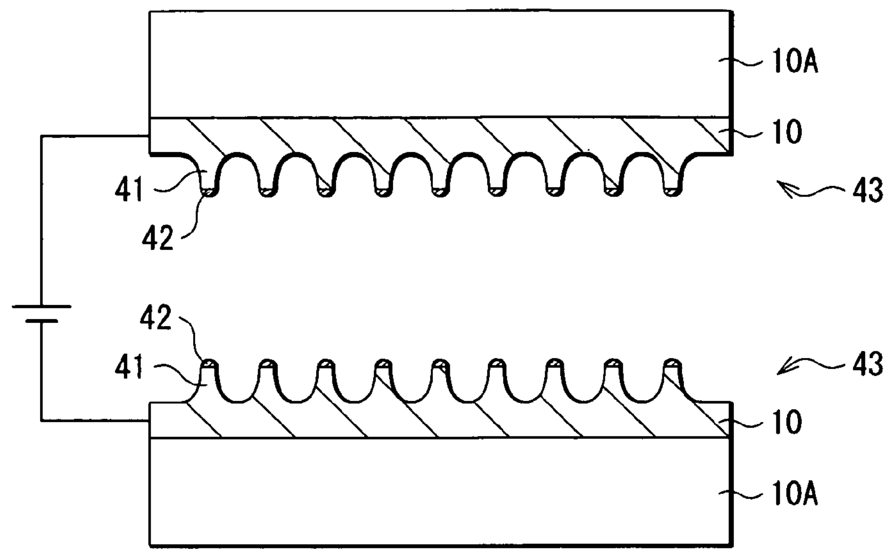
FIGS. 63A and 63B are schematic sectional views showing a cathode forming step according to Modification 17 of the invention.
Figure 63B:
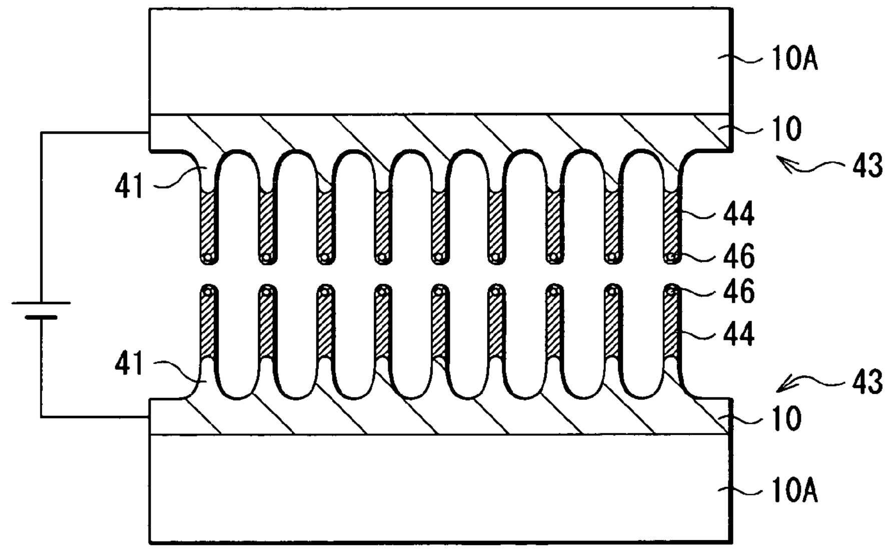

FIGS. 63A and 63B show a modification of the cathode forming step in the sixth embodiment. In the modification, as shown in FIG. 63A, two substrates 43 face each other so that the patterns of the projections 41 of the two substrates 43 face each other, and an electric field is applied between the two substrates 43. In the modification, an electric field is increased in the position of the projections 41, and as shown in FIG. 63B, the carbon nanotubes 44 can be vertically grown from the tip portions of the projections 41 of the two substrates 43. Therefore, in addition to the effect in the sixth embodiment, the carbon nanotubes 44 can be vertically formed on the two substrates 43 at the same time, so production efficiency can be further improved.

[Modification 18]

Next, referring to FIGS. 64 through 65B, another modification of the cathode forming step in the sixth embodiment will be described below. In the modification, as an electrode, an electrode in which the pattern of a projection corresponding to the pattern of the projection 41 of the substrate 43 is used, and the substrate 43 and the electrode are disposed so that the pattern of the projection 41 of the substrate 43 and the pattern of the projection of the electrode face each other.

Figure 64:
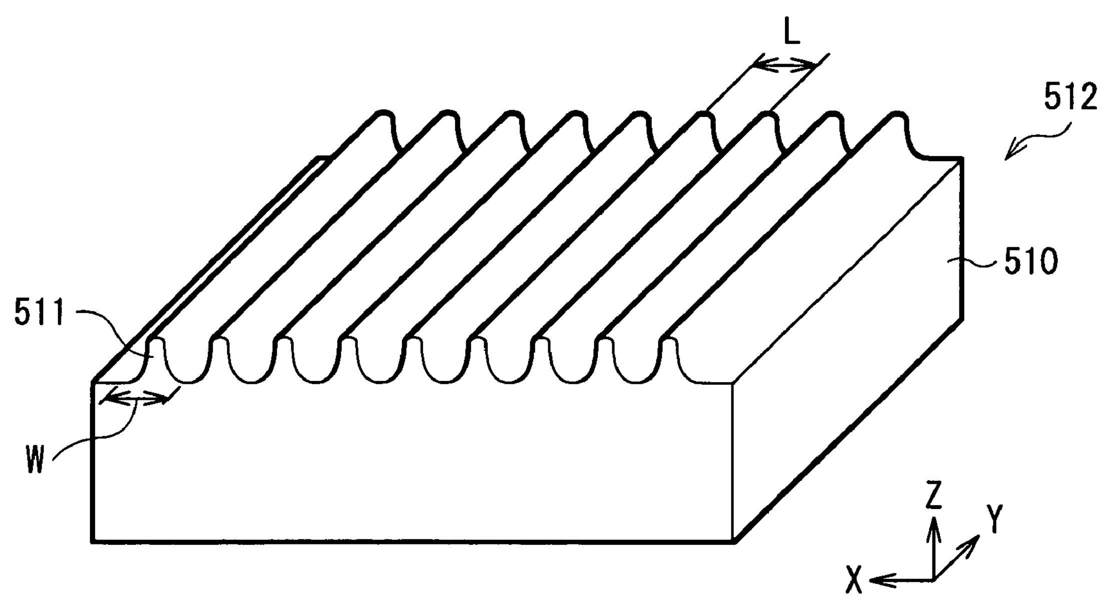
FIG. 64 is a schematic perspective view showing a cathode forming step according to Modification 18 of the invention.

At first, as shown in FIG. 64, as in the case of the melting step and the depositing step in the sixth embodiment, the pattern of a projection 511 is formed on the same electrode 510 as that in the sixth embodiment to form a projection electrode 512. The shape, the width W and the spacing L of the projection 511 are the same as in the case of the projection 41, except that no deposited region is formed on a tip portion of the projection 511.

Figure 65A:
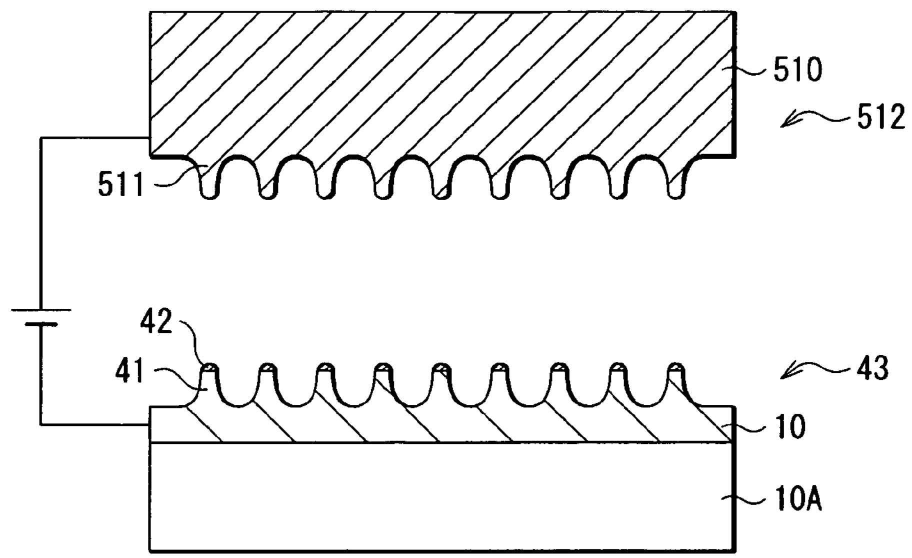
FIGS. 65A and 65B are schematic sectional views showing a step (cathode forming step) following the step of FIG. 64.
Figure 65B:
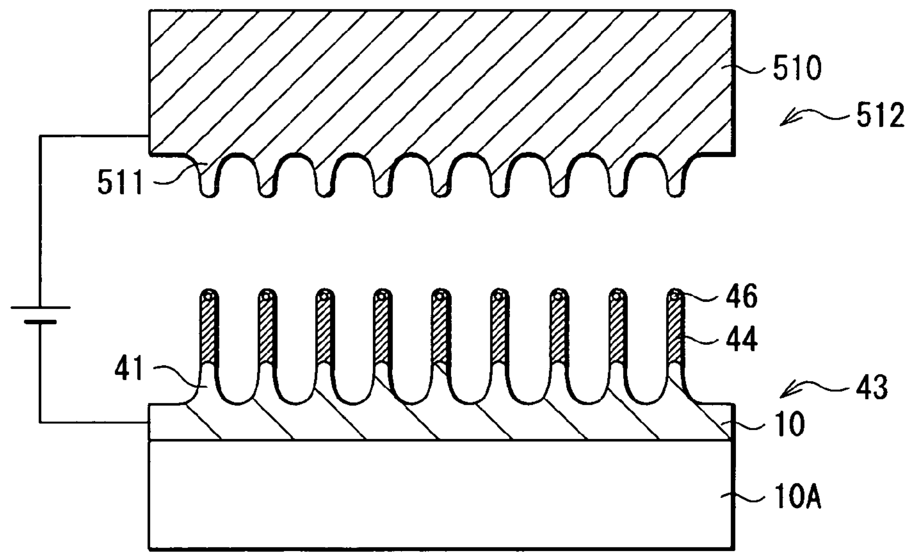

Next, as shown in FIG. 65A, the pattern of the projection 41 of the substrate 43 and the pattern of the projection 511 of the projection electrode 512 face each other, and an electric field is applied between the substrate 43 and the projection electrode 512. Thereby, an electric field is increased in the positions of the projections 41 and 511, and as shown in FIG. 65B, the carbon nanotubes 44 can be vertically grown from the tip portion of the projection 41 of the substrate 43.

[Modification 19]

Figure 66A:
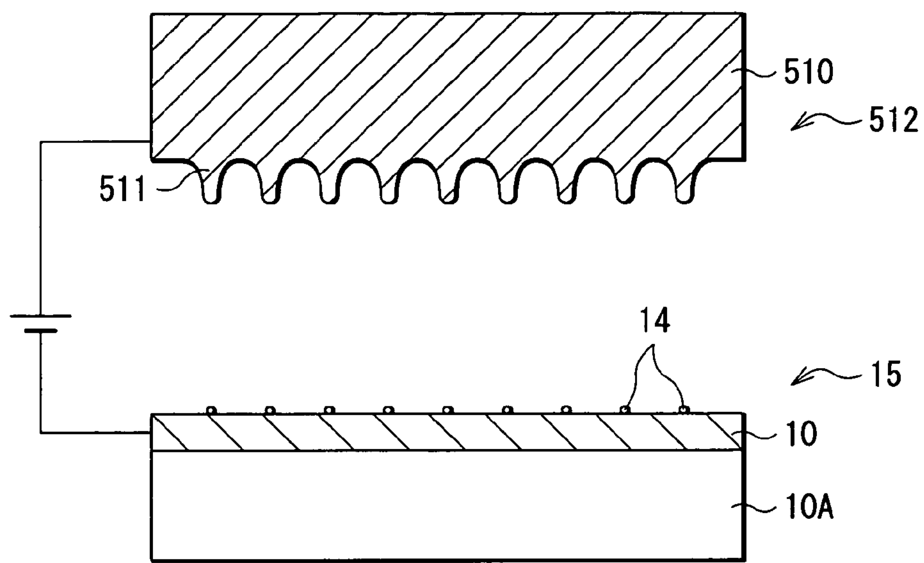
FIGS. 66A and 66B are schematic sectional views showing a cathode forming step according to Modification 19 of the invention.
Figure 66B:
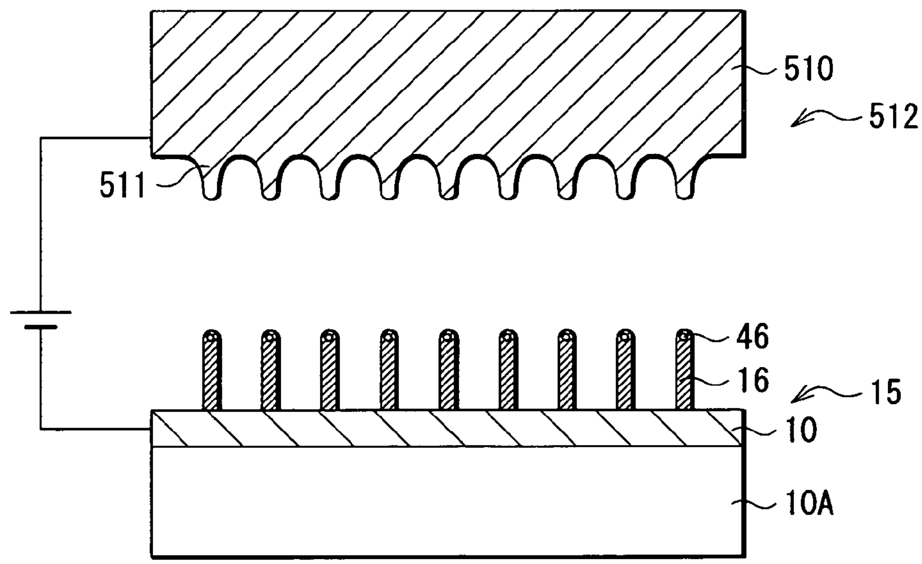

FIGS. 66A and 66B shows still another modification of the cathode forming step in the sixth embodiment. In the modification, as shown in FIG. 66A, the substrate 15 on which the pattern of the planar-shaped deposited region 14 in the fifth embodiment is formed, and the projection electrode 512 on which the pattern of the projection 511 is formed in Modification 18 face each other, and an electric field is applied between them. Thereby, an electric field is increased in the position of the projection 511, and as shown in FIG. 66B, the carbon nanotubes 16 can be vertically grown from the position of the deposited region 14. In the grown carbon nanotubes 16, the second material 46 deposited on the deposited region 14, that is, iron in the embodiment is included.

[Modification 20]

Figure 67A:
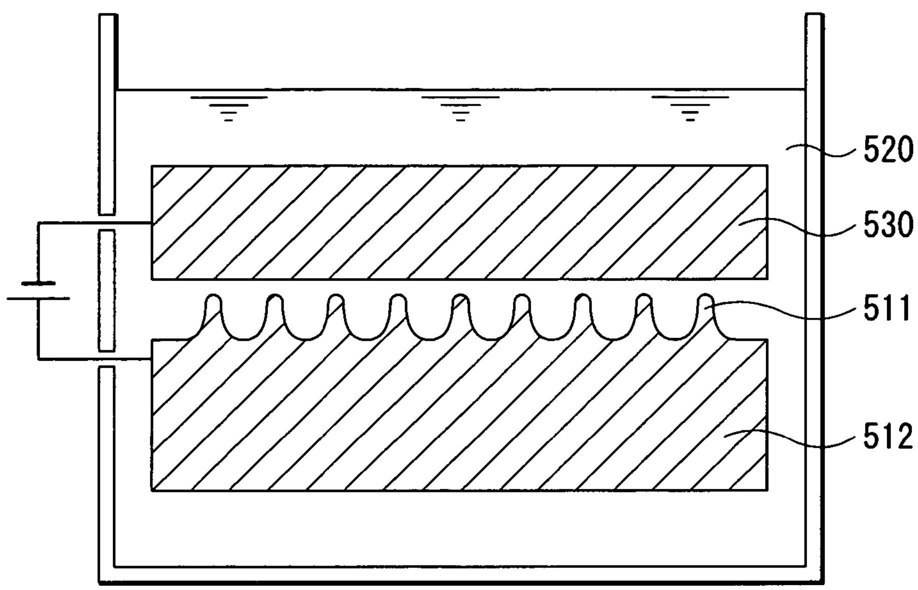
FIGS. 67A and 67B are schematic sectional views showing a reducing/depositing step in a catalyst arranging step according to Modification 20 of the invention.
Figure 67B:
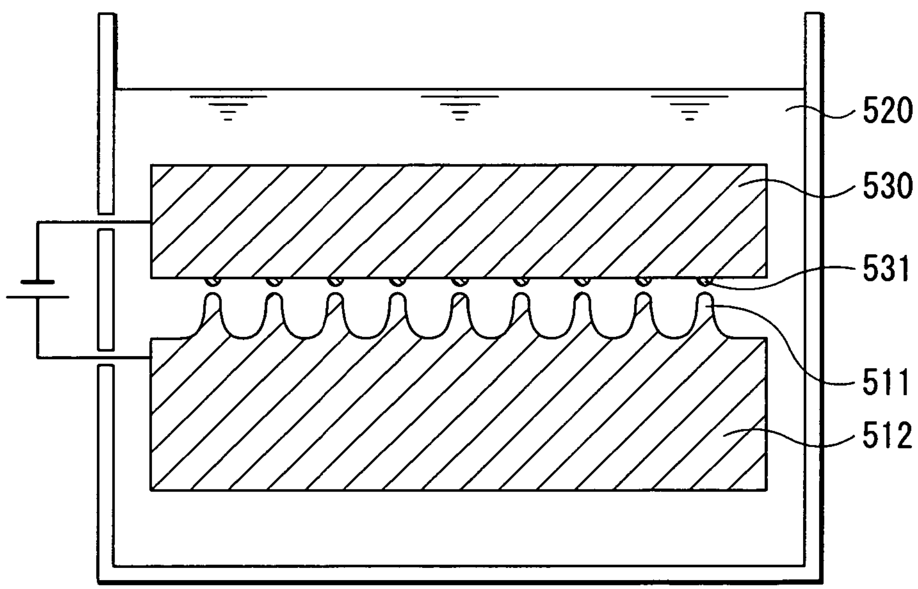

FIGS. 67A and 67B show a modification of the catalyst arranging step in the fifth embodiment. In the modification, the catalyst arranging step includes “a projection electrode forming step” of forming the pattern of a projection on the surface of a planar-shaped electrode through the use of a heat distribution modulated according to a desired pattern, and “a reducing/depositing step” of forming a pattern corresponding to a projection electrode made of a metal having a catalyst function on a conductive substrate through applying an electric field between the projection electrode and the conductive substrate in a catalyst solution including a metal having a catalyst function to reduce and deposit the metal.

(Projection Electrode Forming Step)

As shown in FIG. 64 in Modification 18, the pattern of the projection 511 is formed on the surface of an electrode 510 having a planar surface to form the projection electrode 512. A method of forming the pattern of the projection 511 is the same as that described in Modification 18.

(Reducing/Depositing Step)

Then, as shown in FIG. 67A, in a catalyst solution 520 including a metal having a catalyst function for forming a carbon nanotube, for example, iron, the projection electrode 512 and a conductive substrate 530 face each other, and an electric field is applied between them. As the metal having a catalyst function, in addition to iron, materials described as the second material in the first embodiment can be used. Thereby, an electric field is increased in the position of the projection 511, and as shown in FIG. 67B, iron is deposited by reduction according to the pattern of the projection 511 on the conductive substrate 530, thereby a deposited region 531 can be formed. Thus, the substrate 530 having the pattern of the deposited region 531 can be obtained, and the catalyst arranging step is completed.

In the modification, the pattern of the projection 511 is formed on the surface of the planar-shaped electrode 510 through the use of the heat distribution to form the deposited region 531 made of a catalyst metal (iron) on the conductive substrate 530 according to the pattern of the projection 511, so the deposited region 531 can be formed corresponding to the pattern of the projection 511 formed with a fine width and a fine spacing which are impossible to achieve by the conventional photolithography.

Seventh Embodiment

Next, referring to FIGS. 68A through 70, a method of manufacturing a field electron emission device and a method of manufacturing a display unit according to a seventh embodiment will be described below. In the embodiment, an extraction electrode forming step of forming an extraction electrode corresponding to a cathode is further included. In other words, in the embodiment, after the separation groove forming step is carried out in Modification 13, an extraction electrode is formed, and then a carbon nanotubes are grown to form a cathode.

(Melting Step and Depositing Step)

Figure 68A:
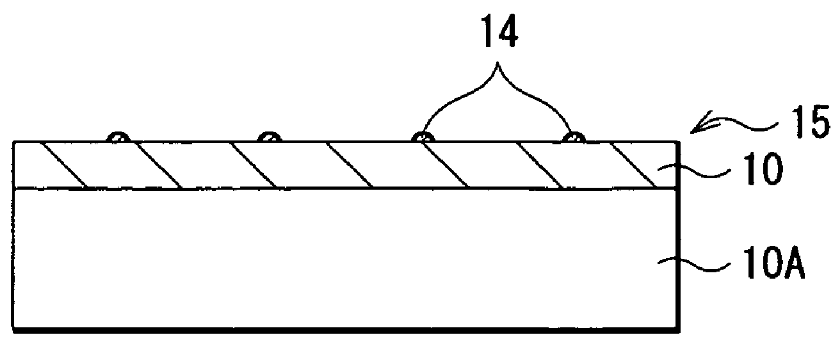
FIGS. 68A and 68B are schematic sectional views showing a depositing step and a separation groove forming step in a method of manufacturing a field electron emission device and a method of manufacturing an FED according to a seventh embodiment of the invention.

At first, as shown in FIG. 68A, as in the case of the fifth embodiment, the melting step and the depositing step are carried out, and the substrate 15 including the pattern of the deposited region 14 is formed. The deposited region 14 is formed in a substantially planar shape as described above; however, for the sake of easy understanding, in FIGS. 68A and 68B, the deposited region 14 is projected from the surface of the substrate 15.

(Separation Groove Forming Step)

Figure 68B:
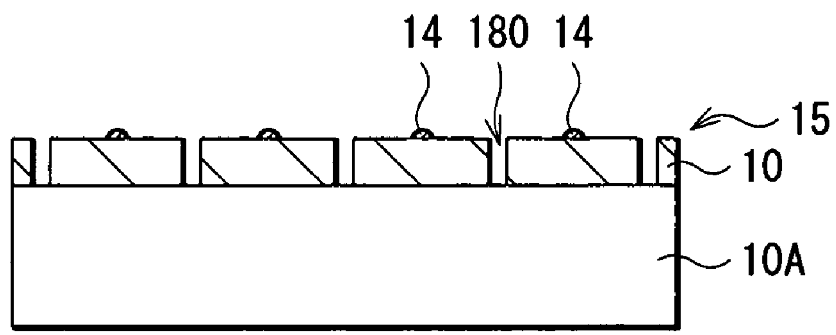

Next, as shown in FIG. 68B, the separation groove 180 is formed in a middle position between the patterns of the deposited regions 14 so as to avoid the patterns of the deposited regions 14. A method of forming the separation groove 180 is the same as that described in Modification 13 referring to FIGS. 51 and 52.

(Extraction Electrode Forming Step)

Figure 69A:
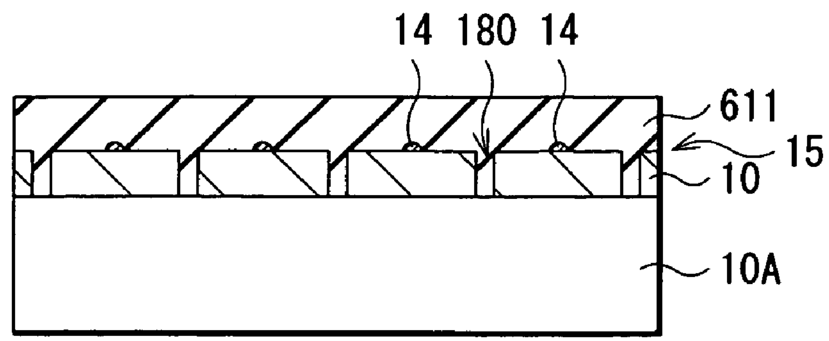
FIGS. 69A through 69C are schematic sectional views showing a step (extraction electrode forming step) following the step of FIG. 68B.

After forming the separation groove 180, an extraction electrode forming step is carried out. At first, as shown in FIG. 69A, an insulating film 611 made of, for example, silicon dioxide ($SiO_2$) or the like is formed on the substrate 15 by, for example, sputtering or chemical vapor deposition.

Figure 69B:
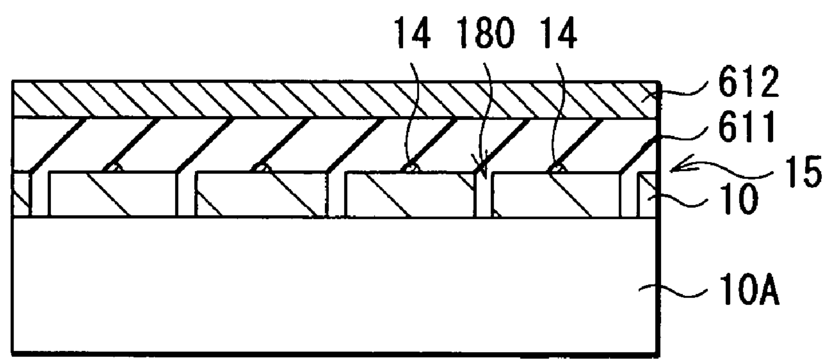

Next, as shown in FIG. 69B, a conductive film 612 made of, for example, niobium (Nb), molybdenum (Mo) or the like is formed on the insulating film 611 by, for example, sputtering or chemical vapor deposition.

Figure 69C:
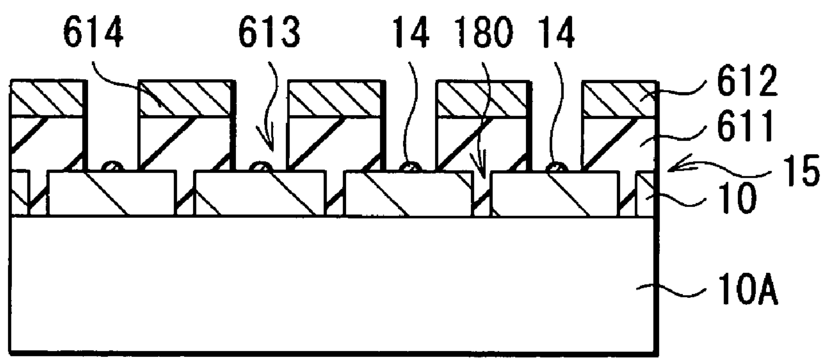

After the conductive film 612 is formed, as shown in FIG. 69C, an aperture portion 613 is formed in the insulating film 611 and the conductive film 612 corresponding to each deposited region 14 by, for example, photolithography or reactive ion etching. Thereby, the extraction electrode 614 made of niobium or molybdenum is formed on the substrate 15 with the insulating film 611 in between.

(Cathode Forming Step)

Figure 70:
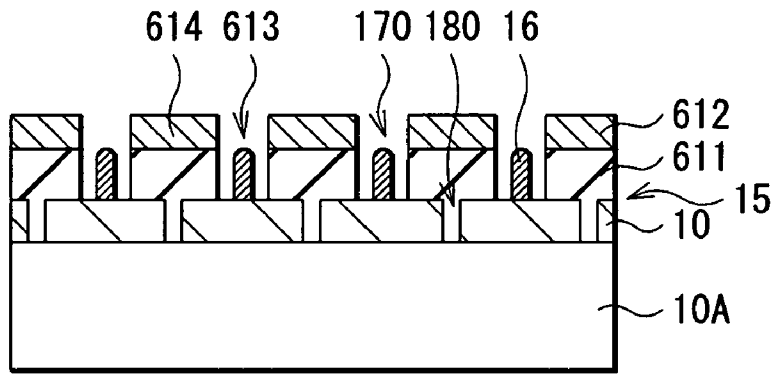
FIG. 70 is a schematic sectional view showing a step (cathode forming step) following the step of FIG. 69C.

Next, as shown in FIG. 70, the carbon nantoubes 16 are grown in the deposited region 14 as in the case of the fifth embodiment to form the cathode 170. Thereby, a field electron emission device including the extraction electrode 614 corresponding to the cathode 170 can be obtained.

(FED)

Figure 71:
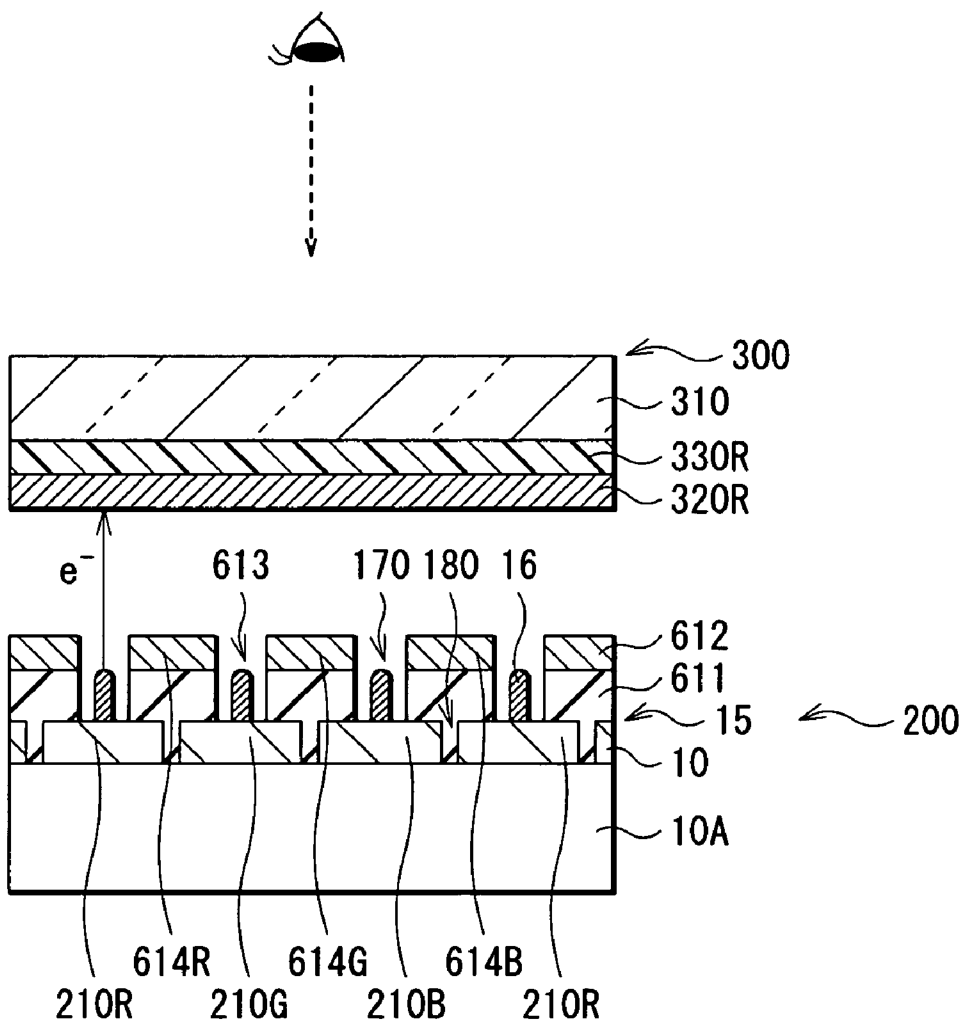
FIG. 71 is a sectional view showing a brief structure of an FED using a field electron emission device which includes a cathode shown in FIG. 70.

FIG. 71 shows a schematic view of an FED using such a field electron emission device. In the FED, the cathode panel 200 and the anode panel 300 are combined as one unit so as to face each other, and the interior of the FED is in a high vacuum state.

The cathode panel 200 includes the above-described cathode 170, and the substrate 15 on which the extraction electrode 614 is formed corresponding to the cathode 170. The extraction electrode 614 includes an extraction electrode for R 614R, an extraction electrode for G 614G and an extraction electrode for B 614B corresponding to the cathode electrodes 210R, 210G and 210B, respectively. The extraction electrode for R 614R, the extraction electrode for G 614G and the extraction electrode for B 614B are connected to a scan driver (not shown).

The anode panel 300 has the same structure as that in the first embodiment, except that a predetermined DC voltage is fixedly applied to the anode electrodes 320R, 320G and 320B. In FIG. 71, only the anode electrode 320R and the phosphor film 330R are shown.

In the FED, for example, when a voltage is selectively applied between the extraction electrodes 614R, 614G and 614B, and the cathode electrodes 210R, 210G and 210B, field electron emission occurs in the cathodes 170 in an intersection point, and the phosphors of the phosphor films 330R, 330G and 330B (refer to FIG. 6) emit light to display a desired image. In this case, the extraction electrode 614 is formed corresponding to the cathode 170, so the field electron emission occurs at a low voltage.

Thus, in the embodiment, the extraction electrode 614 is formed corresponding to the cathode 170, so the field electron emission can occur at a low voltage.

[Modification 21]

Next, referring to FIGS. 72A through 74, a modification of the seventh embodiment will be described below. In the modification, in the seventh embodiment, as in the case of Modification 11, after the pattern of a projection is formed on the surface of the material substrate 10 made of iron (Fe) as a metal catalyst, a control layer for retarding the growth of the carbon nanotubes is formed on the surface of the projection except for a extreme tip portion, and like components are donated by like numerals. A part overlapping with the manufacturing process in the fifth embodiment will be described referring to FIGS. 47 and 48, and a part overlapping with the manufacturing process in the seventh embodiment will be described referring to FIGS. 69A through 69C.

In other words, in the modification, the catalyst arranging step includes "a melting step" of applying the heat distribution 11 modulated according to a desired pattern to the surface of the material substrate 10 so as to melt the surface of the material substrate 10, "a projection forming step" of forming a projection in a position corresponding to the heat distribution 11, that is, in a desired pattern through dissipating the heat of the surface of the material substrate 10, and "a control layer forming step" of forming a control layer for retarding the growth of the carbon nanotubes on the surface of the projection except for the extreme tip portion. If necessary, "a separation groove forming step" of forming a separation groove may be carried out. After that, "a cathode forming step" of forming a cathode through growing the carbon nanotubes in the extreme tip portion of the projection which is not covered with the control layer is carried out.

(Melting Step and Projection Forming Step)

Figure 72A:
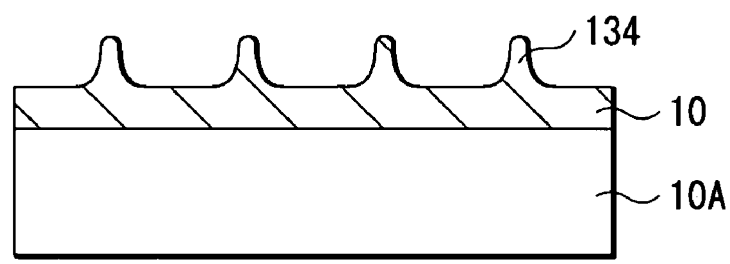
FIGS. 72A through 72C are schematic sectional views showing a projection forming step, a separation groove forming step and a control layer forming step in a catalyst arranging step according to Modification 21 of the invention.

At first, as in the case of Modification 11, the melting step and the projection forming step are carried out, and as shown in FIG. 72A, the pattern of the projection 134 is formed on the surface of the material substrate 10.

(Separation Groove Forming Step)

Figure 72B:
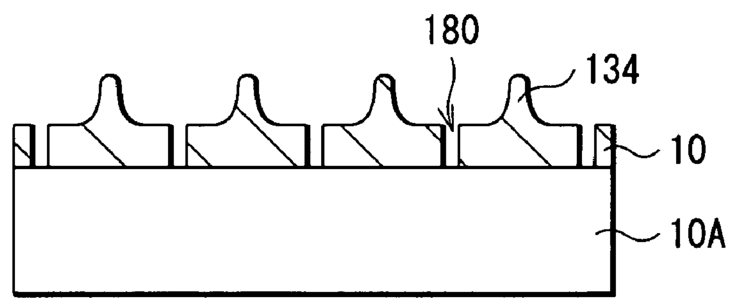

After that, as in the case of the fifth embodiment, as shown in FIG. 72B, the separation groove 180 is formed by the step shown in FIGS. 47 and 48.

(Control Layer Forming Step)

Figure 72C:
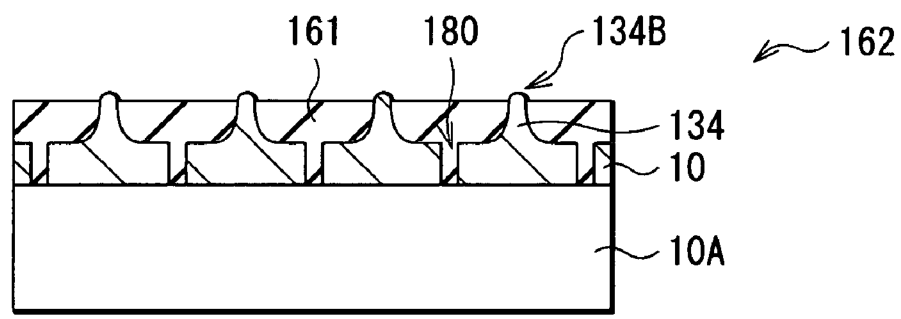

Next, as in the case of Modification 11, as shown in FIG. 72C, the control layer 161 is formed on the surface of the projection 134 except for the extreme tip portion 134B by the step shown in FIG. 44.

Thus, the catalyst arranging step is completed, and a substrate 700 in which the control layer 161 is formed on the surface of the projection 134 except for the extreme tip portion is formed.

(Extraction Electrode Forming Step)

Figure 73A:
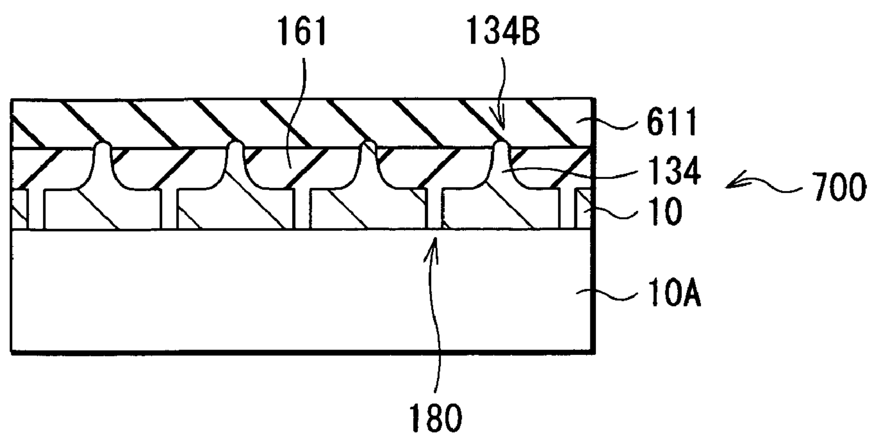
FIGS. 73A through 73C are schematic sectional views showing a step (extraction electrode forming step) following the step of FIG. 72C.

After forming the substrate 700, as in the case of the seventh embodiment, an extraction electrode forming step is carried out by the step shown in FIGS. 69A through 69C. In other words, at first, as shown in FIG. 73A, the insulating film 611 made of, for example, silicon dioxide or the like is formed on the substrate 700 by, for example, sputtering or chemical vapor deposition.

Figure 73B:
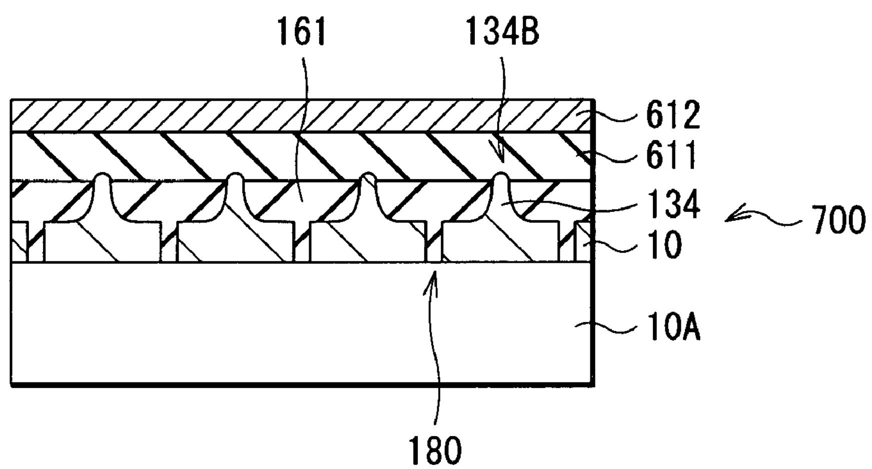

Next, as shown in FIG. 73B, the conductive film 612 made of, for example, niobium (Nb), molybdenum (Mo) or the like is formed on the insulating film 611 by, for example, sputtering or chemical vapor deposition.

Figure 73C:
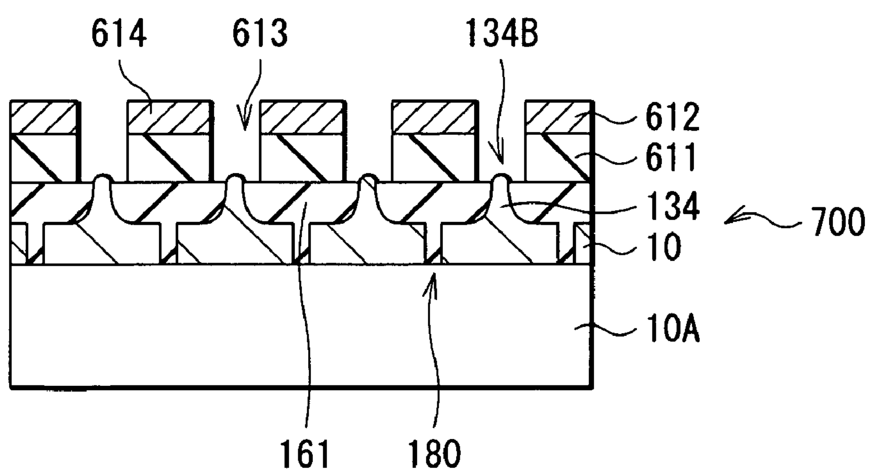

After forming the conductive film 612, as shown in FIG. 73C, the aperture portion 613 is formed in the insulating film 611 and the conductive film 612 corresponding to the extreme tip portion 134B of each projection 134 by, for example, photolithography and reactive ion etching. Thereby, the extraction electrode 614 made of niobium or molybdenum is formed on the substrate 700 with the insulating film 611 in between.

(Cathode Forming Step)

Figure 74:
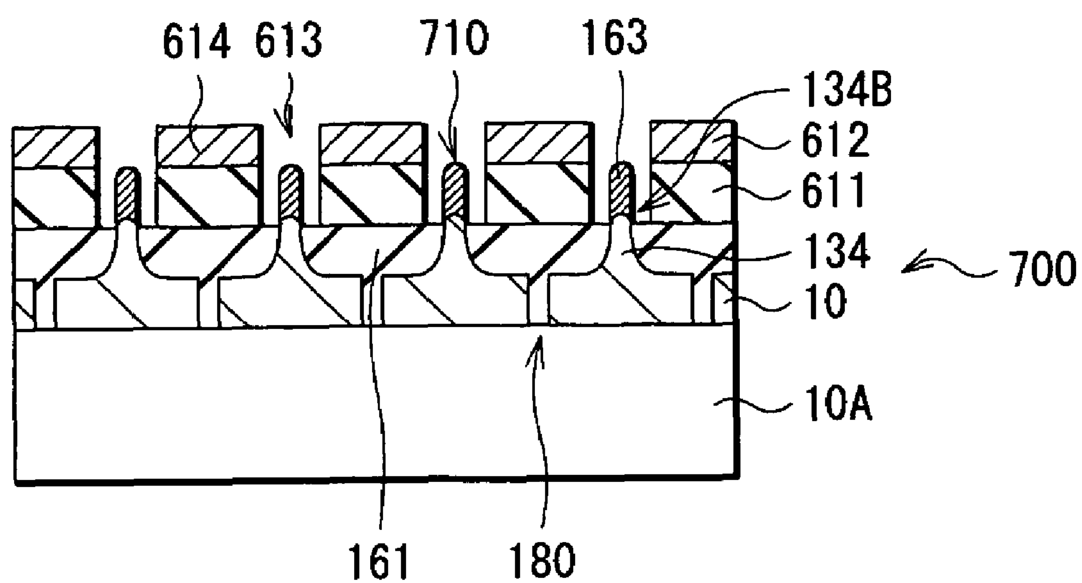
FIG. 74 is a schematic sectional view showing a step (cathode forming step) following the step of FIG. 73C.
Figure 75:
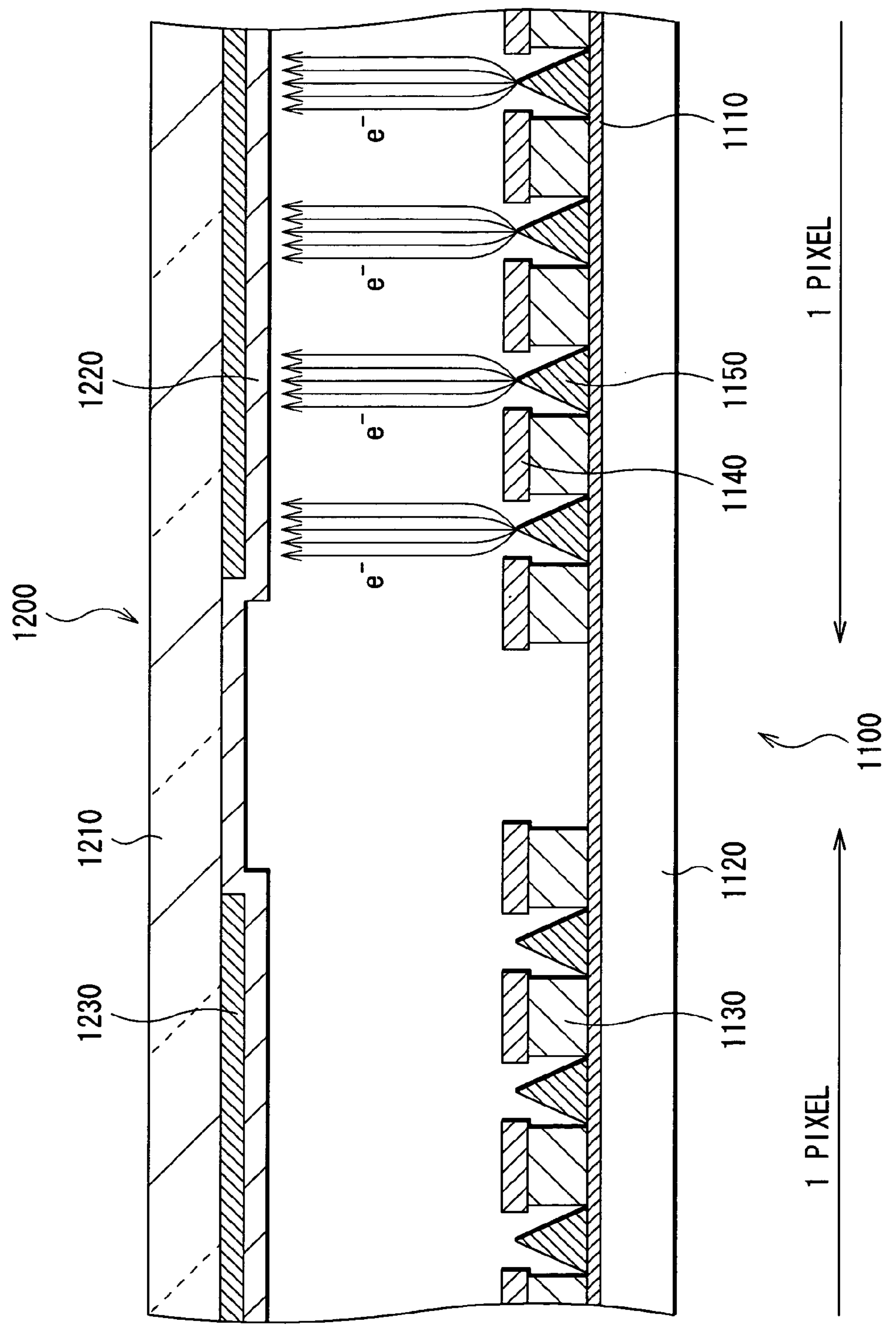
FIG. 75 is a schematic sectional view showing the structure of a conventional FED.

Next, as shown in FIG. 74, as in the case of Modification 11, the carbon nanotubes 163 are grown from the extreme tip portion 134B of each projection 134 to form the cathode 710.

Thereby, a field electron emission device including the extraction electrode 614 corresponding to the cathode 710 can be obtained.

Thus, in the modification, in addition to the effect of the seventh embodiment, the control layer 161 is formed on the surface of the projection 134 except for the extreme tip portion 134B, so the carbon nanotubes 163 can be grown only on the extreme tip portion 134B of the projection 134.

In particular, in the case where an insulating material is used as the material of the control layer 161, an area around the extreme tip portion 134B of the projection 134 is filled with the control layer 161 made of an insulating material, so compared to the case where no insulator exists around the carbon nanotubes 163, a higher electric field can be concentrated on the carbon nanotubes 163.

Although the invention is described referring to the embodiments and the modifications, the invention is not limited to the embodiments and the modifications, and is variously modified. For example, in the above embodiments, the energy amount of the energy beam 12 is adjusted by the number of pulse irradiation; however, the number of pulse irradiation, an irradiation strength and a pulse width can be adjusted.

Moreover, in the above embodiments and the above modifications, the heat distributions 11 and 41 are formed through the use of the diffraction gratings 13, 32 and 43; however, the heat distributions 11 and 41 may be formed through the use of a beam splitter and a mirror.

Further, in the above embodiments and the modifications, the energy beam 12 is applied through the use of an XeCl excimer laser; however, any laser except for the XeCl excimer laser may be used, and as long as the heat distribution can be formed by modulation, heating may be carried out by any other method using a typical general-purpose electric heating furnace (diffusion furnace) or a lamp as a heater.

In addition, in the above embodiments and the above modifications, heat dissipation in the depositing step or the projection forming step is carried out by natural cooling at a room temperature after the melting step is completed; however, the depositing step or the projection forming step can be shortened through forced cooling at a temperature less than the room temperature.

In addition, for example, in the cathode forming step in Modification 15, as in the case of the sixth embodiment, the substrate 35 and an electrode (not shown) face each other, and a voltage may be applied between them.

Further, for example, as a combination of the second embodiment and the sixth embodiment, when the height of the carbon nanotubes grown in a vertical direction through applying an electric field between the substrate and the electrode is equalized, the shapes and the growth directions of the carbon nanotubes can be uniform, and when the carbon nanotubes are used in an FED, the electric field emission property can be further improved.

Moreover, for example, as in the case of the second embodiment, after the height of the carbon nanotubes 16 is equalized, an extraction electrode made of niobium or molybdenum may be formed on the fixing layer 18 as in the case of the seventh embodiment. In this case, the fixing layer 18 is preferably made of an insulating material.

Further, for example, in the method of manufacturing a field electron emission device and the method of manufacturing a display unit, the case where the catalyst arranging step is carried out as in the case of Modification 1 is described in Modification 15, the case where the catalyst arranging step is carried out as in the case of Modification 2 is described in the sixth embodiment, and the case where the catalyst arranging step is carried out as in the case of Modification 11 is described in Modification 21. However, the modifications of the catalyst arranging step described in Modifications 3 through 10 can be applied to the method of manufacturing a field electron emission device and the method of manufacturing a display unit.

The method of arranging the metal having a catalyst function on the substrate is not limited to the above embodiments and the modifications. For example, a projection may be formed on a substrate made of a catalyst metal, and a top surface of the projection may be planarized.

In addition, in the above embodiments and the above modifications, the case where a carbon nanotube is formed as a tubular carbon molecule is described; however, the invention is not limited to this case, and can be applied to the case where a carbon nanohorn or a carbon nanofiber is formed.

As described above, in the method of manufacturing a tubular carbon molecule according to the invention, the metal having a catalyst function for forming a tubular carbon molecule is arranging through the use of melting by a modulated heat distribution to grow tubular carbon molecules, so a pattern with a fine width and a fine spacing which are impossible to achieve by the conventional photolithography is formed through controlling the heat distribution, and a tubular carbon molecule structure in which the tubular carbon molecules are regularly aligned according to the pattern can be obtained.

In the method of manufacturing a recording apparatus according to the invention, the metal having a catalyst function for forming a tubular carbon molecule is arranged through the use of melting by a modulated heat distribution to grow tubular carbon molecules, and tips of the tubular carbon molecules are formed in a predetermined plane, and the tips are formed into open tips, then a magnetic layer is formed through inserting a magnetic material into tip portions of the tubular carbon molecules from the open tips. Therefore, the length of magnetization can be a small dimension which is impossible to achieve by the conventional photolithography. Thereby, the recording density can be extremely high. Moreover, the magnetic layer is separated by the tubular carbon molecule, so without the effect of the magnetic layers in other adjacent tubular carbon molecules, a predetermined magnetization direction can be stably held for a long time, and the reliability of the recording apparatus can be improved.

As described above, in the method of manufacturing a field electron emission device according to the invention, the field electron emission device according to the invention, the method of manufacturing a display unit according to the invention or the display unit according to the invention, the catalyst arranging step of arranging the metal having a catalyst function for a tubular carbon molecule on the substrate through the use of melting by the modulated heat distribution, and the cathode forming step of forming the cathode through growing the tubular carbon molecules are included, so through controlling the heat distribution, the catalyst metal can be arranged in a pattern with a fine width and a fine spacing which are impossible to achieve by the conventional photolithography, and the cathode in which the tubular carbon molecules are regularly aligned according to the pattern can be obtained.

The invention claimed is:

1. A method of manufacturing a tubular carbon molecule, the method comprising:

a catalyst arranging step of arranging a metal having a catalyst function for a tubular carbon molecule through use of melting by a modulated heat distribution;

a growing step of growing a tubular carbon molecule;

a height equalizing step of forming a tip of the tubular carbon molecule in a predetermined plane, and forming the tip into an open tip; and an inserting step of inserting a magnetic material in at least tip portions of a plurality of tubular carbon molecules from open tips of a plurality of tubular carbon molecules.

2. A method of manufacturing a tubular carbon molecule according to claim 1, wherein:

heat distribution is applied through diffracting an energy beam in a one-dimensional direction or a two-dimensional direction.

3. A method of manufacturing a tubular carbon molecule according to claim 1, wherein:

in the height equalizing step, after a fixing layer is formed at least around the tubular carbon molecule to fix the tubular carbon molecule, polishing on the tubular carbon molecule together with the fixing layer is carried out.

4. A method of manufacturing a tubular carbon molecule according to claim 3, wherein:

the polishing is carried out by chemical mechanical polishing.

5. A method of manufacturing a tubular carbon molecule according claim 1, wherein:

in the height equalizing step, after a fixing layer is formed at least around the tubular carbon molecules to fix the tubular carbon molecules, polishing on the tubular carbon molecules together with the fixing layer is carried out, and in the inserting step, after a thin film made of the magnetic material is formed on the fixing layer so as to block the open tips, polishing on the thin film is carried out.

6. A method of manufacturing a tubular carbon molecule according to claim 5, wherein:

the polishing is carried out by chemical mechanical polishing.

7. A method of manufacturing a tubular carbon molecule, the method comprising:

a catalyst arranging step of arranging a metal having a catalyst function for a tubular carbon molecule through use of melting by a modulated heat distribution;

a growing step of growing a tubular carbon molecule; and wherein the catalyst arranging step includes:

a melting step of applying a modulated heat distribution to a surface of a material substrate including a second material as an additive in a first material so as to melt the surface of the material substrate;

a depositing step of depositing the second material in a position corresponding to the heat distribution through dissipating the heat of the surface of the material substrate, and in the depositing step, a projection is formed on the surface of the material substrate through dissipating heat of the surface of the material substrate, and the second material is deposited on at least a tip portion of the projection.

8. A method of manufacturing a tubular carbon molecule according to claim 7, wherein:

the second material is a material which lowers a melting point of the first material by adding the second material to the first material.

9. A method of manufacturing a tubular carbon molecule according to claim 7, wherein:

in the depositing step, the second material is deposited on the surface of the material substrate in a planar shape through dissipating heat of the surface of the material substrate.

10. A method of manufacturing a tubular carbon molecule according to claim 7, wherein:

the first material is a semiconductor or a metal, and the second material is a metal having a catalyst function.

11. A method of manufacturing a tubular carbon molecule, the method comprising:

a catalyst arranging step of arranging a metal having a catalyst function for a tubular carbon molecule through use of melting by a modulated heat distribution;

a growing step of growing a tubular carbon molecule; and wherein the catalyst arranging step includes:

a melting step of applying a heat distribution modulated according to a desired pattern to a surface of a material substrate so as to melt the surface of the material substrate;

a master forming step of forming a projection in which at least a tip portion thereof is made of a transfer material in a position corresponding to the heat distribution on the material substrate through dissipating heat of the surface of the material substrate so as to form a master for transfer having a pattern of the projection on a surface thereof; and a transferring step of forming a substrate through transferring the pattern of the master for transfer to a substrate to be transferred, and the tubular carbon molecule is grown on the substrate.

12. A method of manufacturing a tubular carbon molecule according to claim 11, wherein:

in the transferring step, a relative position between the master for transfer and the substrate to be transferred is shifted to transfer the pattern of the master for transfer to the substrate to be transferred a plurality of times.

13. A method of manufacturing a tubular carbon molecule according to claim 11, wherein:

a heating process is carried out in the transferring step.

14. A method of manufacturing a tubular carbon molecule, the method comprising:

a catalyst arranging step of arranging a metal having a catalyst function for a tubular carbon molecule through use of melting by a modulated heat distribution;

a growing step of growing a tubular carbon molecule; and wherein the catalyst arranging step includes:

a melting step of applying a heat distribution modulated according to a desired pattern to a surface of a material substrate so as to melt the surface of the material substrate;

a projection forming step of forming a projection of a pattern in a position corresponding to the heat distribution through dissipating heat of the surface of the material substrate; and an adhering step of adhering a catalyst metal to a tip portion of the projection through pushing a metal substrate made of a metal having a catalyst function for a tubular carbon molecule to the projection.

15. A method of manufacturing a tubular carbon molecule, the method comprising:

a catalyst arranging step of arranging a metal having a catalyst function for a tubular carbon molecule through use of melting by a modulated heat distribution;

a growing step of growing a tubular carbon molecule; and wherein the catalyst arranging step includes:

a melting step of applying a heat distribution modulated according to a desired pattern to a surface of a material substrate so as to melt the surface of the material substrate;

a projection forming step of forming the pattern of a projection in a position corresponding to the heat distribution through dissipating heat of the surface of the material substrate; and a planarizing step of planarizing a top surface of the projection.

16. A method of manufacturing a tubular carbon molecule according to claim 15, further comprising:

a top surface transferring step of transferring the planarized top surface of the projection to a substrate to be transferred.

17. A method of manufacturing a recording apparatus, the method comprising:

a catalyst arranging step of arranging a metal having a catalyst function for a tubular carbon molecule through use of melting by a modulated heat distribution;

a growing step of growing a tubular carbon molecule;

a height equalizing step of forming a tip of the tubular carbon molecule in a predetermined plane, and forming the tip into an open tip; and an inserting step of inserting a magnetic material in at least a tip portion of the tubular carbon molecule from the open tip.

18. A method of manufacturing a recording apparatus according to claim 17, wherein:

in the height equalizing step, a fixing layer is formed at least around the tubular carbon molecule to fix the tubular carbon molecule, and polishing on the tubular carbon molecule together with the fixing layer is carried out, and in the inserting step, a thin film made of the magnetic material is formed on the fixing layer so as to block the open tip, and polishing on the thin film is carried out.

19. A method of manufacturing a recording apparatus according to claim 18, wherein:

the polishing is carried out by chemical mechanical polishing.

20. A method of manufacturing a field electron emission device, the method comprising:

a catalyst arranging step of arranging a metal having a catalyst function for a tubular carbon molecule on a substrate through use of a modulated heat distribution the substrate having a pattern of a projection in which at least a tip portion thereof is made of the metal; and a cathode forming step of forming a cathode through growing a tubular carbon molecule, wherein two substrates are disposed so that the patterns of the projection face each other, and an electric field is applied between the two substrates.

21. A method of manufacturing a field electron emission device according to claim 20, wherein:

the substrate has a planar pattern made of the metal.

22. A method of manufacturing a field electron emission device according to claim 20, wherein:

the metal is arranged with a spacing of 100 nm or less.

23. A method of manufacturing a field electron emission device according to claim 20, wherein:

the metal is arranged with a spacing of 50 nm or less.

24. A method of manufacturing a field electron emission device according to claim 20, further comprising:

a separation groove forming step of forming a separation groove on a surface of the substrate so as to avoid the metal.

25. A method of manufacturing a field electron emission device according to claim 24, wherein:

the separation groove is formed by irradiation with an energy beam.

26. A method of manufacturing a field electron emission device according to claim 24, wherein:

the separation groove is formed through diffracting an energy beam in a one-dimensional direction or a two-dimensional direction.

27. A method of manufacturing a field electron emission device according to claim 24, wherein:

the separation groove is formed in a parallel line or a grid.

28. A method of manufacturing a field emission device according to claim 20 further comprising:

an extraction electrode forming step of forming an extraction electrode corresponding to the cathode.

29. A method of manufacturing a field electron emission device according to claim 28, wherein:

the extraction electrode forming step is carried out between the catalyst arranging step and the cathode forming step.

30. A method of manufacturing a field electron emission device according to claim 28, wherein:

the extraction electrode forming step includes:

an insulating film forming step of forming an insulating film on the substrate;

a conductive film forming step of forming a conductive film on the insulating film; and an aperture portion forming step of forming an aperture portion in the insulating film and the conductive film corresponding to the cathode.

31. A method of manufacturing a filed electron emission device according to claim 20 further comprising:

a height equalizing step of forming a tip of the tubular carbon molecule in a predetermined plane, and forming the tip into an open tip.

32. A method of manufacturing a field electron emission device according to claim 31, wherein:

in the height equalizing step, after a fixing layer is formed at least around the tubular carbon molecule to fix the tubular carbon molecule, polishing on the tubular carbon molecule together with the fixing layer is carried out.

33. A method of manufacturing a field electron emission device according to claim 32, wherein:

the polishing is carried out by chemical mechanical polishing.

34. A method of manufacturing a tubular carbon molecule, the method comprising:

a catalyst arranging step of arranging a metal having a catalyst function for a tubular carbon molecule through use of melting by a modulated heat distribution;

a growing step of growing a tubular carbon molecule; and wherein the catalyst arranging step includes:

a melting step of applying a heat distribution modulated according to a desired pattern to a surface of a material substrate so as to melt the surface of the material substrate;

a projection forming step of forming the pattern of a projection in a position corresponding to the heat distribution through dissipating heat of the surface of the material substrate; and a control layer forming step of forming a control layer which retards growth of a tubular carbon molecule on a surface of the projection except for an extreme tip portion.

35. A method of manufacturing a field electron emission device, the method comprising:

a catalyst arranging step of arranging a metal having a catalyst function for a tubular carbon molecule on a substrate through use of a modulated heat distribution;

a cathode forming step of forming a cathode through growing a tubular carbon molecule, wherein the substrate and an electrode face each other, and an electric field is applied between the substrate and the electrode; and wherein as the electrode, an electrode on which a pattern of a projection corresponding to the pattern of the substrate is formed is used, and the pattern of the substrate and the pattern of the projection of the electrode face each other.

36. A method of manufacturing a field electron emission device, the method comprising:

a catalyst arranging step of arranging a metal having a catalyst function for a tubular carbon molecule on a substrate through use of a modulated heat distribution;

a cathode forming step of forming a cathode through growing a tubular carbon molecule; and wherein the catalyst arranging step includes:

a projection electrode forming step of forming a pattern of a projection on a surface of a flat electrode through the use of a heat distribution modulated according to a desired pattern so as to form a projection electrode; and a reducing/depositing step of forming a pattern which is made of a metal having a catalyst function and corresponds to the projection electrode on the substrate through applying an electric field between the projection electrode and a conductive substrate in a catalyst solution including a metal having a catalyst function to reduce and deposit the metal.

* * * * *